US011894987B2

(12) United States Patent
D'Ippolito et al.

(10) Patent No.: US 11,894,987 B2
(45) Date of Patent: Feb. 6, 2024

(54) MULTI-LAYER OPTICAL NETWORK MANAGEMENT GRAPHICAL USER INTERFACE AND VISUALIZATIONS

(71) Applicant: Ciena Corporation, Hanover, MD (US)

(72) Inventors: Tommaso D'Ippolito, Ottawa (CA); Christiane Louise Campbell, Ottawa (CA); Sonya Thornley, Ottawa (CA); Yuen Ping Choi, Ottawa (CA); Philippe Vic Savignac, Stittsville (CA); Frederick James Lalonde, Ottawa (CA); Michael Wilgosh, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/947,341

(22) Filed: Sep. 19, 2022

(65) Prior Publication Data

US 2023/0083867 A1 Mar. 16, 2023

Related U.S. Application Data

(63) Continuation of application No. 16/022,367, filed on Jun. 28, 2018, now Pat. No. 11,463,325.
(Continued)

(51) Int. Cl.
*H04L 41/22* (2022.01)
*H04Q 11/00* (2006.01)
(Continued)

(52) U.S. Cl.
CPC .............. *H04L 41/22* (2013.01); *H04L 41/12* (2013.01); *H04L 41/20* (2013.01);
(Continued)

(58) Field of Classification Search
CPC ......... H04L 41/12; H04L 41/20; H04L 41/22; H04L 41/505; H04Q 2011/0073;
(Continued)

(56) References Cited

U.S. PATENT DOCUMENTS 6,112,015 A 8/2000 Planas et al.
6,414,595 B1 7/2002 Scrandis et al.
(Continued)

FOREIGN PATENT DOCUMENTS

WO WO-2015039430 A1 * 3/2015 ......... H04B 10/0793

OTHER PUBLICATIONS

Guo, Wenting. English Translation of Abstract from CN 104467950 A. (Year: 2015).*

(Continued)

*Primary Examiner* — John M Macilwinen
(74) *Attorney, Agent, or Firm* — Baratta Law PLLC; Lawrence A. Baratta, Jr.

(57) ABSTRACT

Systems and methods include receiving Operations, Administration, Maintenance, and Provisioning (OAM&P) data from an optical network; providing a Graphical User Interface (GUI) based on the OAM&P data with the GUI including a topology view; and providing a visualization that includes one of a power readings graph, a spectral analysis graph, and a spectral allocation graph, in the GUI, and the visualization is positioned logically next to the topology view.

16 Claims, 54 Drawing Sheets

Related U.S. Application Data

(60) Provisional application No. 62/526,127, filed on Jun. 28, 2017.

(51) Int. Cl.

| | |
|---|---|
| ***H04L 41/5051*** | (2022.01) |
| ***H04L 41/12*** | (2022.01) |
| ***H04L 41/00*** | (2022.01) |
| ***H04L 41/0686*** | (2022.01) |
| ***H04L 41/0677*** | (2022.01) |

(52) U.S. Cl.
CPC ..... *H04L 41/5051* (2013.01); *H04Q 11/0067* (2013.01); *H04L 41/0677* (2013.01); *H04L 41/0686* (2013.01); *H04Q 2011/0073* (2013.01); *H04Q 2011/0079* (2013.01); *H04Q 2011/0086* (2013.01)

(58) Field of Classification Search
CPC ... H04Q 2011/0079; H04Q 2011/0086; H04Q 11/0067
See application file for complete search history.

(56) References Cited

U.S. PATENT DOCUMENTS

| | | | | |
|---|---|---|---|---|
| 7,149,975 | B1 * | 12/2006 | Johnson | H04L 41/22 709/224 |
| 7,522,846 | B1 * | 4/2009 | Lewis | H04J 14/0221 398/201 |
| 9,838,273 | B2 * | 12/2017 | Htay | H04L 41/5029 |
| 2005/0198247 | A1 | 9/2005 | Perry et al. | |
| 2005/0213971 | A1 * | 9/2005 | Amemiya | H04J 14/0221 398/45 |
| 2007/0132733 | A1 | 6/2007 | Ram | |
| 2014/0169791 | A1 | 6/2014 | Swinkels et al. | |
| 2014/0254392 | A1 | 9/2014 | Wolcott et al. | |
| 2015/0333864 | A1 * | 11/2015 | Swinkels | H04B 10/0795 398/79 |
| 2016/0050470 | A1 * | 2/2016 | Swinkels | H04B 10/516 398/45 |
| 2016/0119806 | A1 | 4/2016 | Carbajal | |

OTHER PUBLICATIONS

Panagiotidis, Alexandros, et al. "Graph exploration by multiple linked metric views." 2014 18th International Conference on Information Visualisation. IEEE. (Year: 2014).*

* cited by examiner

400

MULTI-LAYER OPTICAL NETWORK MANAGEMENT GRAPHICAL USER INTERFACE AND VISUALIZATIONS

CROSS-REFERENCE TO RELATED APPLICATION(S)

The present application/patent is a continuation of U.S. patent application Ser. No. 16/022,367, filed Jun. 28, 2018, which claims priority to U.S. Provisional Patent Application No. 62/526,127, filed Jun. 28, 2017, the contents of each are incorporated by reference herein.

FIELD OF THE DISCLOSURE

The present disclosure generally relates to network management systems and methods. More particularly, the present disclosure relates to a multi-layer optical communications network management Graphical User Interface (GUI) and communications network visualizations.

BACKGROUND OF THE DISCLOSURE

Network management is key to operating multi-layer communications networks to perform various functions such as fault analysis, performance management, service provisioning, network device provisioning, maintaining the Quality of Service (QoS), Operations, Administration, Maintenance, and Provisioning (OAM&P), and the like. Generally, network management solutions are provided through Network Management Systems (NMS). Networks continue to evolve to support multiple layers (e.g., optical, Time Division Multiplexing (TDM), packet, and the like) in the same operational network including the same network elements along with advanced features. Thus, it is desired for network management solutions to address this evolution.

In a multi-layer network, a service object instance is realized through one or more nodes and associated cards/components or other devices. Conventional network management approaches do not visualize a multi-layer service object instance in a combined nodal and card/component/device view. In addition, the conventional network management approaches do not isolate the physical/topology view to display only the relevant nodes (network elements) that are involved in a service object instance. Rather, they tend to show the entire network (all network elements and links and sometimes include geographical, physical, and topographical attributes) and then overlay (or trace) the service instance across the entire network view, highlighting the network elements and links involved. Access to the card/component/device view of the service combined with the overall network view is not conventionally available; rather, any such view is typically accessed via another window or screen.

Network management systems use objects to model, manage, and display network data. With respect to associating correlated data and other objects to a primary object instance of interest, there are no conventional approaches that provide this type of functionality from within a service object instance detail GUI of a network management system. For example, if an operator needs to know the associated services and customers that are currently related to a primary service object instance they are interested in, the operator needs to cross-reference other windows/applications within the NMS or even resort to checking other systems, e.g., Operational Support Systems (OSS)/Business Support System (BSS) applications, trouble-ticket systems, and/or look it up manually in a binder of printed related objects, which are separate from the NMS where the primary service object instance was found in the first place.

There are various shortcomings in showing the topology/connectivity of a service object instance in conventional systems, e.g., which show it traced (overlaid) across the entire network on a geographical/physical map.

First, since the service object instance connectivity is traced across a geographical/physical map of the entire network, these systems are not able to display the entire service/circuit in one screen/window, especially if the service instance is physically long (e.g., from New York to St. Louis). This results in poor user performance/experience as the operator may have to physically scroll or pan the view window left to right or top to bottom to actually see the entire end-to-end service instance.

Second, only being able to view the nodes/network elements and links that support the service and not being able to deconstruct the view into every individual card/component in a line view, results in diminished end-user functionality.

Third, not being able to expand the line view and show supporting lower layer bearer services involved in the primary service object instance, e.g., viewing a Layer 2 Ethernet service instance and showing the underlying Layer 0 optical line that rides across from end-to-end, also results in diminished functionality.

Fourth, by showing the entire network (i.e., all nodes and links) and most often many physical, geographical, and topographic map details (e.g., rivers, lakes, roads, borders, elevations, structures, etc.) adds complexity and visual noise when trying to isolate only the service object instance and how it is connected from a technical/deployment point-of-view.

Further, there are various shortcomings with not associating correlated data and related object instances to the primary object instance of interest in the same screen/window/application. This can lead to poor experience for the operator as they have to manually cross-reference other systems and printed material to get all the data needed to perform given assurance, provisioning, or maintenance tasks on the selected service object instance. The manual lookup and correlation is complex, time-consuming, and tedious and can lead to increased risk of end-user human error. In particular, operator response time to network events can be impacted.

Additionally, optical networks are evolving to support more complex operational schemes with flexible grid optical spectrum, different modulation formats, Reconfigurable Optical Add/Drop Multiplexers (ROADM) leading to disjoint A-Z paths of different portions of the spectrum, etc. These next-generation optical networks require additional functionality in the network management systems to support power readings, spectral analysis, spectral allocation, and the like.

For a power readings graph, conventional approaches display power readings across a path from equipment of one or more vendors. With the introduction of a power graph in a Software Defined Networking (SDN) application, there is an ability to display power values in the context of all equipment in the service path, not just the power reporting equipment and in context of the last day's minimum and maximum measurements to help highlight transient dips in power that otherwise recovered. This enhances the understanding and troubleshooting of power behaviors. However, this does not permit in-context navigation to historical readings to assist in more advanced troubleshooting activities.

For a spectral analysis graph, separate hardware-based Optical Spectrum Analyzers (OSA) have existed for years, i.e., external equipment. Next generation optical modems can support a built-in software-based spectrum analyzer, i.e., in-line and in-service. There are no conventional NMS software-based spectrum analyzers that provide the frequency/power readings at the same time as overlaying such information onto the used/available/planned spectrum.

For a spectral allocation graph, conventional approaches utilize path-based spectral allocation visualization through offline network planning tools. This visualization is not available for a managed network, nor to assist in visualizing/adjusting spectral assignment while provisioning/planning new flexible grid channels on a live, managed network.

Accordingly, there is a need for a multi-layer optical communications network management Graphical User Interface (GUI) and visualizations addressing the aforementioned limitations.

BRIEF SUMMARY OF THE DISCLOSURE

In an embodiment, a network management system includes a network interface communicatively coupled to one or more network elements in a network for exchanging Operations, Administration, Maintenance, and Provisioning (OAM&P) data; a processor communicatively coupled to the network interface; and memory storing instructions that, when executed, cause the processor to obtain the OAM&P data from the network, provide a Graphical User Interface (GUI) based on the network from the OAM&P data, wherein the GUI includes a network map which provides a topological view and a subway view which provides a detailed device-level view which is more granular than the network map and illustrates individual components at each site, receive a selection from a user of a service in the network, and update the GUI to highlight the service in the network map and illustrate the associated sites in the subway view. The service can traverse a plurality of sites in the network such that all of the sites cannot be displayed in the subway view, wherein the GUI can further include a visual scrollbar which visualizes the service in a miniature format for the subway view with a portion shown in the subway view highlighted, and wherein the memory storing instructions that, when executed, can further cause the processor to update the subway view based on input from the user through the visual scrollbar. The memory storing instructions that, when executed, can further cause the processor to highlight a portion of the network in the topological view which is currently displayed in the subway view.

The individual components in the subway view can include any of a multiplexer, an optical transceiver, an optical switch, a multiplexer, a demultiplexer, a Wavelength Selective Switch (WSS), an amplifier, an attenuator, a dispersion compensation module, a C/L band coupler, a Time Division Multiplexing (TDM) switch, and a packet switch. The memory storing instructions that, when executed, can further cause the processor to receive an input from the user from a selection in the GUI, and present correlated objects and data items based on the selection. The memory storing instructions that, when executed, can further cause the processor to receive an input from the user selecting a power graph, and present an optical power readings graph in place of the network map, wherein the optical power readings graph illustrates power readings in both directions along the subway view and has an x-axis of optical power and a y-axis of each of the individual components in the subway view that measure optical power.

The memory storing instructions that, when executed, can further cause the processor to receive an input from the user selecting a power graph, and present an optical power readings graph in place of the network map, wherein the optical power readings graph illustrates power readings in both directions along the subway view and has an x-axis of optical power and a y-axis of each of the individual components in the subway view that measure optical power. The memory storing instructions that, when executed, can further cause the processor to receive an input from the user selecting a point in the subway view for viewing an optical spectral hysis graph, and present an optical power readings graph in place of the network map, wherein the optical spectral analysis graph displays power on an x-axis and spectrum on a y-axis. The memory storing instructions that, when executed, can further cause the processor to receive an input from the user selecting spectral use, and present an optical spectral allocation graph in place of the network map, wherein the optical spectral allocation graph displays spectrum on an x-axis and usage of the spectrum on a y-axis across the subway view.

In another embodiment, a network management method includes, in a server including a network interface communicatively coupled to one or more network elements in a network for exchanging Operations, Administration, Maintenance, and Provisioning (OAM&P) data, obtaining the OAM&P data from the network; providing a Graphical User Interface (GUI) based on the network from the OAM&P data, wherein the GUI includes a network map which provides a topological view and a subway view which provides a detailed device-level view which is more granular than the network map and illustrates individual components at each site; receiving a selection from a user of a service in the network; and updating the GUI to highlight the service in the network map and illustrate the associated sites in the subway view.

In a further embodiment, a non-transitory computer-readable medium including instructions that, when executed, cause a processor to perform steps of obtaining Operations, Administration, Maintenance, and Provisioning (OAM&P) data from the network via a network interface communicatively coupled to the processor and to one or more network elements; providing a Graphical User Interface (GUI) based on the network from the OAM&P data, wherein the GUI includes a network map which provides a topological view and a subway view which provides a detailed device-level view which is more granular than the network map and illustrates individual components at each site; receiving a selection from a user of a service in the network; and updating the GUI to highlight the service in the network map and illustrate the associated sites in the subway view.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
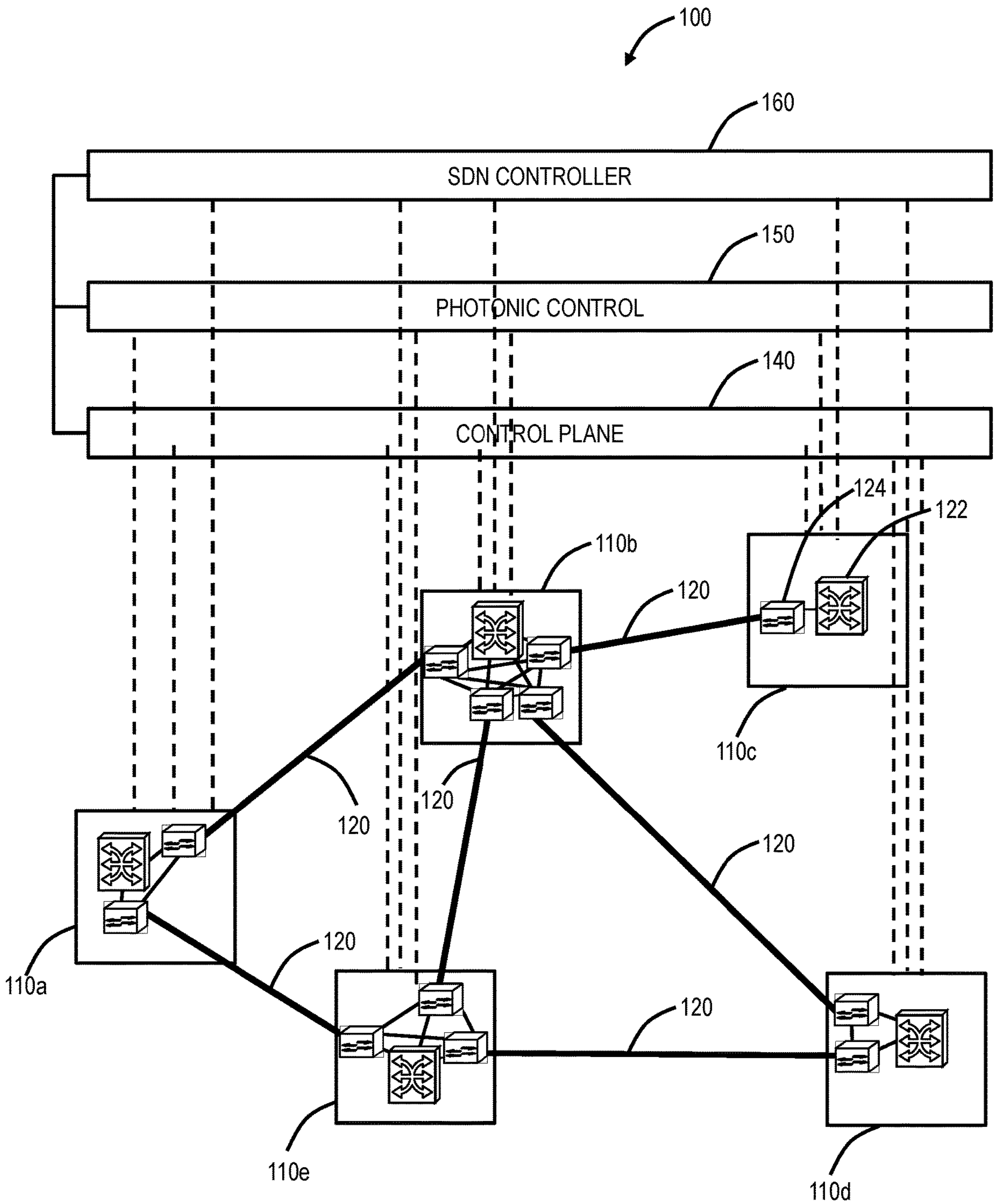
FIG. 1 is a network diagram of an example network with five interconnected sites.

In various embodiments, the present disclosure relates to multi-layer optical network management Graphical User Interface (GUI) and visualizations. In particular, the network management GUI and visualizations include a subway and line service view, correlated objects and data items, a power readings graph, a spectral analysis graph, a spectral allocation graph, and the like, each through the GUI and visualizations.

Subway Map and Correlated Objects

Variously, specific details, attributes, particulars, etc., of a specific managed object instance, are viewed in an object details page via the GUI and visualizations. An object details page provides all relevant data about the managed object instance in a full page of screen real estate. It helps users understand the object, troubleshoot it, perform actions, edit and check out related data/information to the object. When a user chooses to drill into a specific object instance from a list of instances, this focuses on that instance for object-specific work. Capturing an object instance's details in a separate page (that can be detached from the original list) allows use of multiple screens or browser tabs, keeping this information separate from other tasks to be performed. The details of an End-to-End Service object instance are presented to a user with a "subway map and line service view" (primary tab) and correlated objects and data items (one or more tabs) accessible via sub-tabs on the object details page.

The subway map and line service view is used to view connection-type objects in the network, such as services, Labeled Switched Path (LSP) tunnels, G.8032 rings, photonic channels (i.e., wavelengths), and links. This view is (named after) analogous to a real-world subway map and line depictions, which are typically schematic diagrams of topological/physical maps that illustrate routes and stations to assist passengers plan and navigate their way around the entire subway network. Unlike actual maps (e.g., geographical, physical, road, topographical or thematic maps) subway maps are typically not geographically accurate or precise as they tend to represent links/tracks/trains between stations with straight lines that are not proportionally scaled to distance in order to clearly represent all stops/links in the system in a fixed, finite space.

Similarly, when looking at a connection in a communications network, understanding the topology and connectivity between network elements, the connection's current route and possible alternative routes in the network are typically more important to the task of understanding and troubleshooting the connection than its actual physical, political, or topographical geography. The subway map view is intended to offer a comprehensive view of the overall communications network employed in providing a connection. To achieve this, it displays only the network elements and links that form the current route, and also those that are part of defined other paths for the connection (e.g. protection, restoration, backup, home paths, Designated Transit List (DTL) sets, etc.). The subway line view is driven from the subway map view and depicts the cards/components/devices of the selected route and is useful in and showing any supporting lower layer bearer services/infrastructure involved in (associated with) the primary service object instance.

The correlated objects and data items are used to present important related data in the context of the selected (or primary) object instance. These "related/associated" tabs are provided in addition to the expected or intrinsic data tabs typically associated with the primary object instance details, e.g., attributes, parameters, settings, physical and thematic views, etc. These "related/associated" tabs provide additional correlations between the selected object (in view) and other related items in the system to support different user tasks. For example, when viewing a service instance, related information may include alarms (current as well as historical, which can also be referred to as active as well as cleared) associated with that service object instance; other service instances (secondary objects) that depend on it (e.g., higher-layer services), other services/infrastructure instances that it depends on (e.g., lower-layer or bearer services), etc. Generally speaking, these related/associated tabs could contain additional operationally useful and relevant "drill-across" data associated with the selected (primary) object instance that can be queried or correlated in real-time from data stored in the management system's managed resources and services database.

These related info tabs can be visible from the object details view. To help a user assess the magnitude of the related/associated items contained in each "correlated" tab, the numeric count of the related data objects contained in the specific tab can be provided. For example, "Alarms (7)" means the tab contains 7 associated alarms to the primary object instance being viewed.

The subway map and line service views enable a network operator to view any multi-layer service from end-to-end for troubleshooting, maintenance, and assurance tasks from a network perspective (network elements and links) as well as an individual line/component perspective, across each layer that it traverses. That is, it provides a combined nodal (NE), and component (cards and ports) view of a service object instance in one screen and/or minimal display footprint. In essence, it is an electronic way of depicting a circuit/multi-layer service instance which, conventionally, service provider operators typically draw out by hand on paper in order to troubleshoot an assurance, provisioning or maintenance issue.

The correlated objects and data items provide an object instance view to facilitate accessing related objects and correlated data of an already selected service/resource object instance for an operator so that the user is able to quickly gather and view all relevant data about the primary object instance without having to open up multiple lists, object details, other windows/screens, and/or applications. It is a combined view for letting a user traverse all relevant information associated or correlated with an object instance from multiple facets and dimensions.

For depicting the topology of a service object instance, the present disclosure addresses or overcomes the shortcomings described above by displaying a map (node/network element view) and card/component (line view) of only the network elements and links that form the current route (and the available backup) as deployed in a manner that is pseudo-physical/geographic (i.e., inter-node distances are not precise, and the service instance path is a best fit straight line approximation—not actual geographical route). The GUI is typically able to display the entire service/circuit in the node/network element view in one screen with only minimal scrolling if any. The individual cards/components are displayed in the line view (which may need to scroll) but the entire line view is also miniaturized (and summarized) in a horizontal visual scrollbar (an end-to-end card view of the entire service/circuit/line, in miniature, that is incorporated into the scroll bar).

The horizontal visual scroll bar allows the entire service/circuit to be visible. In addition, simple state and fault information can be displayed on the scroll bar so that the operator can easily identify which part of the service/circuit/line needs attention. The line view is expandable so that underlying lower layer services, routes, and connections can be displayed which enables and facilitates a drill-down, progressive (disclosure) exposure of functionality. Only the service/circuit object instance (i.e., only the nodes/network elements and links associated with it) is shown in the map/line view which reduces visual complexity since extraneous physical data, NEs, and links that are not relevant to the instance are not shown.

By providing system generated correlated data and related object instances to the primary object instance of interest in the same screen/window/application, the present disclosure improves functionality and performance significantly and improves accuracy. The operator can access related information easily and quickly in the same window without having to cross-reference other systems or printed material and thus perform troubleshooting, maintenance, provisioning, etc. tasks on the primary service object instance much faster. The proposed solution improves the accuracy of the related data and reduces the risk of end-user human lookup errors as the correlated data/related objects are system driven.

Variously, the GUI and visualizations are implemented through one or more servers and optionally through one or more processing devices communicatively coupled to the servers. For example, the subway map and line service view can be implemented through a Software Defined Networking (SDN) controller or application, an orchestration system, etc. The implementations can include Application Programming Interfaces (APIs), REpresentational State Transfer (REST) interfaces, microservices, etc. These implementations can include a) service-to-alarm correlation, b) service-to-supporting service correlation and stitching, c) bearer service-to-upper layer muxed services correlation, and/or d) service-topology hop-by-hop routing and associated port inventory.

Advantageously, the subway map and line service view is utilized by service providers, carriers, enterprise operators, etc. for multi-layer service management, physical circuit depiction, alarm-to-service and service-to-alarm correlation over time, etc. The subway map and line service view better equip customers to manage multi-layer communications networks with respect to troubleshooting, diagnostics, re-routing, service assurance, service maintenance, etc.

Power Readings Graph, Spectral Analysis Graph, and Spectral Allocation Graph

Again, specific details, attributes, particulars, etc., of a specific managed object instance, are viewed in an object details page in the GUI and visualizations. This page provides all relevant data about the selected object instance in a full GUI screen real estate. It helps users understand the object instance, troubleshoot, perform actions, edit and check out related data/information to the object. When the specific object instance selected is an optical/photonic service or link some very specific optical sub-views, and visualization graphs are provided from the main view canvas/tab to facilitate performance management and diagnostic tasks.

In addition to the subway map and line service view and the correlated objects and data item views, the GUI and visualizations can include specific views related to the optical or photonic layer including a power readings graph, a spectral analysis graph, and a spectral allocation graph.

The power readings graph displays power measurements in each data transport direction independently, e.g., including the last day's minimum and maximum values, for any photonic service. The power readings graph includes the following features:

a. A power-type selector is provided which easily lets a user display "Total Power" or "Per Channel Power," or "OSC Power" (Optical Service Channel).

b. The X-axis of the graph displays the cards along the path that map to the data points of the power readings in the graph above in the main canvas.

c. A Data Panel that displays the specific data related to a selection from the graph canvas. If nothing is selected on the graph canvas, the panel displays the list of all anomalies detected by the system along the path's graph.

d. Historical power measurements are accessible for a given measurement that the user wants to investigate further.

e. A horizontal visual scrollbar: an end-to-end card view of the entire photonic path (in miniature) that is incorporated into the horizontal scrollbar.

The Spectral Analysis Graph for an optical link displays a real-time line graph of Spectral Density (SD) power for all frequency data-points and per channel power for each Sub-network Connection (SNC) (an optical SNC can be referred to as a Network Media Channel (NMC)), for example, placed at the center frequency for the associated SNC/NMC, in a flex-grid enabled optical network. By default, both the Tx and Rx datasets are overlaid on each graph. Users can selectively turn each off to focus on one dataset at a time via a disclosure tab. Note, removing Tx/Rx from view would also remove the associated per channel data-points from the view. The spectral analysis graph can include the following features:

a. Spectral analysis graphs that display power per frequency line graphs overlaid with the spectral allocation of the span in terms of used/available/planned spectrum blocks. Also, shows per channel power. There can be one graph per photonic direction.

b. Selectable SNC/SNCG (SNC Group) to display in-context highlighted spectral section highlights SNC and SNCG.

c. Historical measurements for SD and NMC power are accessible for any specific frequency point selected from within the main current spectral analysis graph to drill into the history of a particular frequency of interest.

d. A details panel that contains flex-grid related information about the selected part of the spectrum. If nothing is selected, it shows summary data about the spectrum.

The Spectral Allocation Graph displays the full spectral allocation for each photonic link in a selected path. The spectral allocation graph can include the following features:

a. Spectral allocation graph that displays blocks of spectrum that are allocated (used, available, planned) between/across network elements for a given photonic link. Y-axis: tracks spectrum frequency, X-axis: tracks the OMS spans between network elements along the path.

b. Selected SNC/SNCG: In-context highlighted spectral section for the photonic service object. Visually differentiate between SNC and SNCG.

c. Add-drop indicators to indicate wherever the spectrum is added/dropped at either end of a block of spectrum.

d. Regenerator indicators to indicate wherever the spectrum is regenerated (optical-to-electrical-to-optical conversion) in an end to end photonic service that spans electrical regens upon selection of a part of the spectrum.

e. A horizontal visual scrollbar provides an end-to-end card view of the active photonic path (in miniature) that is incorporated into the horizontal scroll bar to anchor the spectral allocation for each Optical Multiplex Section (OMS) span.

f. A details panel split into two tabs to show a hierarchical listing of the SNCGs along the same path and a detailed spectral allocation for the part of the spectrum in focus.

The power readings graph improves upon previous approaches by a. integrating into a single view multiple power readings across a path for both photonic directions simultaneously, b. visualizing the current readings as well as the last day's minimum and maximum readings to help identify if transient power drops were encountered within the day which may be picked up by network operators, and c. integrating access to historical readings for a specific point of the path that is of interest from the context of the graph. For certainty, the time period relevant for transient monitoring can be different than one day.

The spectral analysis graph can be offered as a software solution remotely accessible via a networkwide NMS solution, offers a network-level view that remotely gathers and displays data from each end of an optical link to portray all this information to the user at once for comparison purposes, and combines performance data across the spectrum with used, available, planned allocation overlays.

The spectral allocation graph retrieves and displays spectral allocation from a real managed network, which allows it to be used during real-time provisioning and online service planning (service reservation). Upon selection of a specific section of the spectrum, regeneration sites within a longer photonic service path are highlighted (and they may change spectral use).

These optical sub-views and visualizations address requirements of service providers who need to understand the power readings along the path of a photonic service; perform a spectral analysis of a photonic link; and/or view the spectral allocation of a photonic link. These optical sub-views and visualizations better equip operators to manage optical networks, especially new flexible grid networks with respect to troubleshooting, diagnostics, re-routing, service assurance, service maintenance, etc.

Multi-Layer Network

FIG. 1 is a network diagram of a network 100 with five interconnected sites 110*a*, 110*b*, 110*c*, 110*d*, 110*e*. The sites 110 are interconnected by a plurality of links 120. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, MPLS) and/or Layer 3 (e.g., IP) where the switch would normally be called a router. For simplicity of disclosure herein, it will be referred to as a switch in all cases. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of skill in the art will recognize that the switch 122 and the WDM network elements 124 may be realized in the same network element. The photonic layer and the photonic control operating thereon can also include intermediate amplifiers and/or regenerators on the links 120 which are omitted for illustration purposes. The network 100 is illustrated, for example, as an interconnected mesh network, and those of skill in the art will recognize the network 100 can include other architectures, with additional sites 110 or with fewer nodes sites, with additional network elements and hardware, etc.

The sites 110 communicate with one another optically over the links 120. The sites 110 can be network elements which include a plurality of ingress and egress ports forming the links 120. Further, the nodes 110 can include various degrees, i.e. the site 110*c* is a one-degree node, the sites 110*a*, 110*d* are two-degree nodes, the site 110*e* is a three-degree node, and the site 110*b* is a four-degree node. The number of degrees is indicative of the number of adjacent nodes at each particular node. The network 100 includes a control plane 140 operating on and/or between the switches 122 at the sites 110*a*, 110*b*, 110*c*, 110*d*, 110*e*. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 140 can utilize any type of control plane for controlling the switches 122 and establishing connections.

The optical network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, Variable Optical Attenuator (VOA) settings, Wavelength Selective Switch (WSS) parameters, etc. The photonic control 150 can also be adapted to perform network optimization on the links 120. This optimization can also include re-optimization where appropriate. In an embodiment, the photonic control 150 can adjust the modulation format, baud rate, frequency, wavelength, spectral width, etc. of the dynamic optical transceivers in addition to the aforementioned components at the photonic layer. In an embodiment, the photonic control 150 can include support for capacity mining where the physical parameters are adjusted to provide increased capacity without requiring additional hardware. That is, the capacity mining supports an increase in capacity based on software and/or firmware provisioning of existing hardware, such as to change modulation format, baud rate, spectral occupancy, etc. This capacity mining can be based on network operating parameters, i.e., how much margin is available. For both the control plane 140 and the photonic control 150, associated controllers can be either centralized, distributed, or embedded in the network elements.

The optical network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the optical network 100). Work on SDN calls for the ability to centrally program provisioning of forwarding on the optical network 100 in order for more flexible and precise control over network resources to support new services. The SDN controller 160 is a processing device that has a global view of the optical network 100. Additionally, the SDN controller 160 can include or connect to SDN applications which can utilize the data from the SDN controller 160 for various purposes.

There are various techniques for data communications between the switches 122, the WDM network elements 124, the control plane 140, the photonic control 150, and the SDN controller 160 for OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols. Collectively, these techniques for an OAM&P communications network over in the network 100. The OAM&P communications network may employ switching and/or routing protocols to provide resilient communications to all network elements 122, 124 in the event of a failure (e.g. fiber cut or equipment failure).

In an embodiment, the switches 122 and/or network elements 124 are configured to communicate with one another in the network 100 to operate the control plane for control plane signaling. This communication may be either in-band or out-of-band. For SONET networks and similarly for SDH networks, the switches 122 and/or network elements 124 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the switches 122 and/or network elements 124 can include an in-band signaling mechanism utilizing OTN overhead. The General Communication Channels (GCC) defined by ITU-T Recommendation G.709 are in-band side channels used to carry transmission management and signaling information within Optical Transport Network elements.

Figure 2:
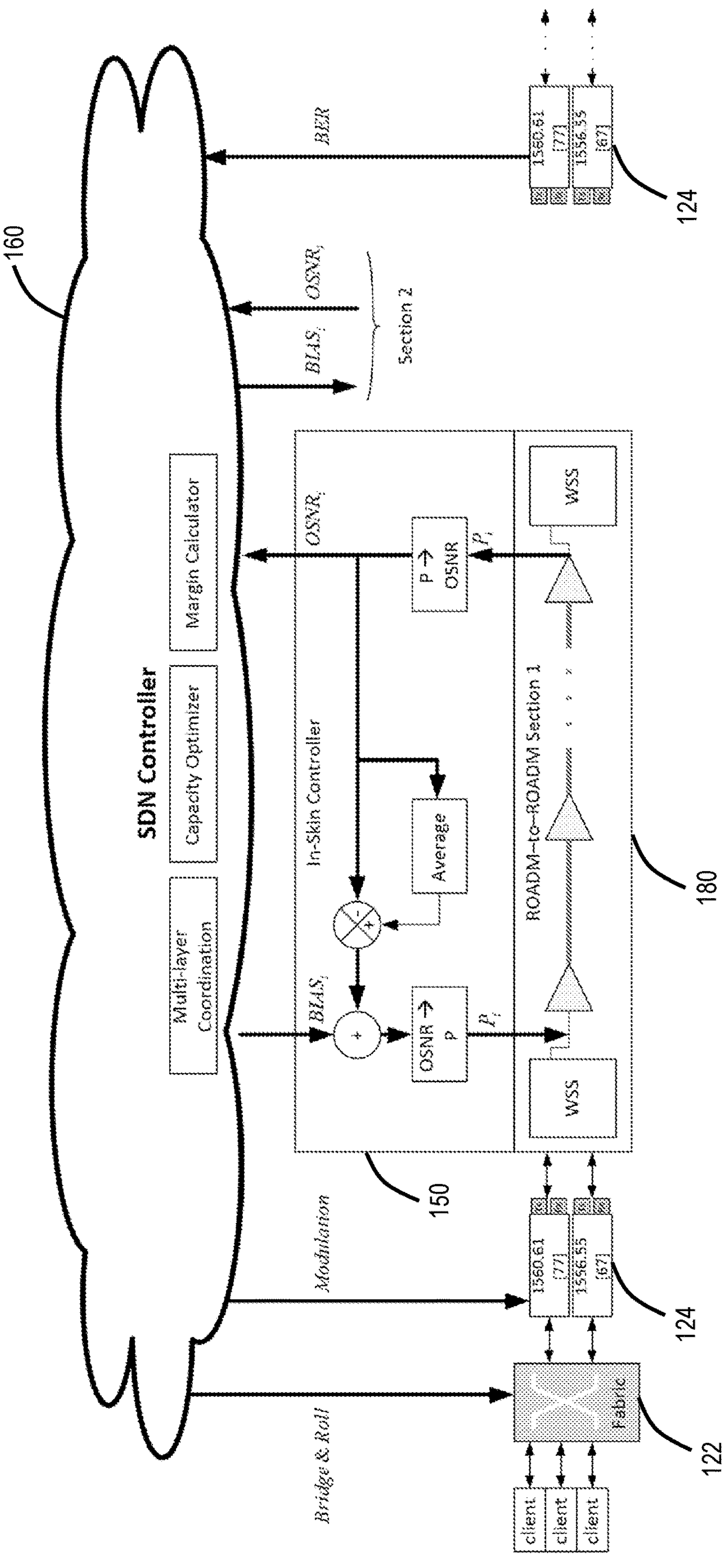
FIG. 2 is a network diagram of another optical network illustrating additional details of a control plane, photonic control, and an SDN controller.

FIG. 2 is a network diagram of another optical network illustrating additional details of the control plane 140, the photonic control 150, and the SDN controller 160. The example of FIG. 2 illustrates a switch 122 that connects to a WDM network element 124 which connects to another WDM network element 124 via a ROADM-to-ROADM section 180. The optical section 180 represents a portion of the network 100 between spectrum add/drop points, e.g., ROADMs. The photonic control 150 can be an in-skin (integrated into a network element) controller which operates with the SDN controller 160.

Again, increasing demand for data bandwidth is challenging network operators to find new ways to monetize their network infrastructure. Previous work has focused on the ultimate capacity of networks in a static manner, driving the uncertainty out of the calculation of link budgets and therefore increasing the allowable capacity. Continuous capacity maximization promised to deliver more than these static methods but also drives the need for network reconfiguration. The SDN controller 160, with multi-layer coordination, is employed to solve this problem. This type of SDN controller 160 is different from those employed in pure digital networks like those at Layer 2, in that the Layer 0 SDN controller plays a part in margin determination and adjustment.

FIG. 2 illustrates a control environment which was used in a field trial and which is applicable to the methods and systems herein. An in-skin controller (associated with a network element) retrieves the per-channel power measurements, Pi, of channels transiting a ROADM to ROADM section (a section is all-optical). These per channel measurements are used to estimate the incremental Optical Signal-to-Noise Ratio (OSNR) for each channel, OSNRi. The in-skin controller then attempts to equalize the OSNR of each channel to that of the average of all channels.

The function of margin adjustment in capacity mining is provided by adjusting a per-channel OSNR bias, BIASi, which allows the SDN controller 160 to adjust individual channels up or down in power. This per-channel bias can also be used to fine-tune the system for the current operating conditions. For instance, in the absence of full-fill one can choose to separate wavelengths in the band thereby reducing the effect of Cross Phase Modulation (XPM). This results in a higher optimal launch power for the channel which can be achieved by adjusting the bias for that channel. The net result is that one can optimize the SNR of the current set of channels with the aim to deliver additional capacity per transponder/modem. This is the function of the Capacity Optimizer in the SDN controller 160 which ultimately controls the modulation format and therefore the capacity of the modems connected to the line system. The transponders can be optical modems which have flexible modulation formats.

Server

Figure 3:
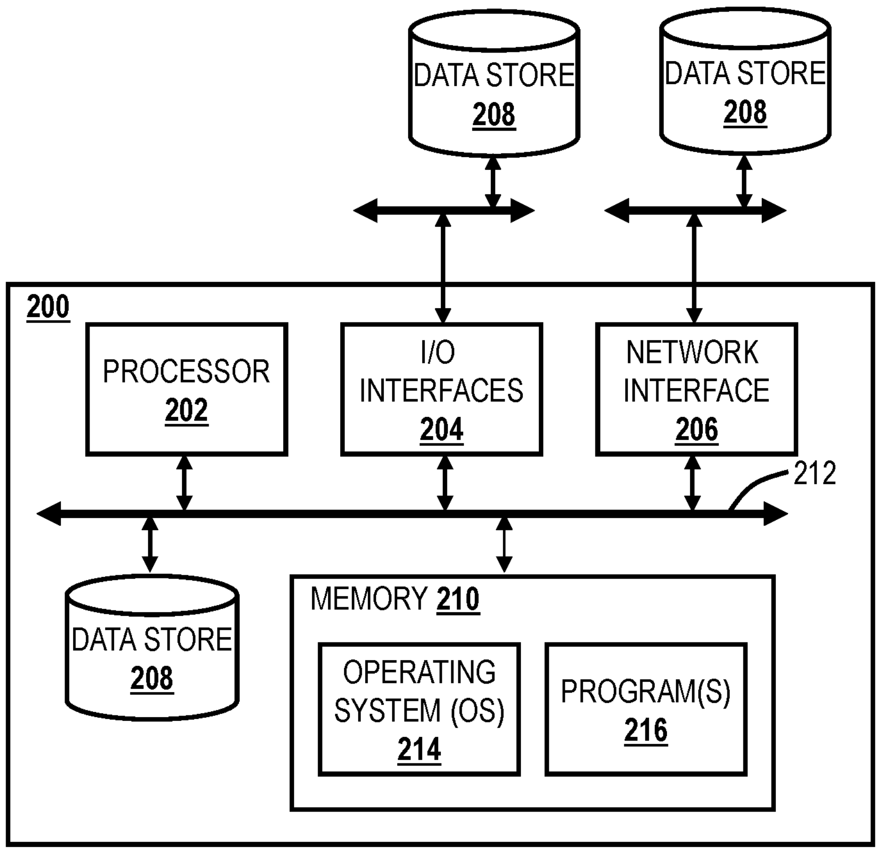
FIG. 3 is a block diagram of a server 200 which may be used to implement a management system, the SDN controller, etc.

FIG. 3 is a block diagram of a server 200 which may be used to implement a management system, the SDN controller 160, etc. In the systems and methods described herein, the server 200 can be used to present a User Interface (UI) or Graphical UI (GUI) to an operator for accomplishing the various processes described herein. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The server 200 can be connected to the OAM&P communication network in the network 100, such as via the network interface 206. This connection provides a conduit through which the hardware in the network 100 can be programmed following instructions from the SDN controller 160, the control plane 140, and/or the photonic control 150.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Subway Map and Correlated Objects View

The following FIGS. illustrate examples of the GUIs associated with the subway map and correlated objects view to provide methods, systems, and a GUI for the visual topology of an end-to-end service instance across a multi-layer network along with embedded access to correlated objects and data.

Figure 4:
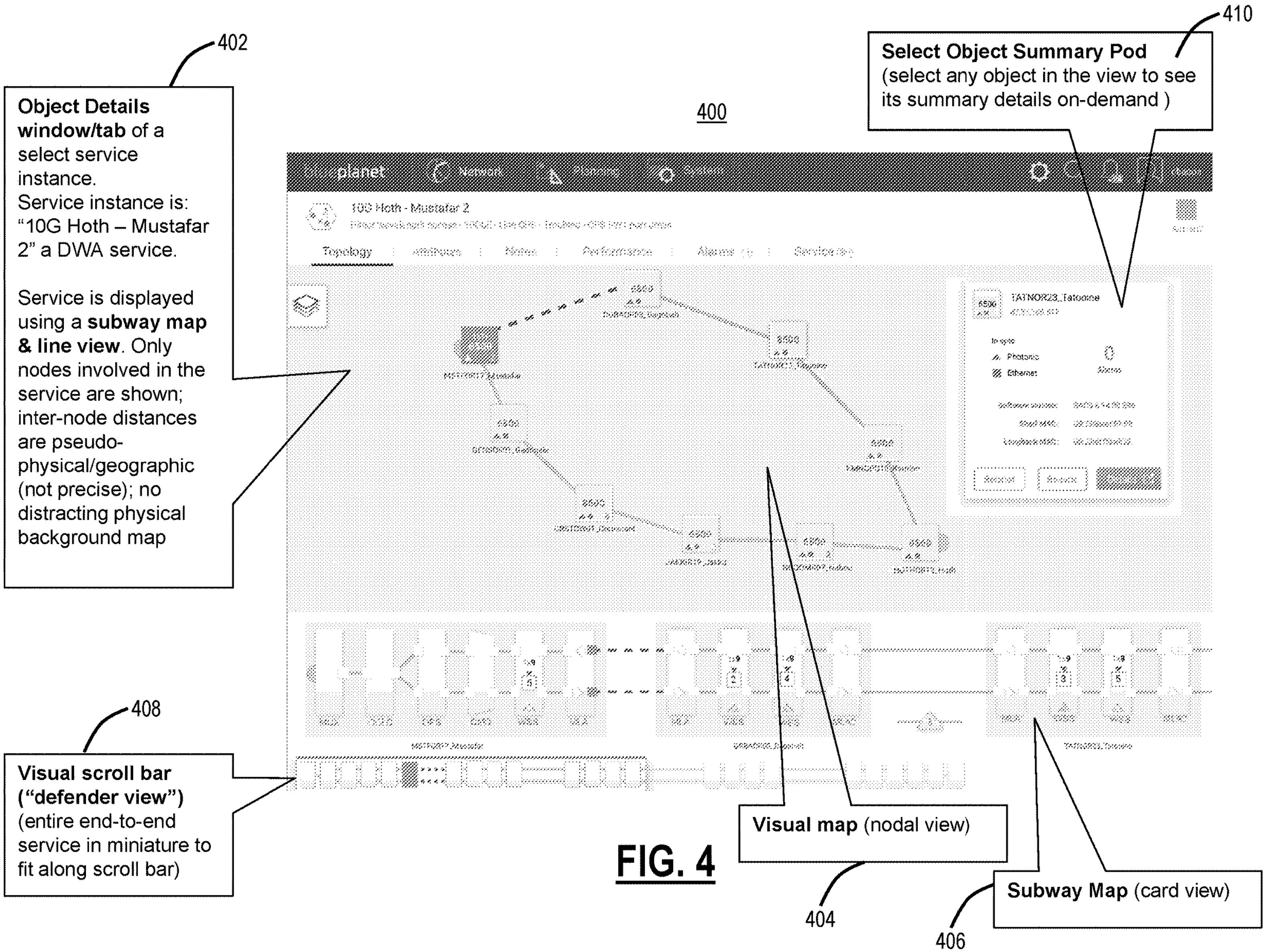
FIG. 4 is a screenshot of a subway map and line service view.

FIG. 4 is a screenshot of the subway map and line service view 400. The subway map and line service view 400 includes an object details view 402, a network map 404 for a nodal view, a subway map 406 for a card view, a visual scrollbar 408, and a selected object summary pod 410. The network map 404 provides a nodal, network view from where the object details view 402 can be selected of a service instance, e.g., "10 G Hoth-Mustafar 2" a Direct Wavelength Access (DWA) service. Once selected in the network map 404, the service instance is displayed in the subway map 406 for the card view and only nodes involved in the service are shown; inter-node distances are pseudo-physical/geographic (not precise) with no distracting physical background map. Thus, in this screenshot, a user can see the network view in the network map 404 and the card details in the subway map 406.

The visual scrollbar 408 displays the entire end-to-end service in miniature to fit along scroll bar in a card detail view with the portion explicitly detailed in the subway map 406 highlighted. A user can change the highlight in the visual scrollbar 408 to change the display of the subway map 406. The selected object summary pod 410 is a pop-up window which displays details of a selected object in the subway map 408, e.g., a network element at a site labeled Tatooine.

Figure 5:
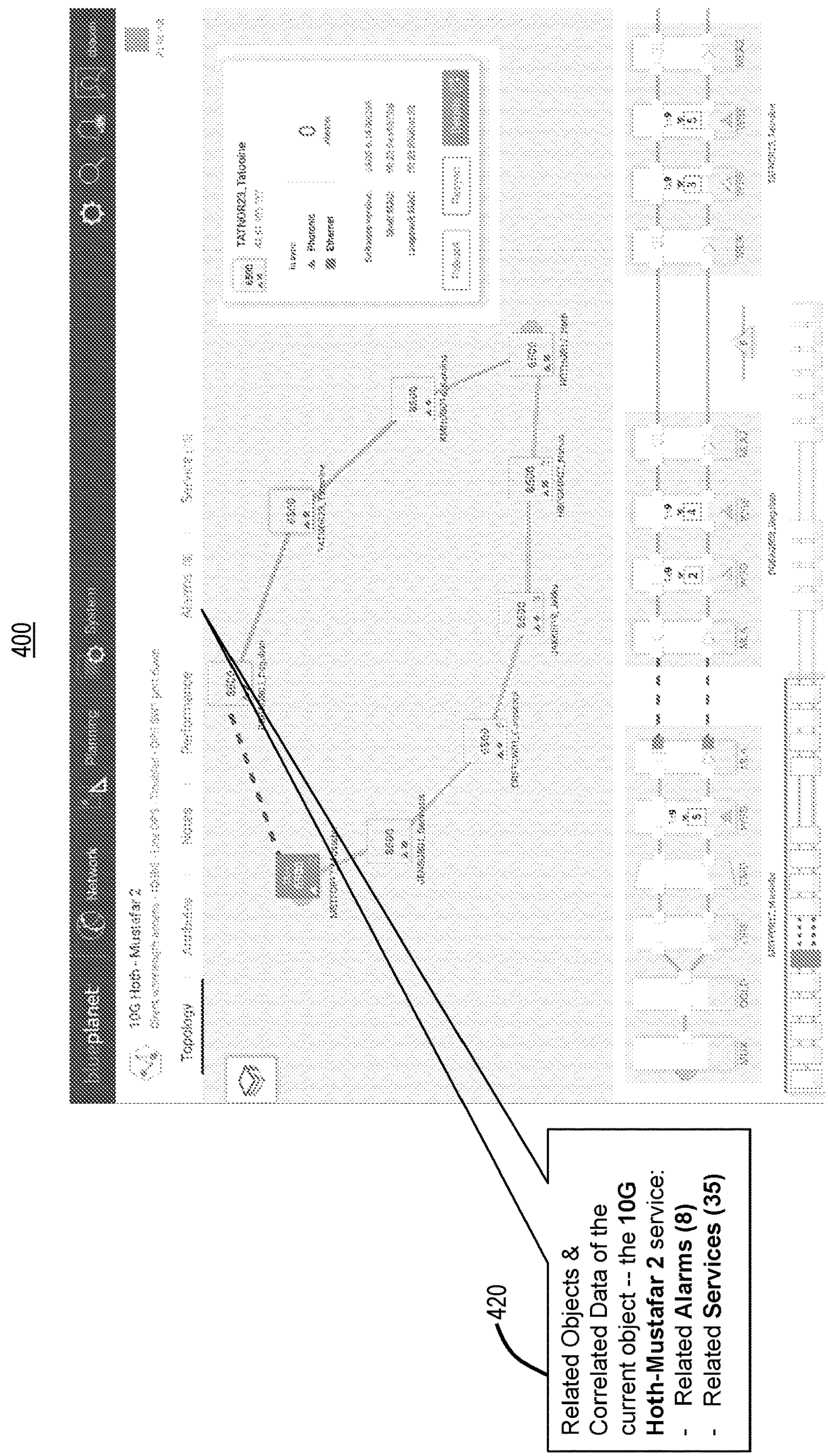
FIG. 5 is a screenshot of correlated objects and data items.

FIG. 5 is a screenshot of the correlated objects and data items. FIG. 5 is the same screenshot as FIG. 4 highlighting related objects and correlated data 420 of the currently selected object, namely the 10 G Hoth-Mustafar 2 service. This selected object has (8) alarms and (35) services associated with it.

Figure 6:
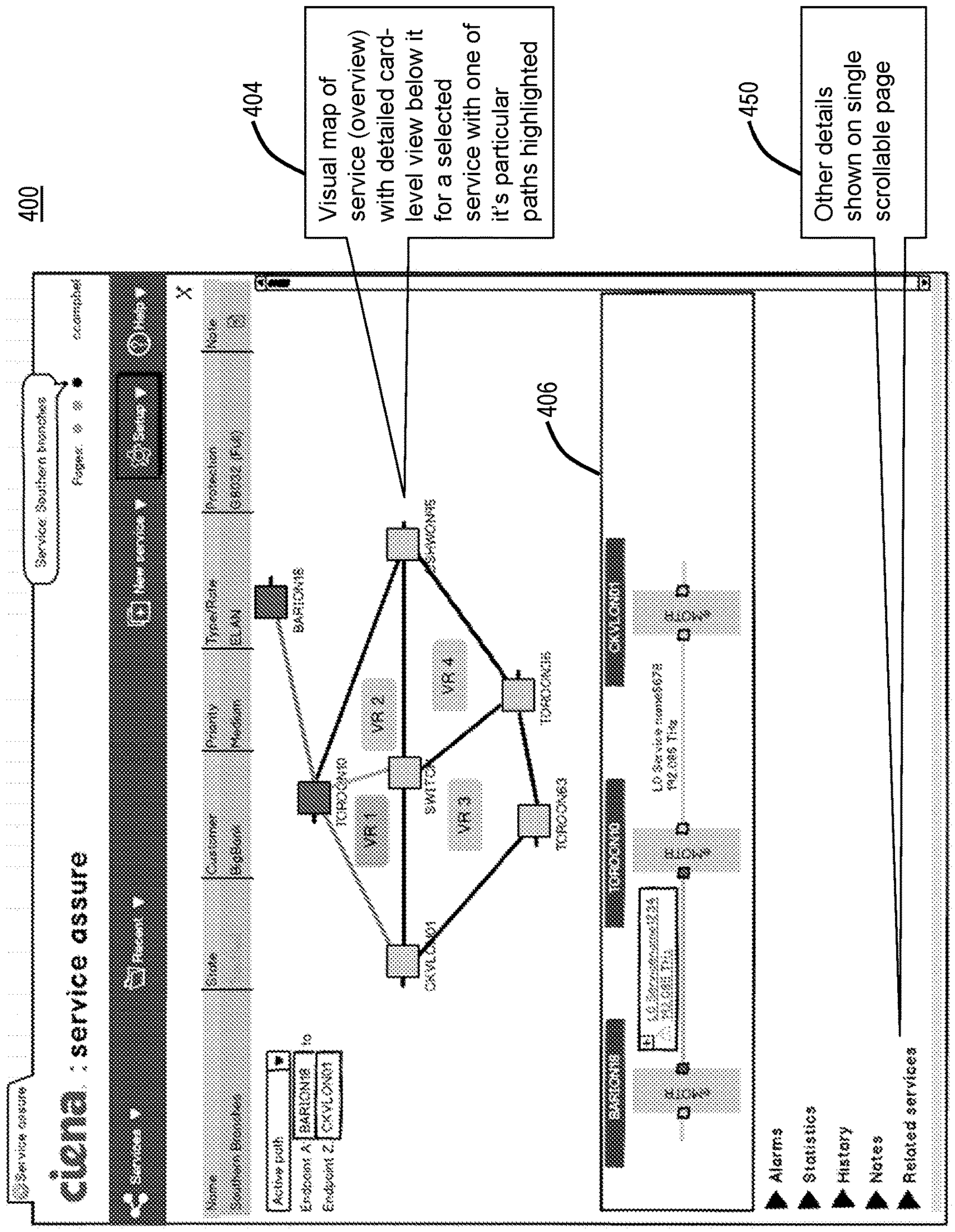
FIG. 6 is another screenshot of the subway map and line service view.

FIG. 6 is another screenshot of the subway map and line service view. FIG. 6 illustrates another variation of the subway map and line service view 400. In FIG. 6, the subway map and line service view 400 includes the network map 404, the subway map 406, and other details 450. Again, a user can select a service in the network map 404 for a corresponding card level display in the subway map 406. The other details 450 can include alarms, statistics, history, notes, related services, etc.

Figure 7:
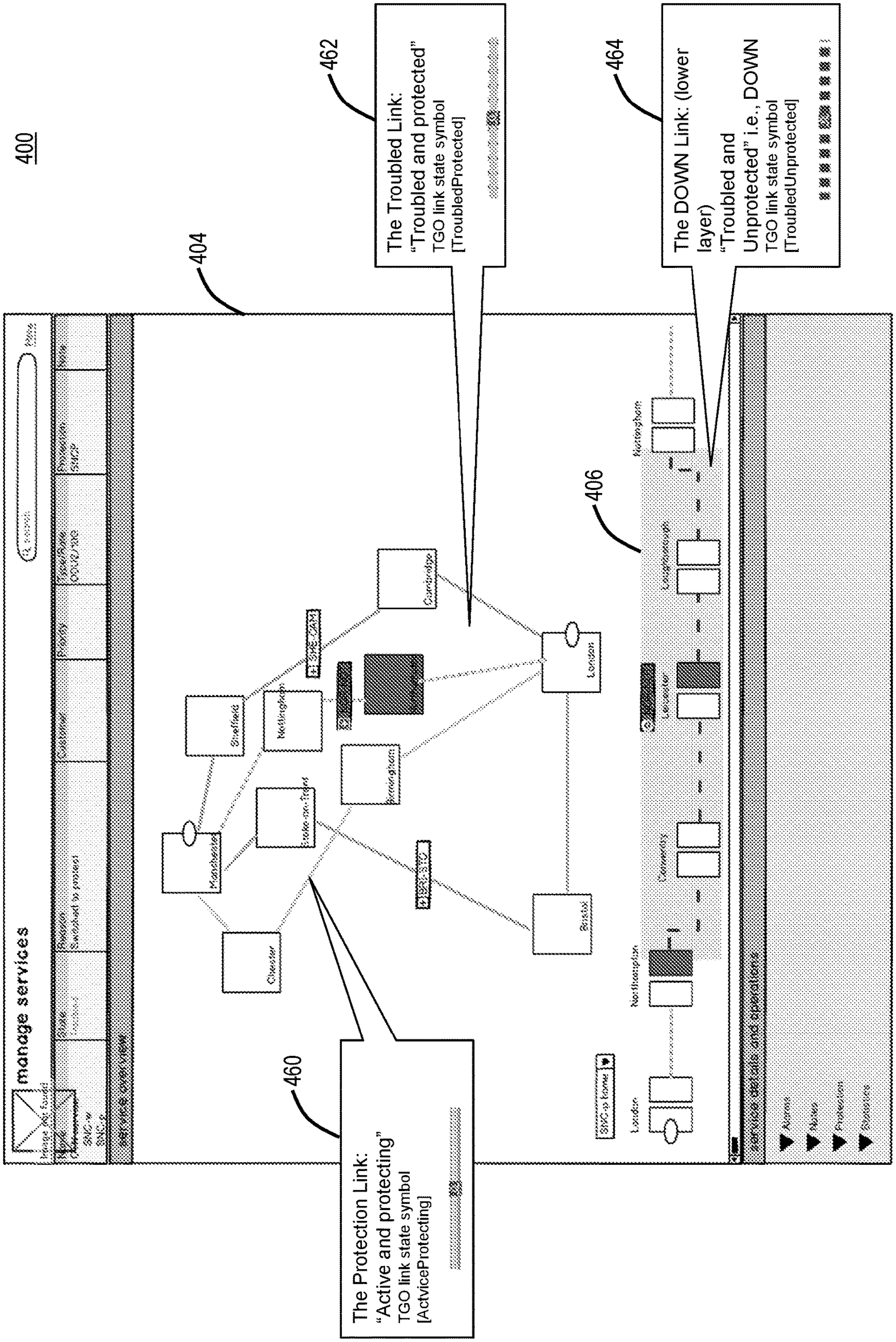
FIG. 7 is yet another screenshot of the subway map and line service view.

FIG. 7 is yet another screenshot of the subway map and line service view. FIG. 7 illustrates a display related to a protection link 460 and a troubled link 462. A down link 464 based on the troubled link 462 is shown in the subway map 406.

Figure 8:
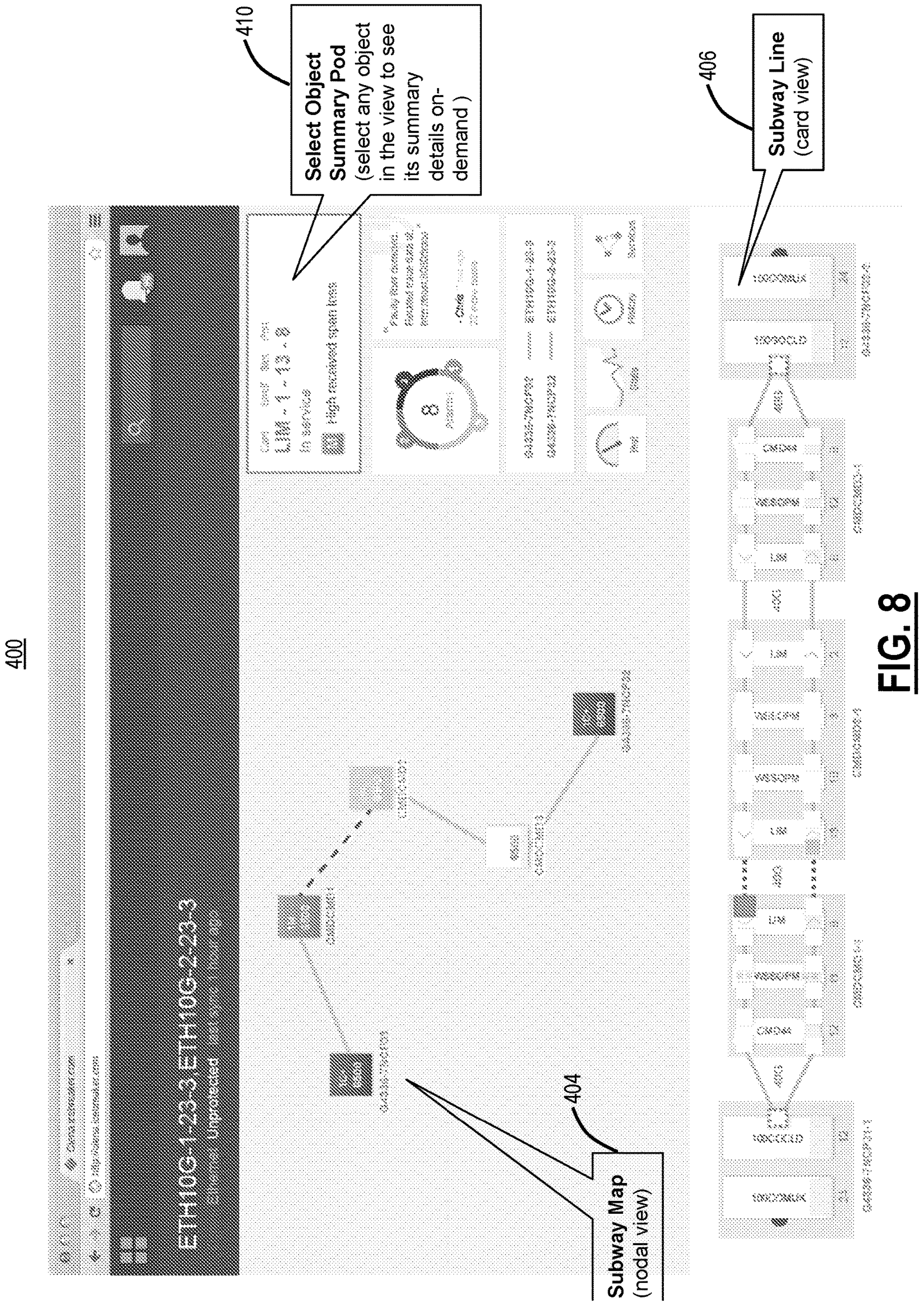
FIG. 8 is yet another screenshot of the subway map and line service view.

FIG. 8 is yet another screenshot of the subway map and line service view. FIG. 8 illustrates additional details of the selected object summary pod 410 in addition to the network map 404 and the subway map 406. The selected object summary pod 410 provides details related to tests, statistics, history, services, etc. for the selected object.

Figure 9:
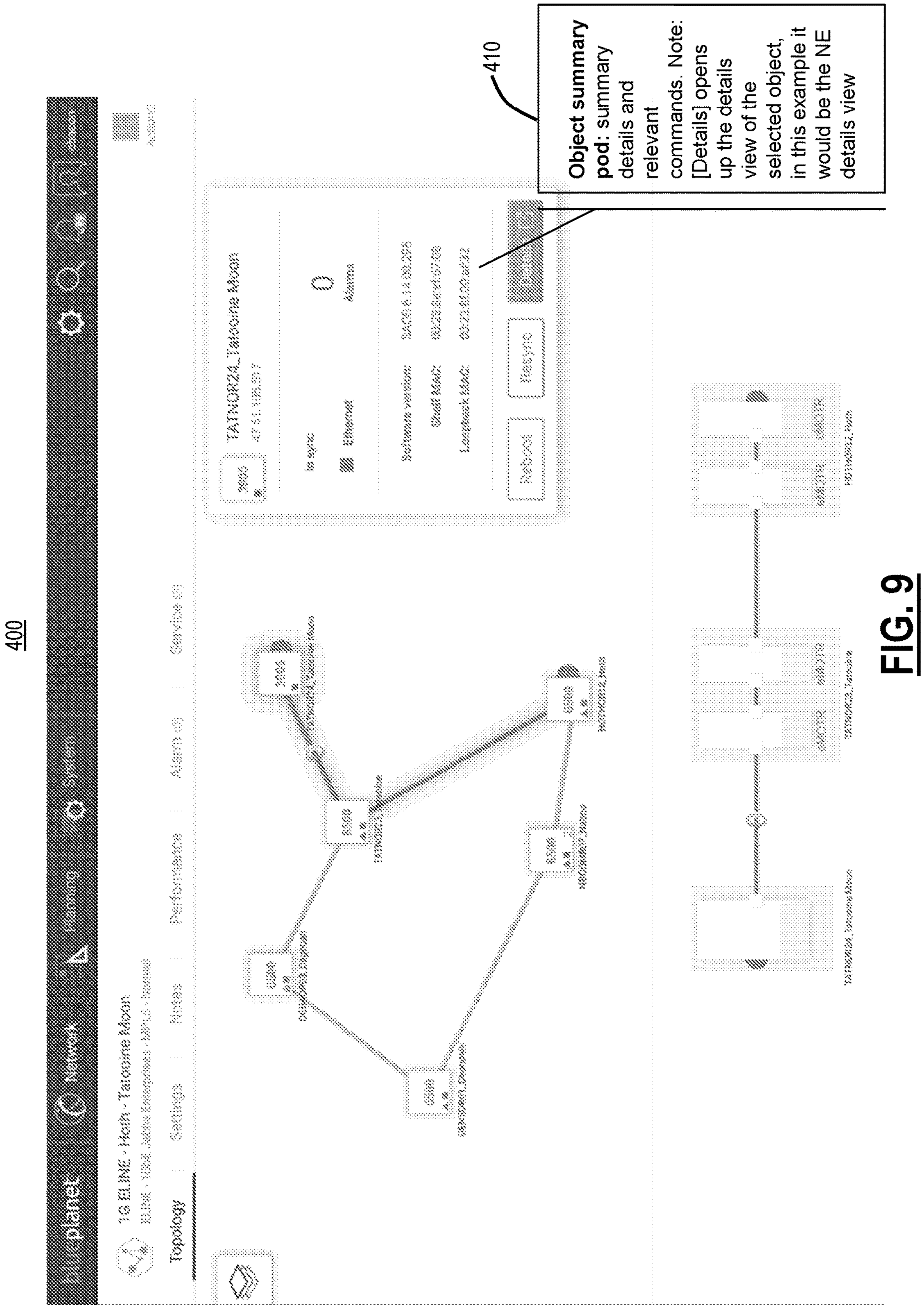
FIG. 9 is yet another screenshot of the subway map and line service view.

FIG. 9 is yet another screenshot of the subway map and line service view. FIG. 9 illustrates additional details of the selected object summary pod 410. The selected object summary pod 410 includes buttons to reboot, resync, and bring up additional details of a selected object. The details button opens up the details view of the selected object, in this example it would be the NE details view.

Figure 10:
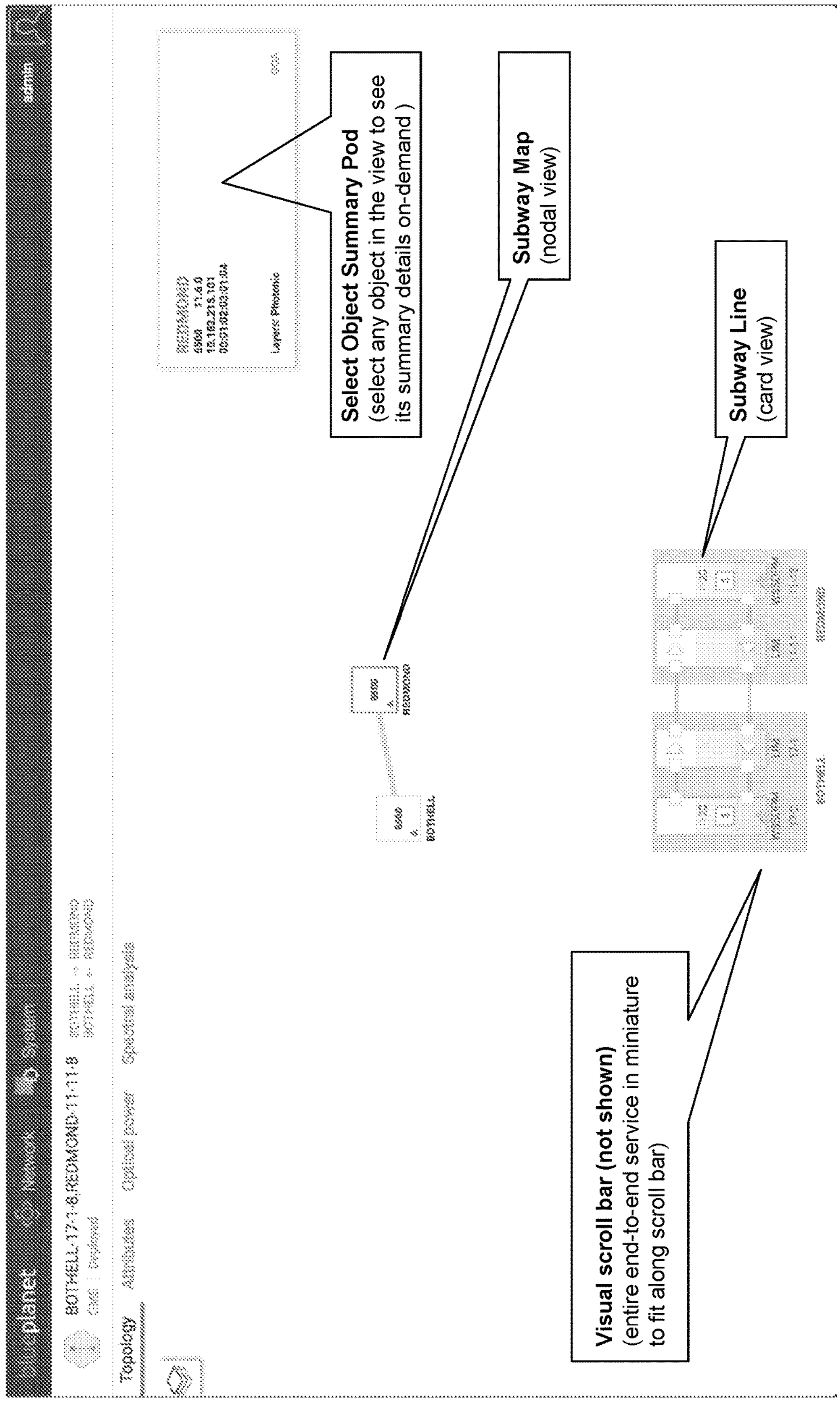
FIG. 10 is yet another screenshot of the subway map and line service view.

FIG. 10 is yet another screenshot of the subway map and line service view. FIG. 10 illustrates a simplified network with just two nodes.

Figure 11:
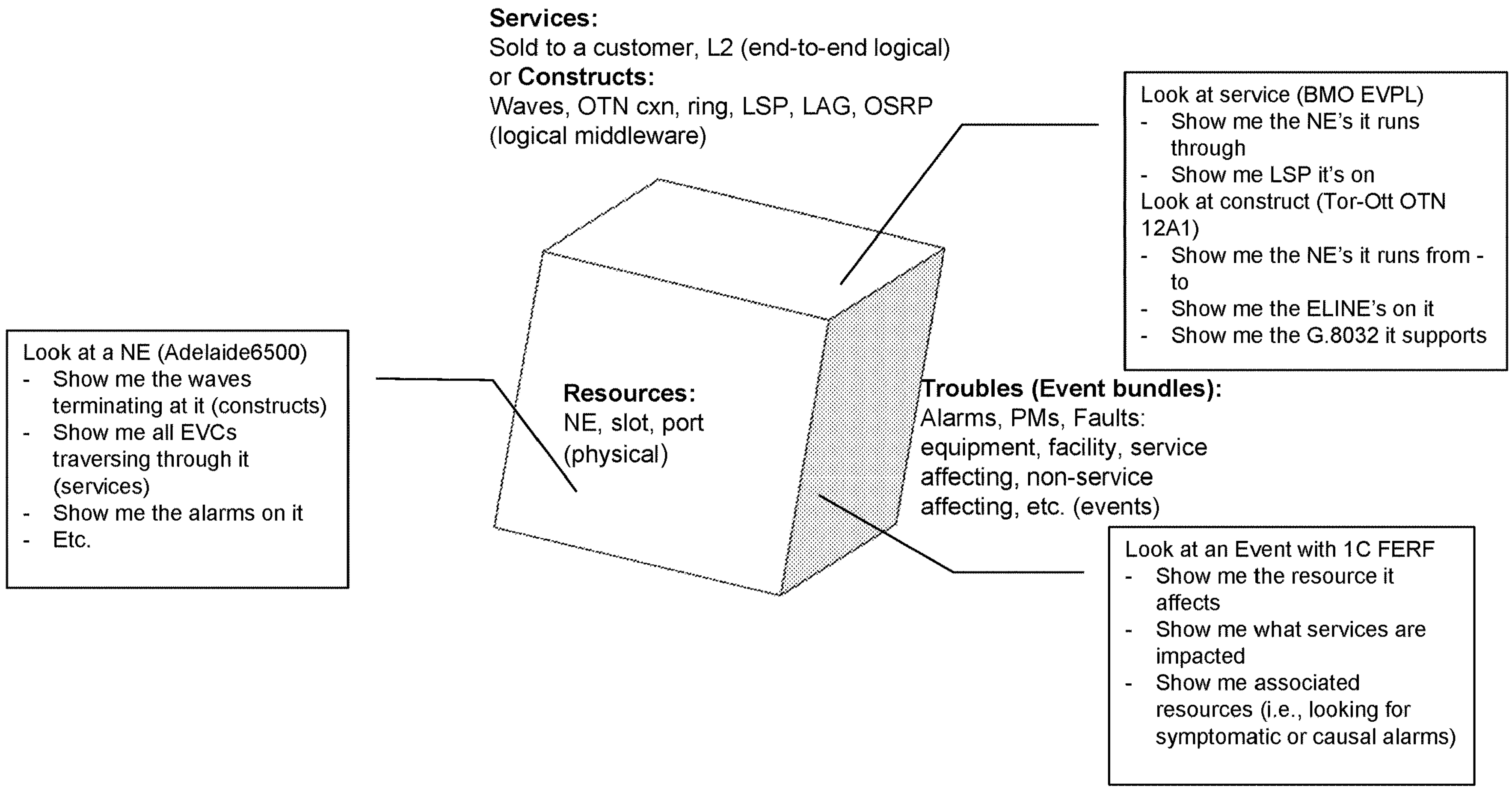
FIG. 11 is a logical diagram of a navigation model for correlated objects and data items.

FIG. 11 is a logical diagram of a navigation model for correlated objects and data items. Specifically, the navigation model can be logically viewed as a multi-faceted cube view into a database of services, resources, and network entities scoped to a user ID. Again, the network 100 is a multi-layered network and a service can have resources at the different layers (wavelengths, Ethernet Virtual Circuits (EVCs), etc.). The various objects for a service are correlated between services/constructs, resources, and troubles/events.

Figure 12:
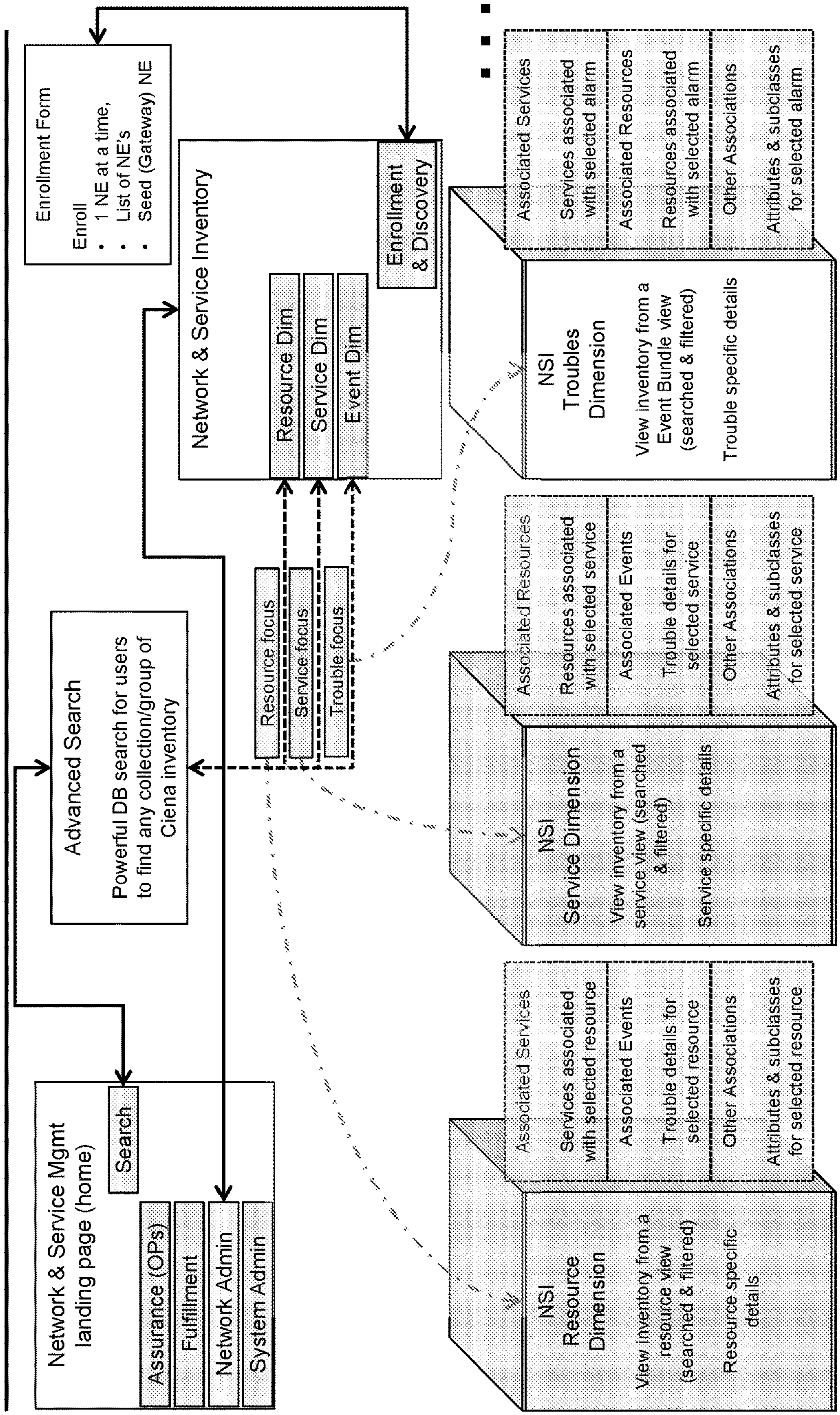
FIG. 12 is a diagram of a proposed navigation model in major functional areas for the correlated objects and data items.

FIG. 12 is a diagram of a proposed navigation model of major functional areas of the correlated objects and data items. FIG. 12 expands on the navigation model in FIG. 11 illustrating relationships between the resources, service, and troubles dimensions.

Figure 13:
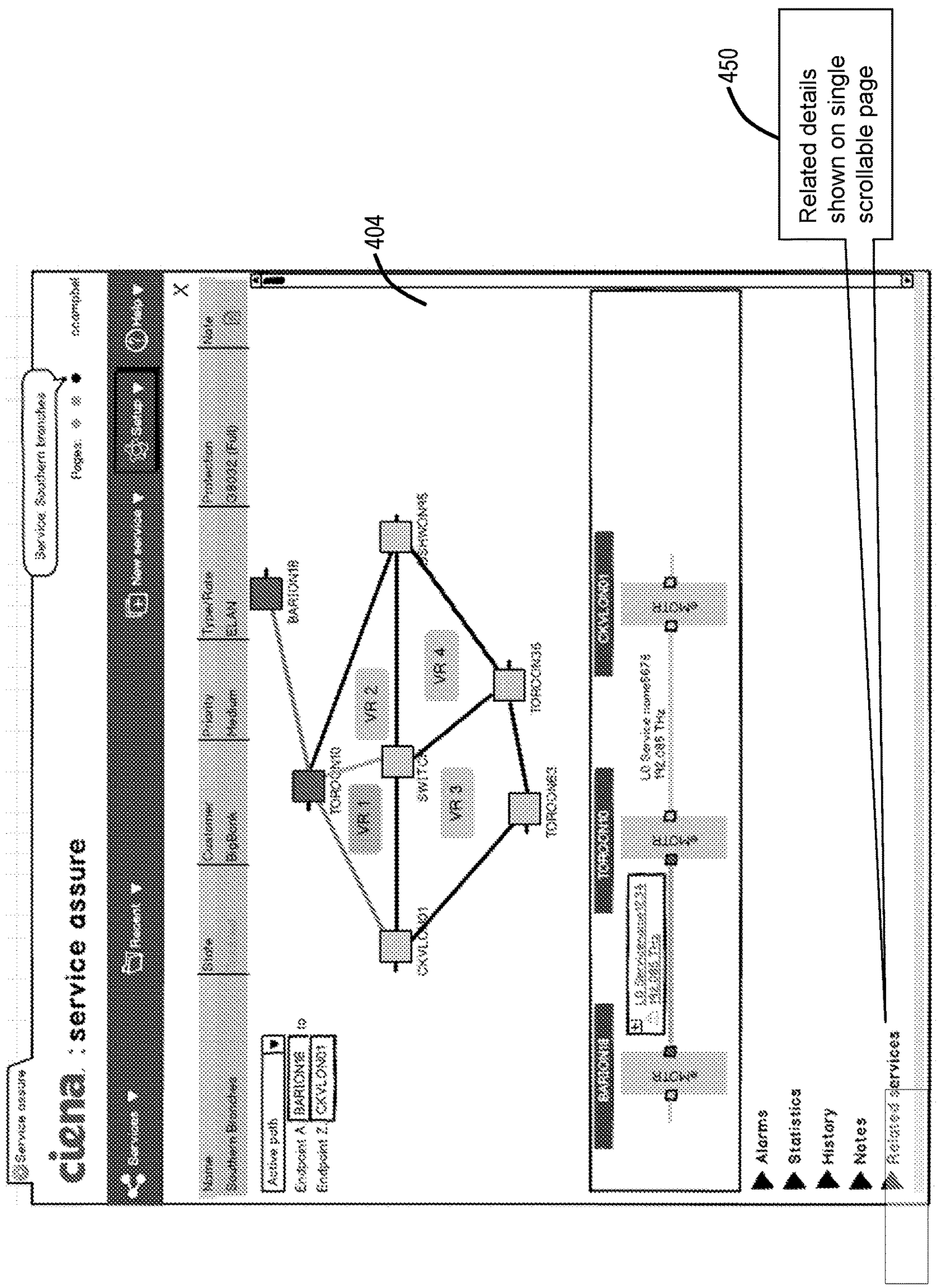
FIG. 13 is a screenshot of correlated objects and data items.

FIG. 13 is a screenshot of correlated objects and data items. Again, the details 450 enable visualization of the alarms, statistics, history, notes, related services, etc. of a selected object in the network map 404.

Figure 14:
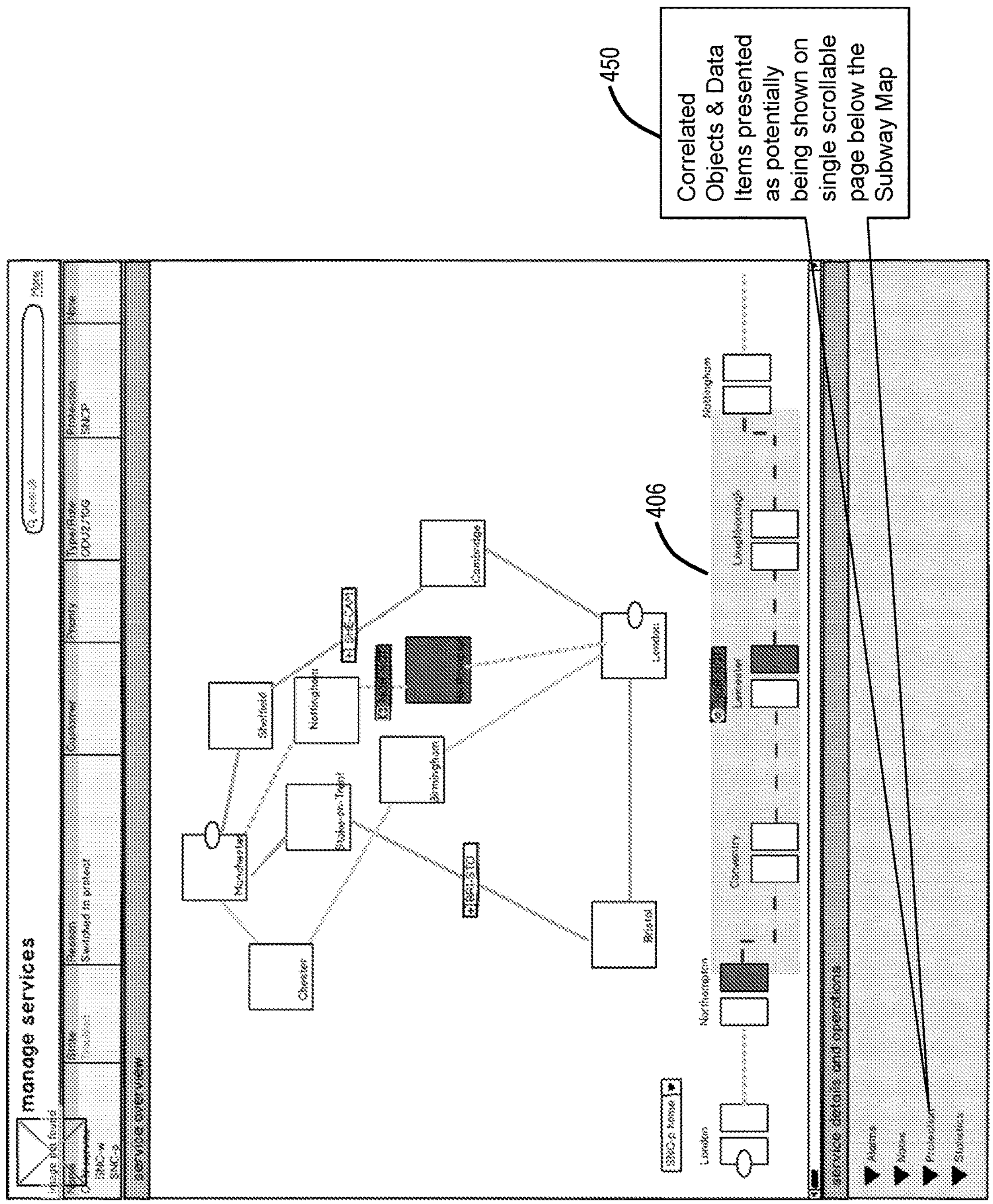
FIG. 14 is another screenshot of the correlated objects and data items.

FIG. 14 is another screenshot of the correlated objects and data items. Here, the details 450 can be below the subway map 406 as a single scrollable page.

Figure 15:
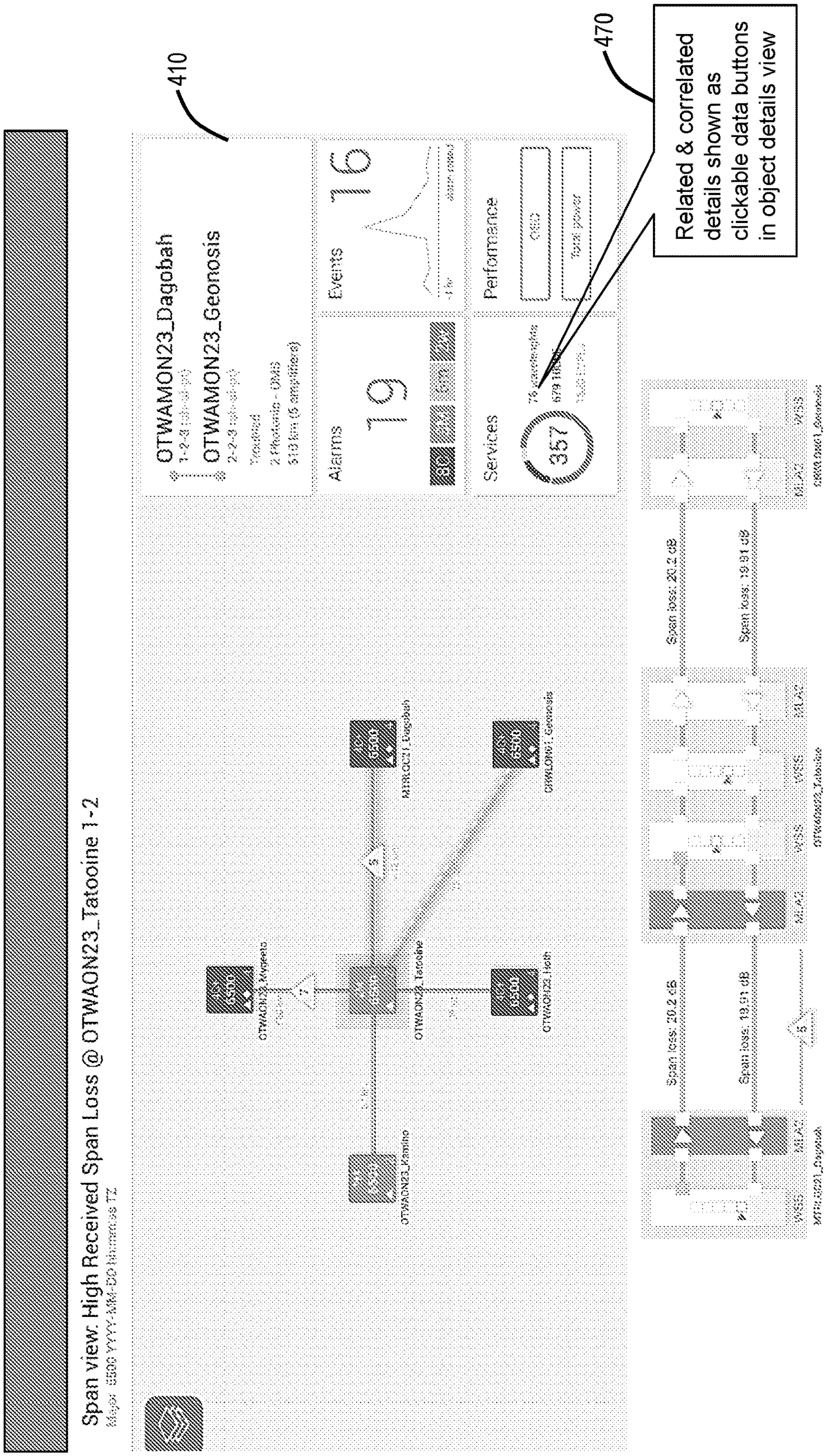
FIG. 15 is a screenshot of the correlated objects and data items with the subway map and line service view.

FIG. 15 is a screenshot of the correlated objects and data items with the subway map and line service view. Here, the selected object summary pod 410 can display various related and correlated details 470 such as services, performance, alarms, events, etc.

Figure 16:
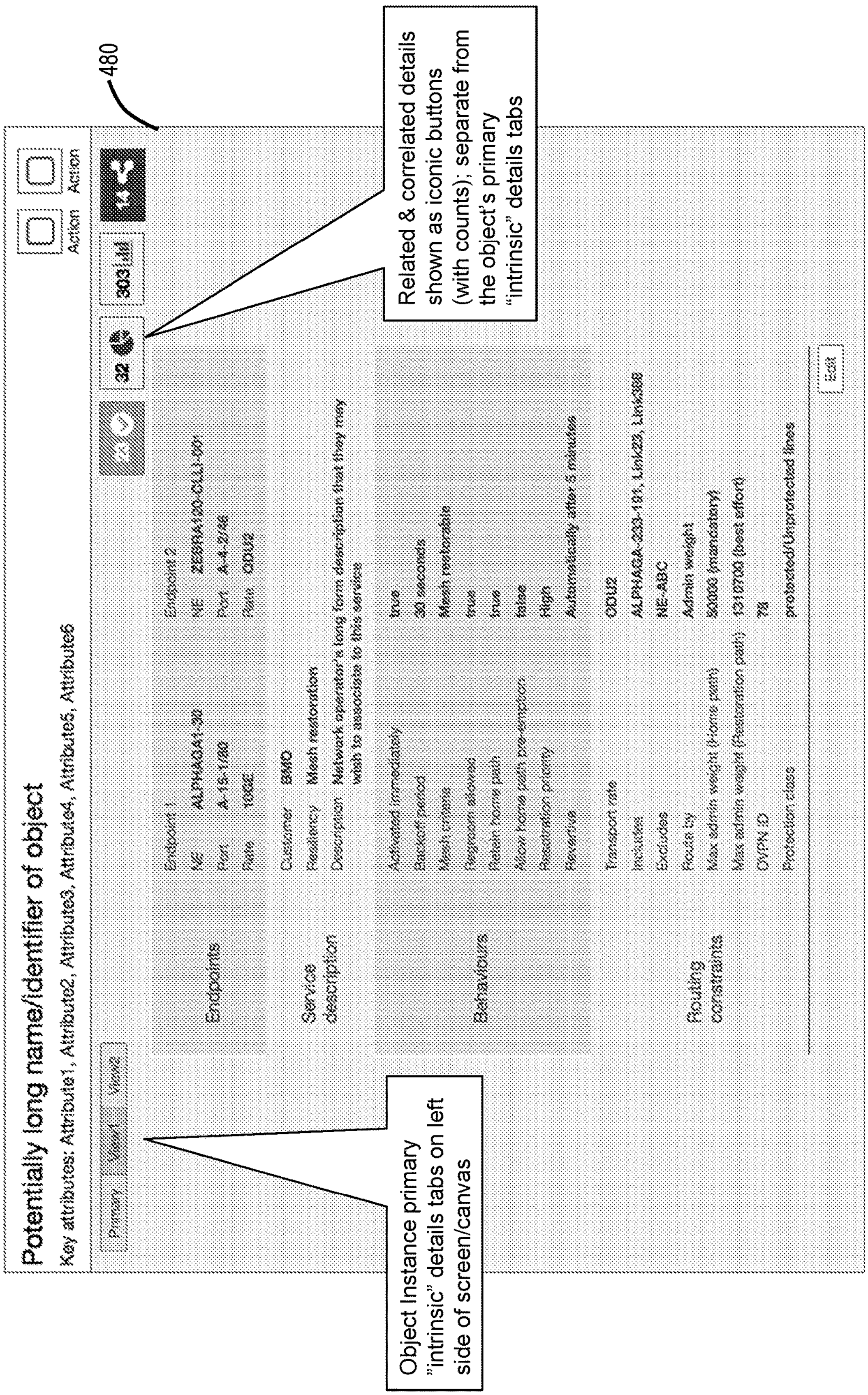
FIG. 16 is yet another screenshot of the correlated objects and data items.

FIG. 16 is yet another screenshot of the correlated objects and data items. Specifically, FIG. 16 illustrates object details 480 of the objects and correlated data 420. In this example, the object details 480 are for an optical service (ODU2) between two endpoints with behavior (e.g., mesh restoration, etc.) and routing constraints.

Figure 17:
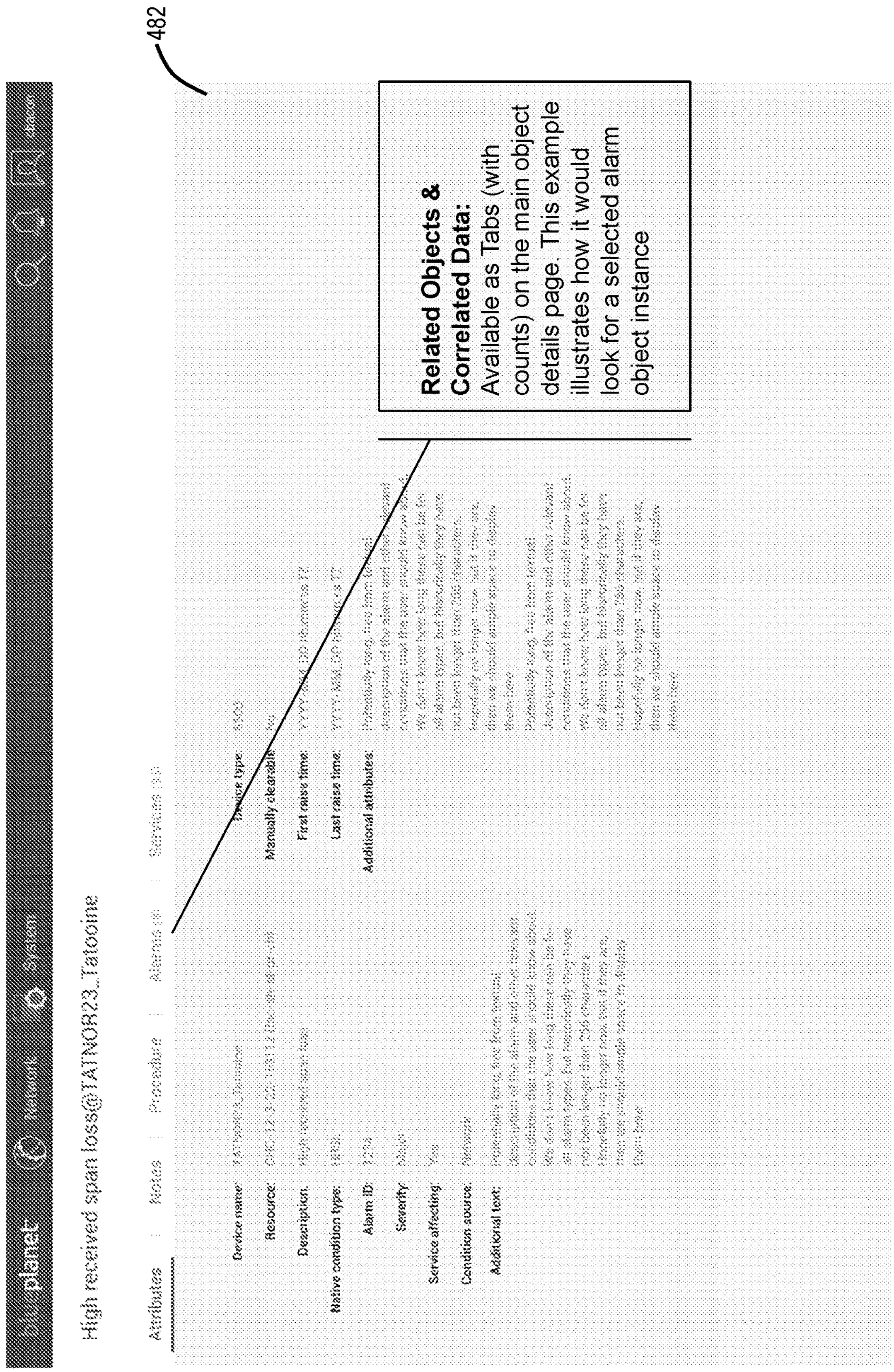
FIG. 17 is yet another screenshot of the correlated objects and data items.

FIG. 17 is yet another screenshot of the correlated objects and data items. FIG. 17 illustrates a tab 482 of attributes for a service. The objects and correlated data 420 can be available in the GUI as tabs along with counts.

Figure 18:
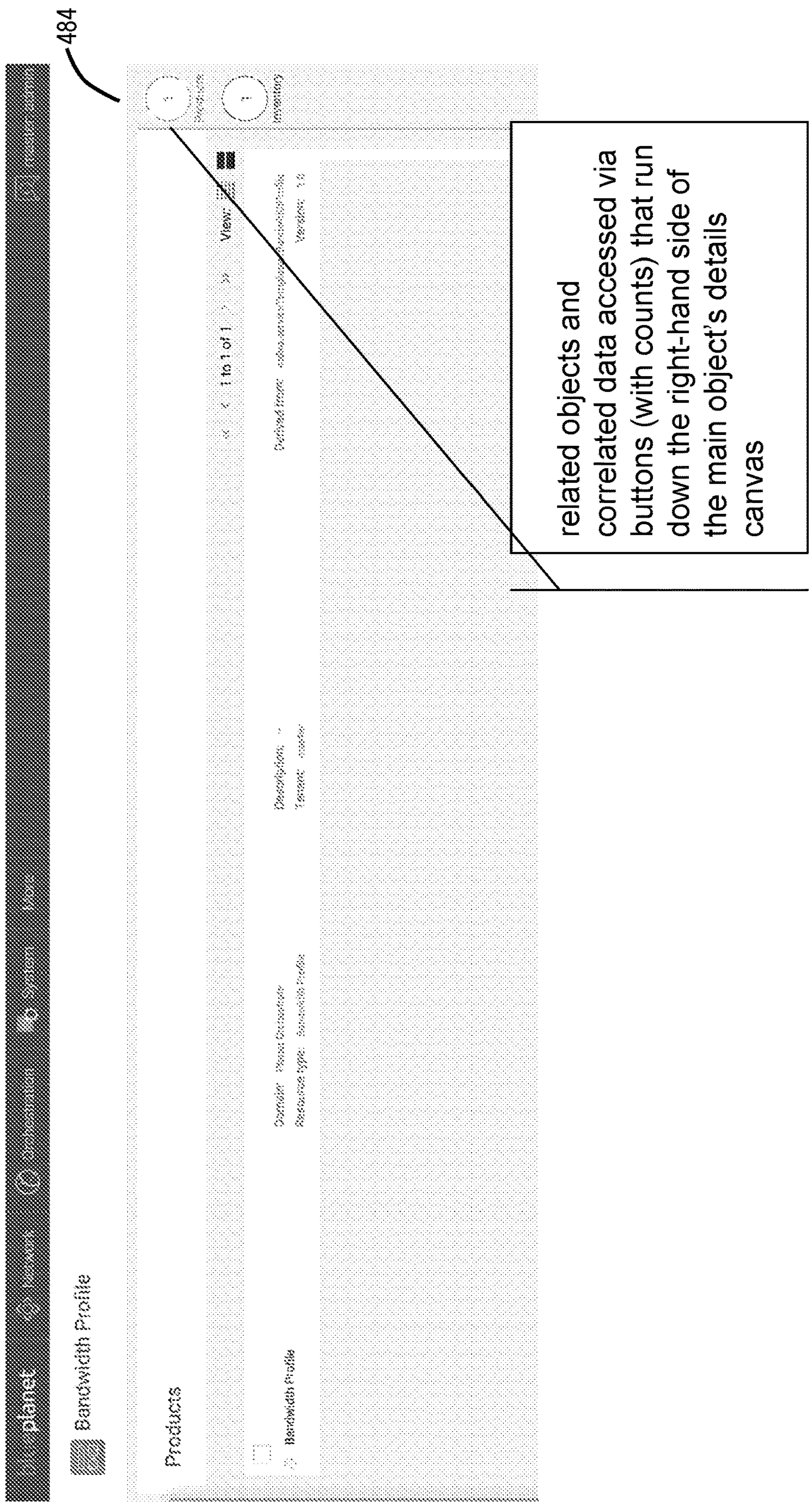
FIG. 18 is yet another screenshot of the correlated objects and data items.

FIG. 18 is yet another screenshot of the correlated objects and data items. FIG. 18 is a tab 484 of a bandwidth profile. The objects and correlated data 420 can also be accessed by buttons that run down the right side of the GUI.

Figure 19:
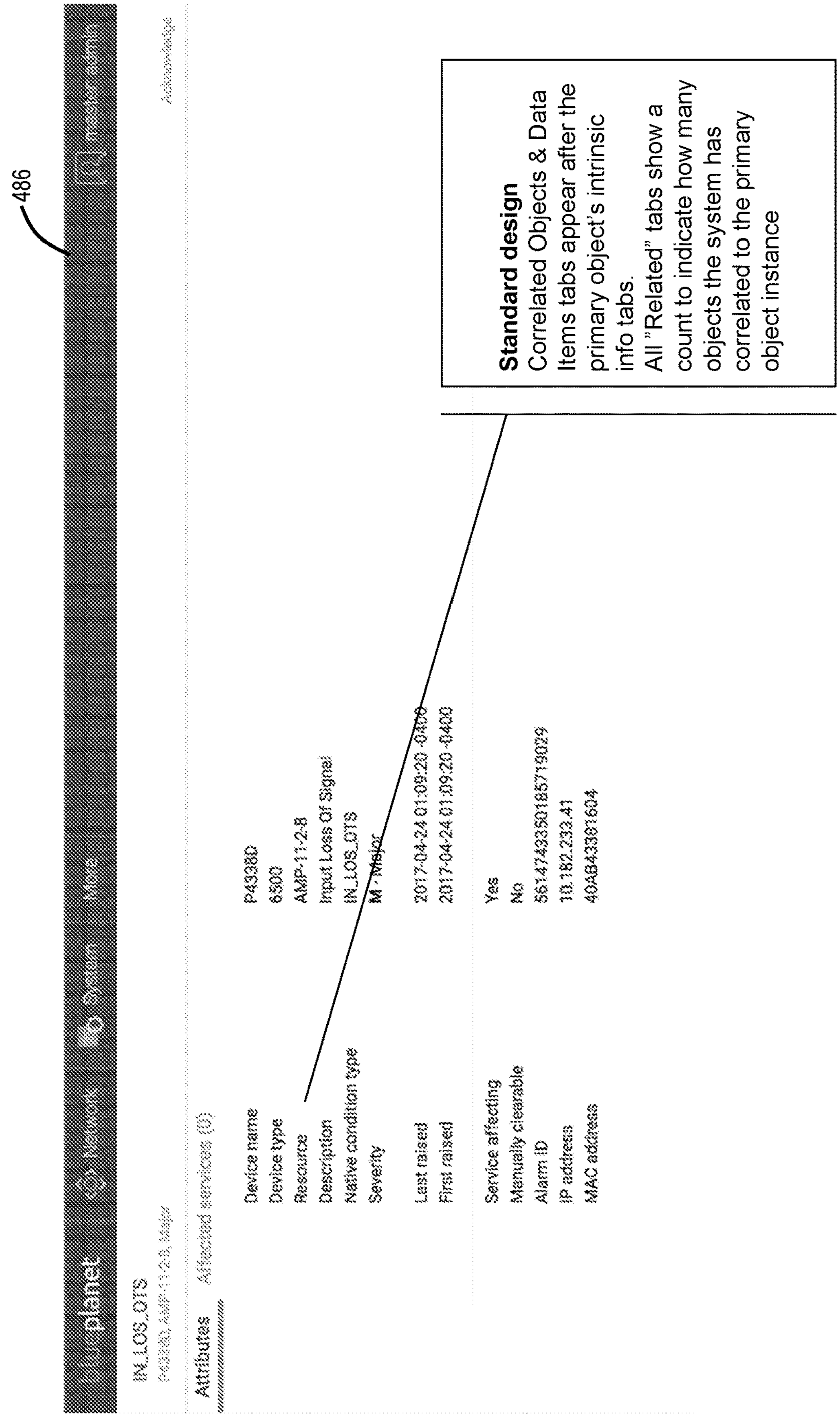
FIG. 19 is yet another screenshot of the correlated objects and data items.

FIG. 19 is yet another screenshot of the correlated objects and data items. FIG. 19 is a tab 486 of attributes.

Figure 20:
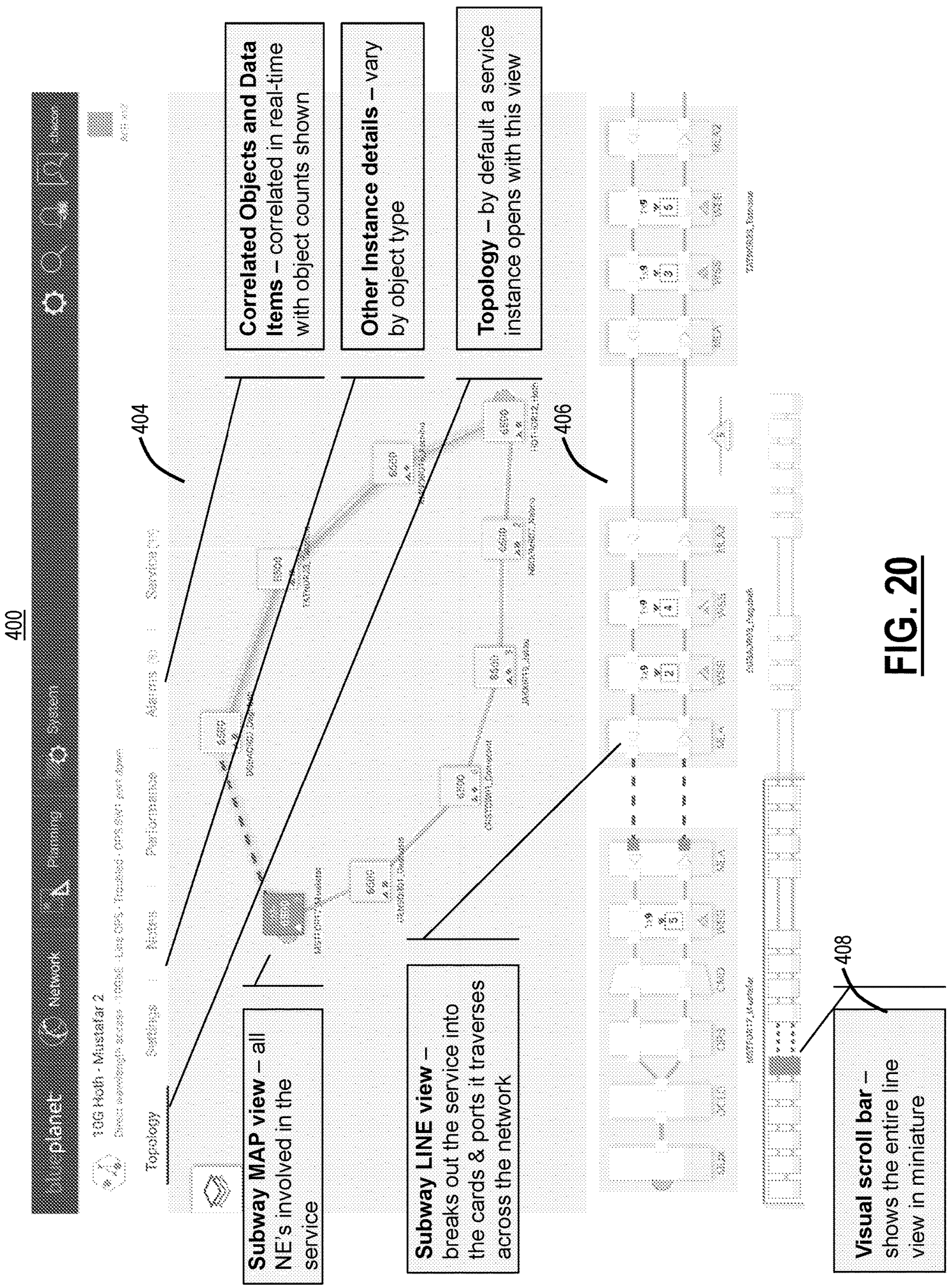
FIG. 20 is a screenshot of a combination of the subway map and line services view with the correlated objects and data items.

FIG. 20 is a screenshot of a combination of the subway map and line services 400 view with the correlated objects and data 420 items. The GUI can include tabs for topology (which is shown in FIG. 20), settings, notes, performance, alarms, and services. The tabs can also include counts, such as for alarms (8 in this example) and services (35 in this example). In this example of FIG. 20, the 10 G Hoth-Mustafar 2 service is selected. This service can include a 10 GbE with a line Optical Protection Switch (OPS) which is "troubled" in the sense that the OPS switch 1 is down.

The network map 404 includes a visual representation of the network 100 from the perspective of the sites 110 or the network elements 122, 124 and the links 120 interconnecting the sites 110 or the network elements 122, 124. The network map 404 can include visualizations on the links 120 such as color coding, dashing, etc. to represent different states, to represent selected services, etc. The sites 110 or the network elements 122, 124 can be represented as icons which also can include color coding, dashing, etc. to represent different states, to represent selected services. The icons for the sites 110 or the network elements 122, 124 can also include data presented therein to represent alarms or the like. The network map 404 can display all sites 110, network elements 122, 124, and links 120 involved in the service.

The subway view 406 displays lower granularity from the network view 404. Specifically, the network view 404 treats each site as a single icon whereas the subway view 406 displays a device, module, or card level detail for each physical component the service traverses. Since this is more detail, the visual scrollbar 408 is used to scroll the subway view 406.

In this example, the subway view 406 displays three sites 110 while the service traverses five sites 110. The subway view 406 gives a user a detailed view of each physical device associated with the service. In this example, the site Mustafar has a multiplexer (MUX), an optical transceiver (OCLD), an Optical Protection Switch (OPS), a Channel Multiplexer/Demultiplexer (CMD), a Wavelength Selective Switch (WSS), and an amplifier (MLA), an attenuator, a dispersion compensation module, a C/L band coupler, a Time Division Multiplexing (TDM) switch (e.g., Optical Transport Network (OTN)), and a packet switch (e.g., Ethernet). The sites Dagobah and Tatooine are amplifier/pass-through sites which include amplifiers (MLA, MLA2) and WSSs.

The subway view 406 lets the user visualize the service at much better granularity than the network map 404 (and conventional GUI displays). The user can click/select any device and pull up details, the related objects and correlated data 420, etc.

In an embodiment, a network management system includes a network interface communicatively coupled to one or more network elements in a network for exchanging Operations, Administration, Maintenance, and Provisioning (OAM&P) data; a processor communicatively coupled to the network interface; and memory storing instructions that, when executed, cause the processor to obtain the OAM&P data from the network, provide a Graphical User Interface (GUI) based on the network from the OAM&P data, wherein the GUI includes a network map which provides a topological view and a subway view which provides a detailed device-level view which is more granular than the network map and illustrates individual components at each site, receive a selection from a user of a service in the network, and update the GUI to highlight the service in the network map and illustrate the associated sites in the subway view.

The service can traverse a plurality of sites in the network such that all of the sites cannot be displayed in the subway view, wherein the GUI further includes a visual scrollbar which visualizes the service in a miniature format for the subway view with a portion shown in the subway view highlighted, and wherein the memory storing instructions that, when executed, further cause the processor to update the subway view based on input from the user through the visual scrollbar. The memory storing instructions that, when executed, can further cause the processor to highlight a portion of the network in the topological view which is currently displayed in the subway view. The individual components in the subway view can include any of a multiplexer, optical transceiver, optical switch, multiplexer, demultiplexer, Wavelength Selective Switch (WSS), and amplifier. The memory storing instructions that, when executed, can further cause the processor to receive an input from the user from a selection in the GUI, and present correlated objects and data items based on the selection.

In another embodiment, a network management method includes, in a server including a network interface communicatively coupled to one or more network elements in a network for exchanging Operations, Administration, Maintenance, and Provisioning (OAM&P) data, obtaining the OAM&P data from the network; providing a Graphical User Interface (GUI) based on the network from the OAM&P data, wherein the GUI includes a network map which provides a topological view and a subway view which provides a detailed device-level view which is more granular than the network map and illustrates individual components at each site; receiving a selection from a user of a service in the network; and updating the GUI to highlight the service in the network map and illustrate the associated sites in the subway view.

Power Readings Graph, Spectral Analysis Graph, and Spectral Allocation Graph

The following FIGS. illustrate examples of the GUIs associated with the power readings graph, spectral analysis graph, and spectral allocation graph. Note, the power readings graph, spectral analysis graph, and spectral allocation graph can be combined with the subway view 406.

Figure 21:
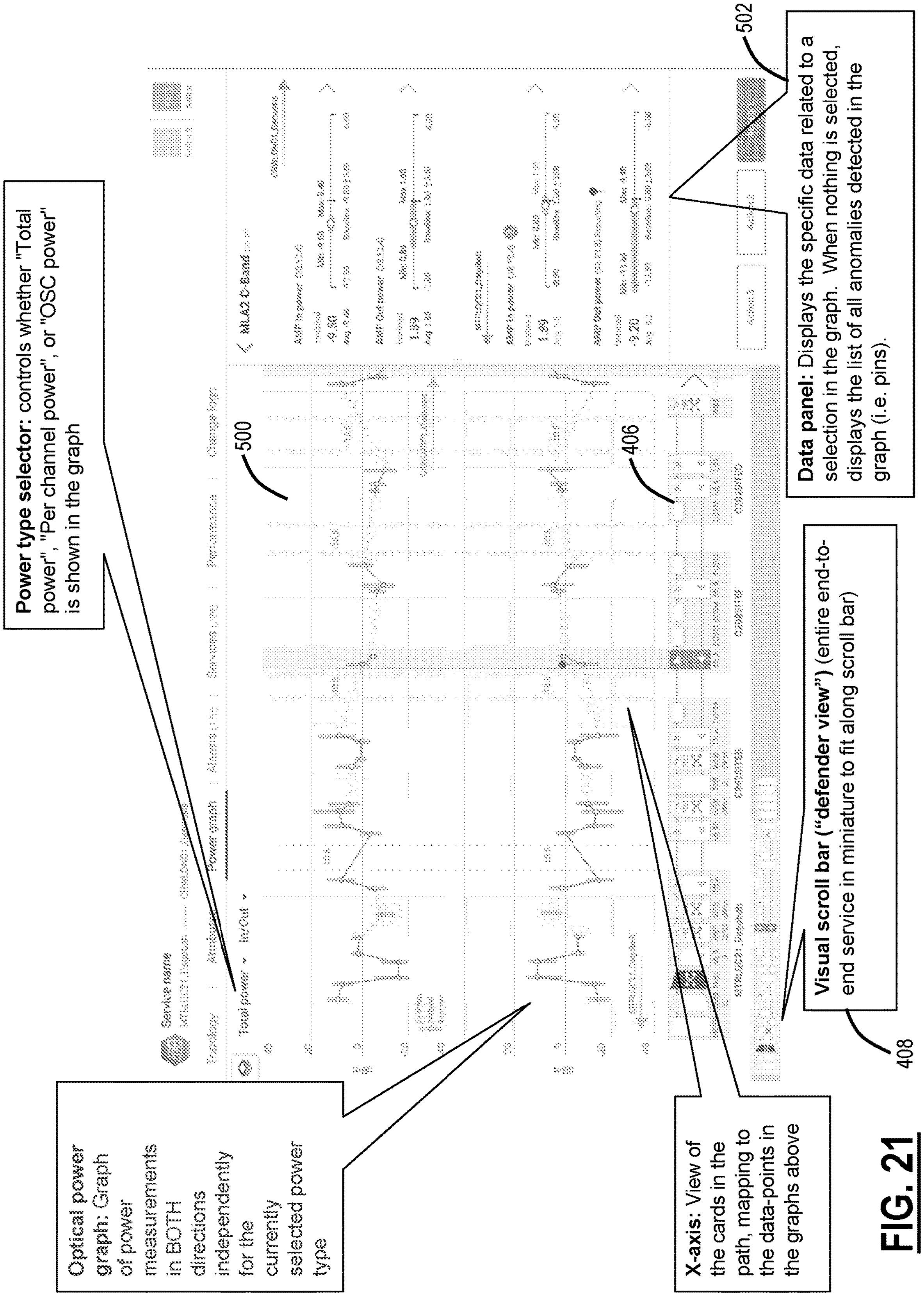
FIG. 21 is a screenshot of an optical power readings graph.

FIG. 21 is a screenshot of an optical power readings graph 500. In the GUI, the optical power readings graph 500 is illustrated in place of the network map 404 when a user selects the power graph tab. Further, the GUI can also include the visual scrollbar 408 which operates as discussed above. The optical power readings graph 500 is a graph of power measurements in both directions independent for a currently selected power type. The power type can be total power, per channel power, or OSC power. The optical power readings graph 500 is presented as a graph of power (in dBm) versus components in the subway view 406. That is, the x-axis of the optical power readings graph 500 of the devices in the path. As is seen, the optical power readings graph 500 provides a visualization of the selected power type across the subway view 406. Further, scrolling the visual scrollbar 408 scrolls the optical power readings graph 500.

Also, a data panel 502 can display selected data related to a selection in the optical power readings graph 500 (in this example, an amplifier in the middle). If nothing is selected, the data panel 502 can list detected anomalies in the graph.

Figure 22:
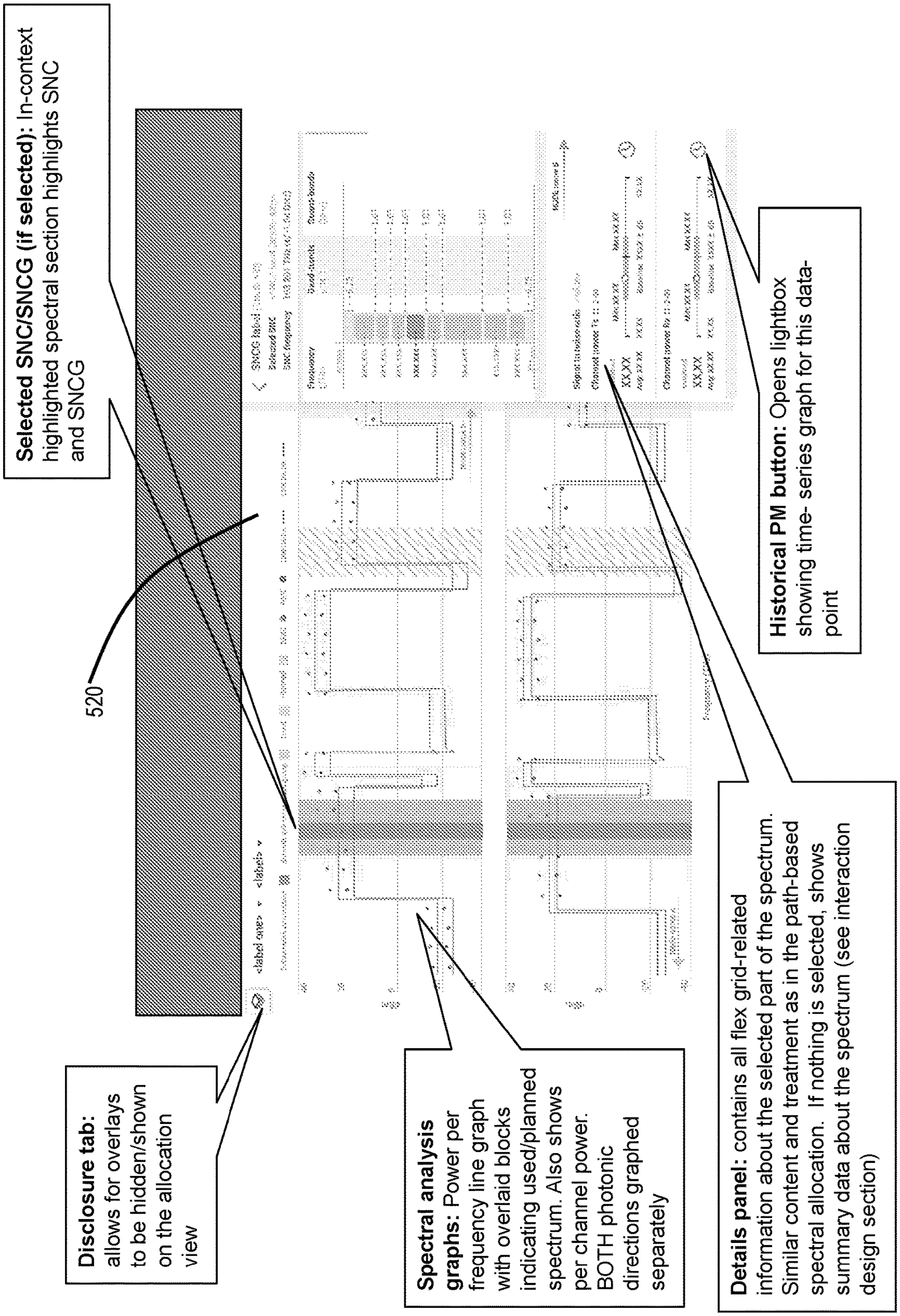
FIG. 22 is a screenshot of an optical spectral analysis graph.

FIG. 22 is a screenshot of an optical spectral analysis graph 520. The optical spectral analysis graph 520 provides a power per frequency line graph with overlaid blocks indicating used/planned spectrum and also shows per channel power. Both photonic directions are graphed. The optical spectral analysis graph 520 has power (dBm) on the y-axis and optical spectrum (e.g., C-Band, 1530 to 1565 nm) on the x-axis. The optical spectral analysis graph 520 presents the spectrum at a specific selected point.

Figure 23:
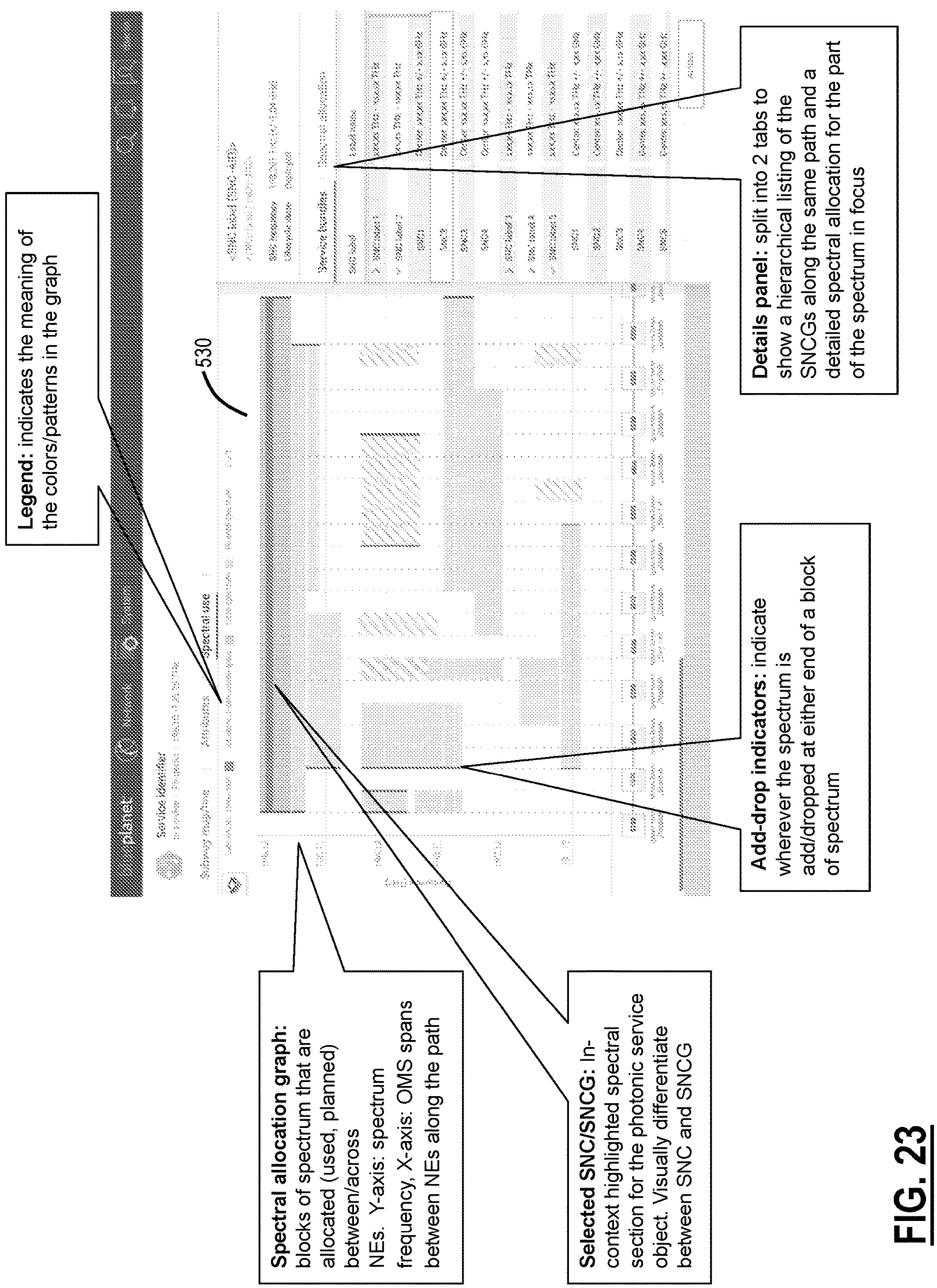
FIG. 23 is a screenshot of an optical spectral allocation graph.

FIG. 23 is a screenshot of an optical spectral allocation graph 530. The optical spectral allocation graph 530 illustrates blocks of spectrum that are allocated (used or planned) between/across network elements. Here, the y-axis is spectrum in frequency and the x-axis is Optical Multiplex Section (OMS) spans between network elements. The optical spectral allocation graph 530 can also utilize the subway view 406.

Figure 24:
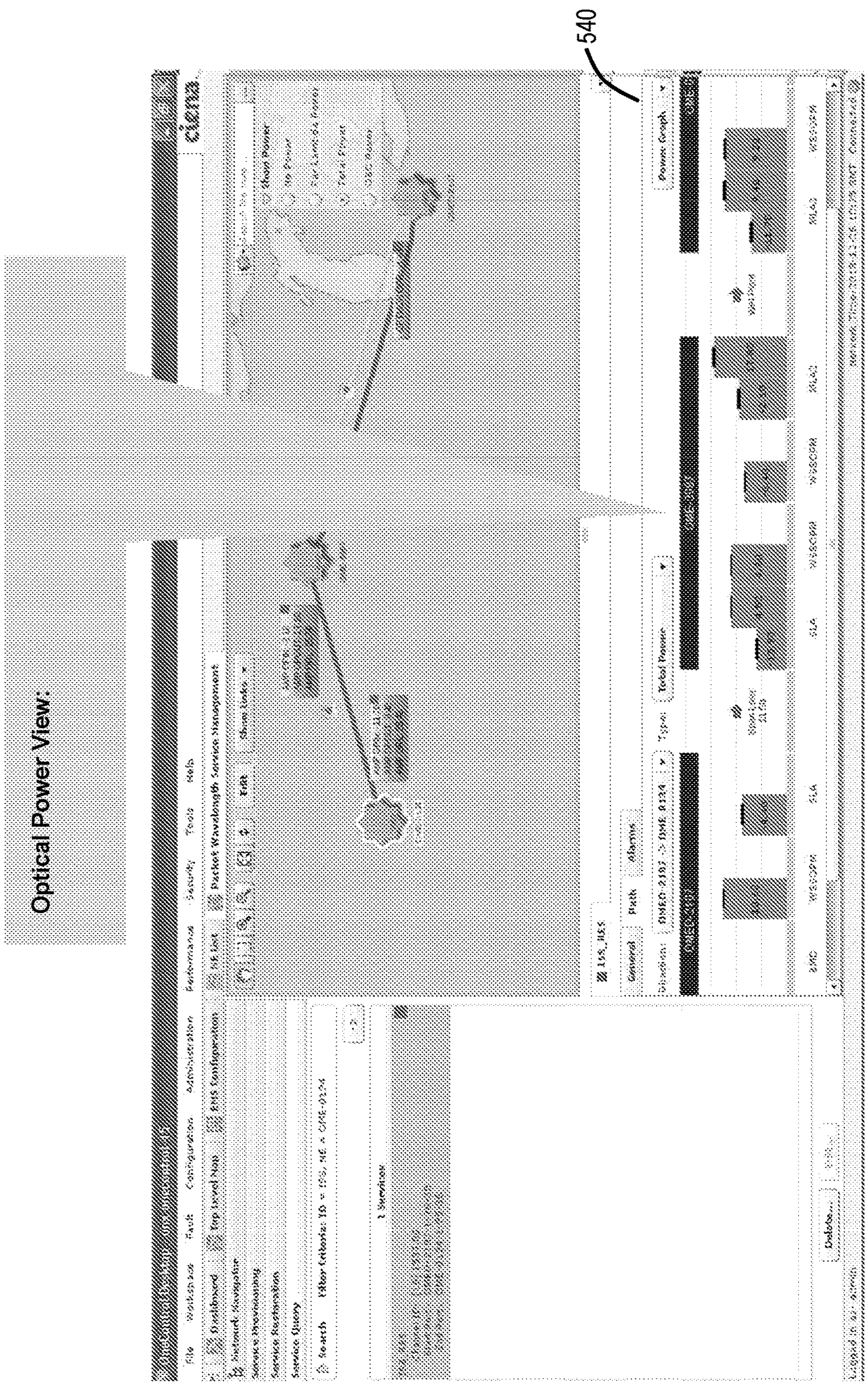
FIG. 24 is a screenshot of an optical power view.
Figure 25:
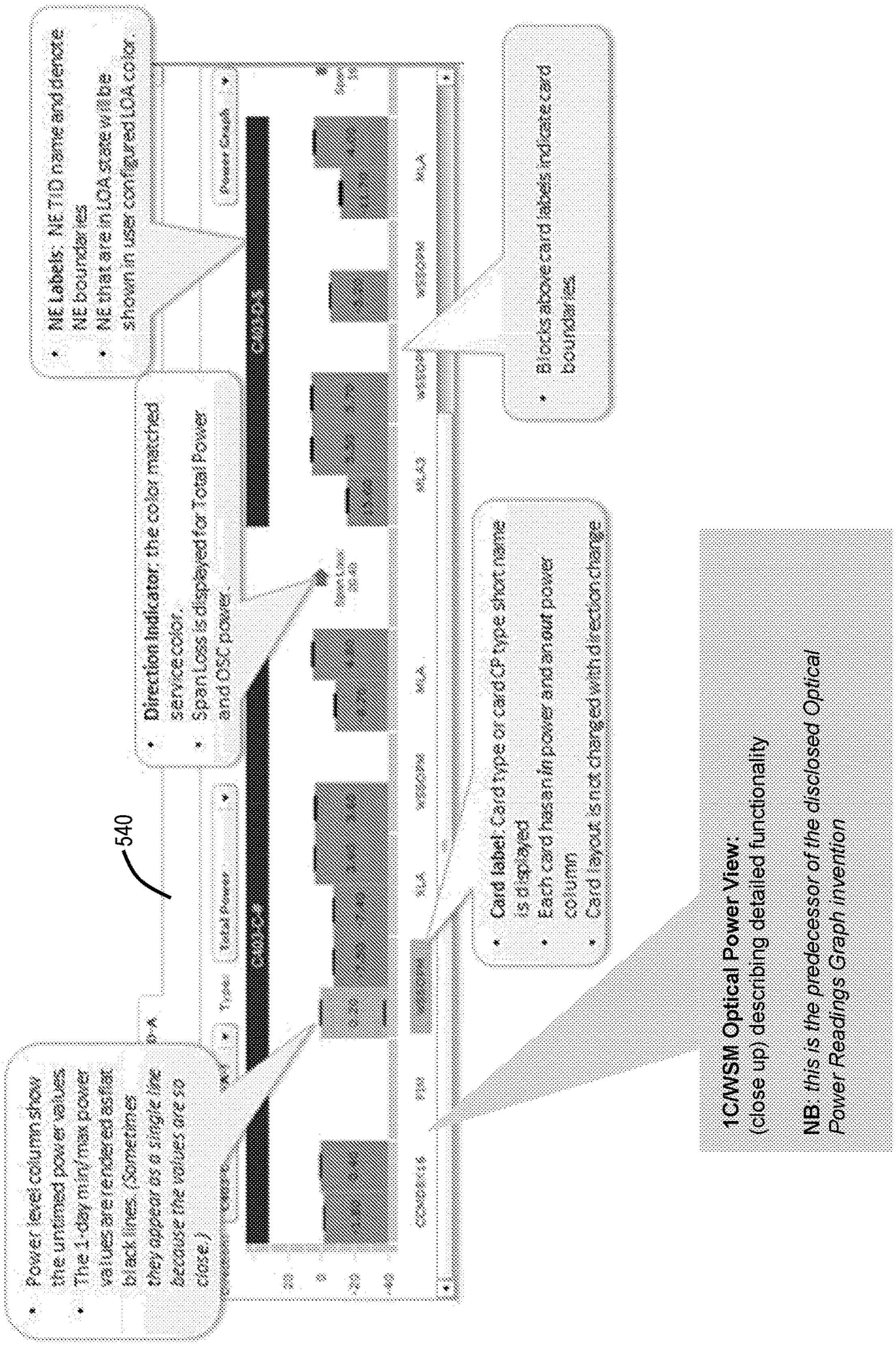
FIG. 25 is a screenshot showing additional details of the optical power view in FIG. 24.

FIG. 24 is a screenshot of an optical power view 540 which is similar to the optical power readings graph 500. FIG. 25 is a screenshot showing additional details of the optical power view in FIG. 24.

Figure 26:
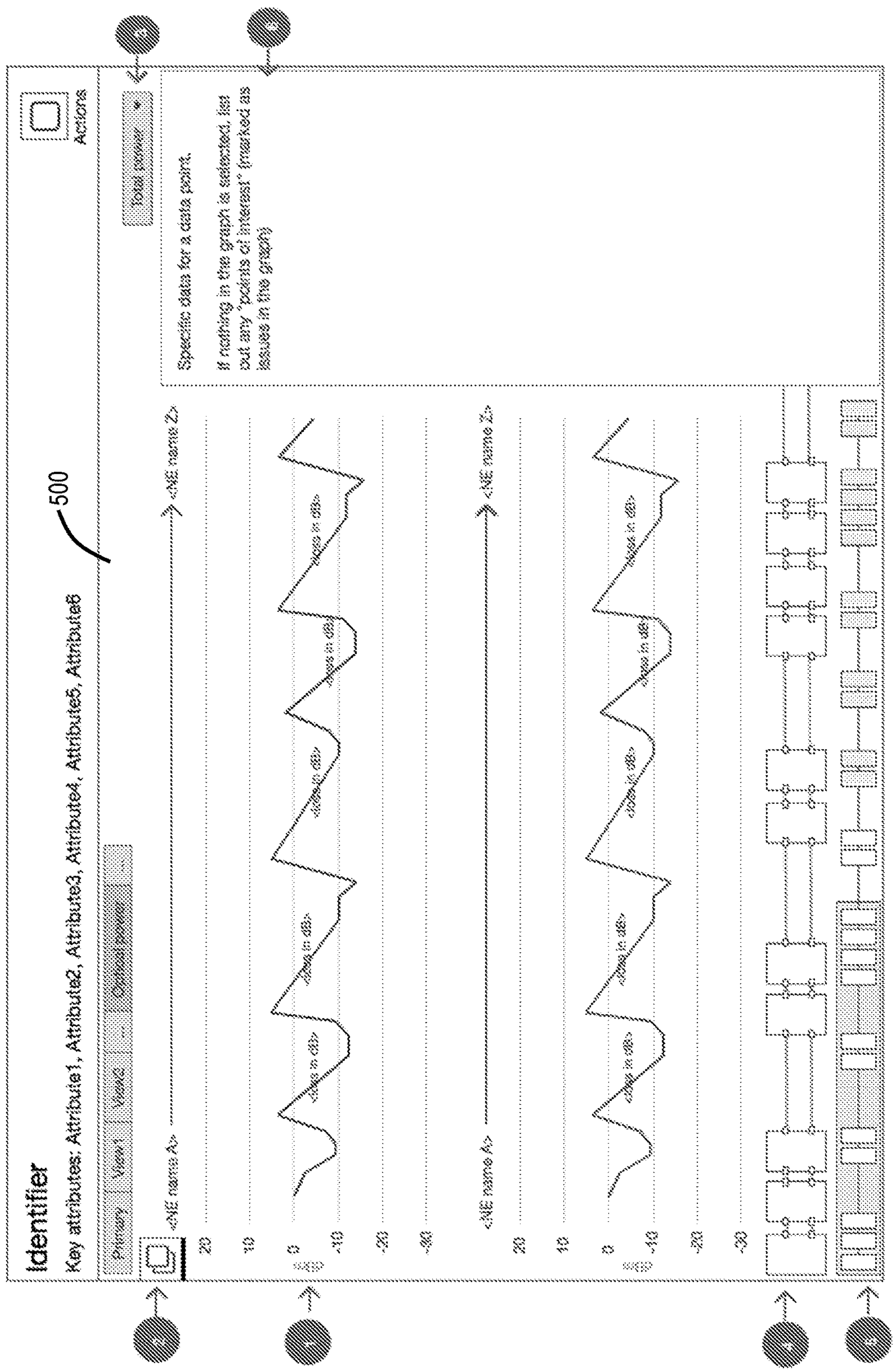
FIG. 26 is a screenshot of the optical power readings graph.

FIG. 26 is a screenshot of the optical power readings graph 500. The optical power readings graph 500 is a view of an object details page for a photonic service. The User Experience (UX)/User Interface (UI) components of the optical power readings graph 500 include the following in FIG. 26:

1. Optical power graph: Graph of power measurements in each direction independently for the currently selected power type.
2. Disclosure (details) tab: contains overlays that users can turn on/off and view the graphs.
3. Power type selector: controls whether “Total power,” “Per channel power,” or “OSC power” is shown in the graph.
4. X-axis: View of the cards in the path, mapping to the data points in the graphs above.
5. Visual Scroll Bar: portrays the entire path and a way to scroll through it.
6. Data panel: Displays the specific data related to a selection in the graph. When nothing is selected, displays the list of all anomalies detected in the graph (i.e. pins).
7. Historical link per data-point: progressive disclosure of historical data for a data point.
8. Selected card actions: useful to directly invoke actions and/or navigate to related information on the selected card.

Figure 27:
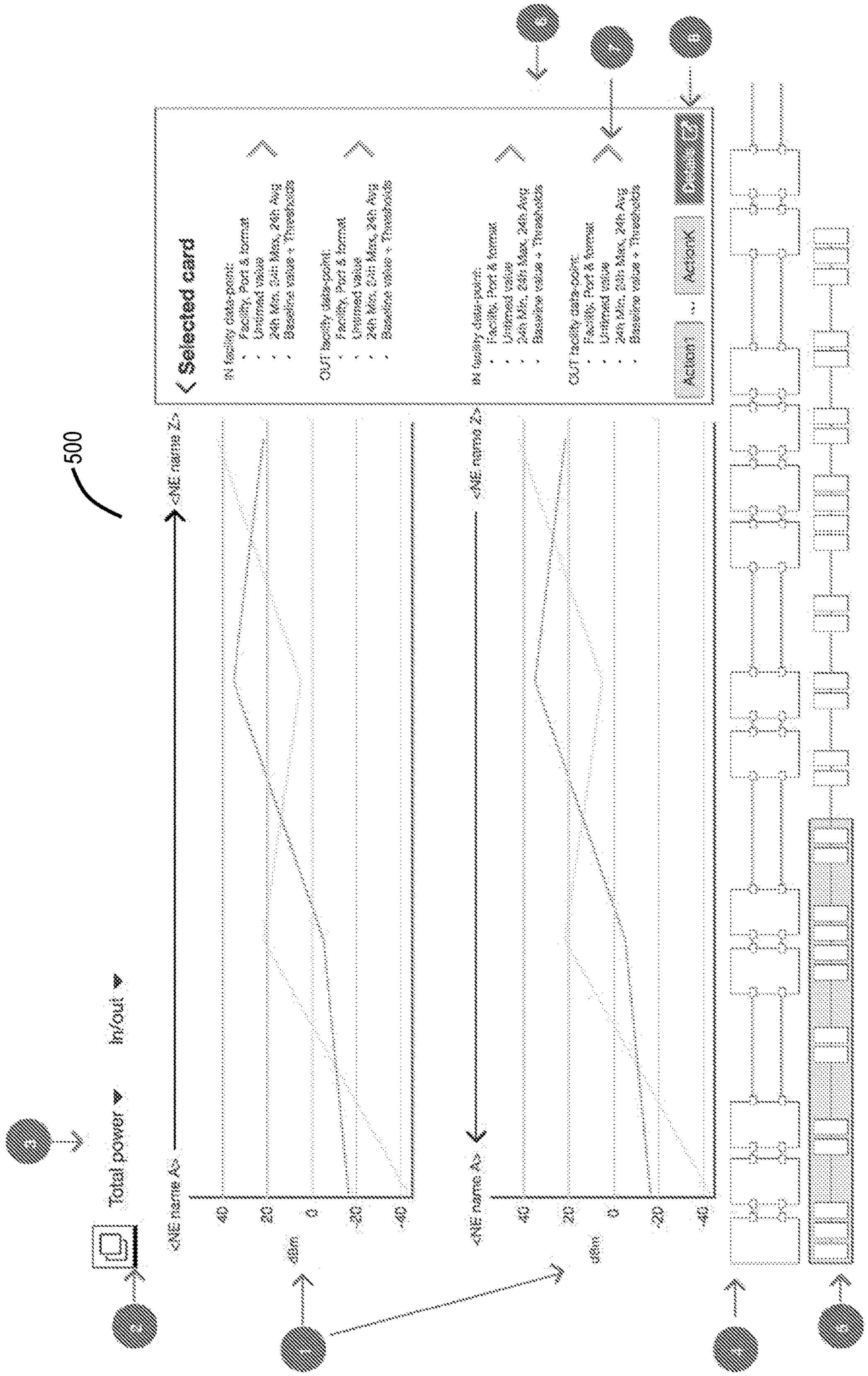
FIG. 27 is another screenshot of the optical power readings graph.

FIG. 27 is another screenshot of the optical power readings graph 500. The optical power readings graph 500 is a view of an object details page for a photonic service. The User Experience (UX)/User Interface (UI) components of the optical power readings graph include the following in FIG. 27:

1. Optical power graph: Graph of power measurements in each direction independently for the currently selected power type.
2. Disclosure (details) tab: contains overlays that users can turn on/off and view the graphs.
3. Power type selector: controls whether “Total power,” “Per channel power,” or “OSC power” is shown in the graph.
4. X-axis: View of the cards in the path, mapping to the data points in the graphs above.
5. Visual Scroll Bar: portrays the entire path and a way to scroll through it.
6. Data panel: Displays the specific data related to a selection in the graph. When nothing is selected, displays the list of all anomalies detected in the graph (i.e. pins).
7. Historical link per data-point: progressive disclosure of historical data for a data point.
8. Selected card actions: useful to directly invoke actions and/or navigate to related information on the selected card.

Figure 28:
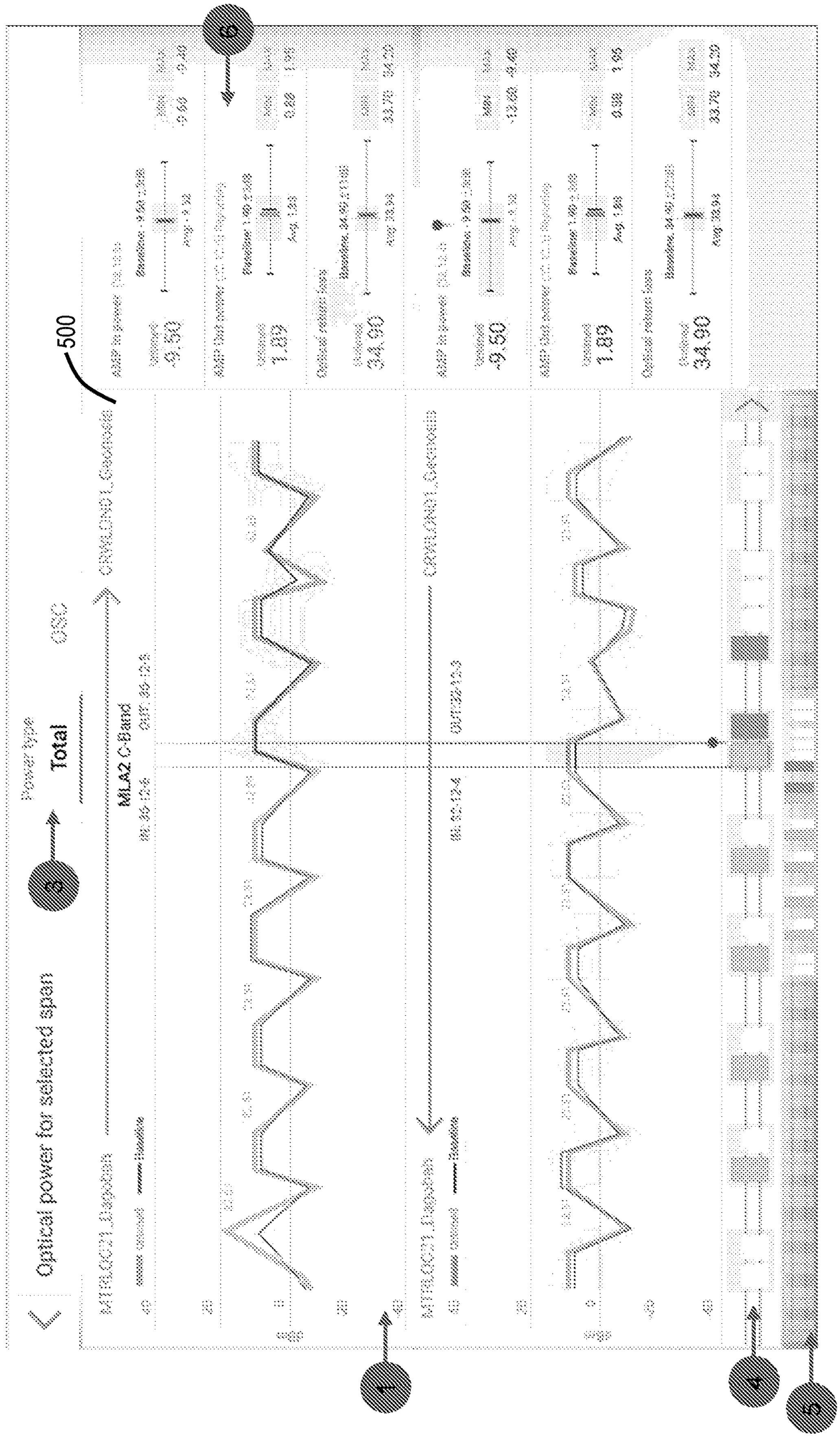
FIG. 28 is yet another screenshot of the optical power readings graph.

FIG. 28 is yet another screenshot of the optical power readings graph 500. The optical power readings graph 500 is a view in an object details page for a photonic service. The User Experience (UX)/User Interface (UI) components of the optical power readings graph 500 include the following in FIG. 28:

1. Optical power graph: Graph of power measurements in each direction independently for the currently selected power type.
2. Disclosure (details) tab: contains overlays that users can turn on/off and view on the graphs (not shown in FIG. 28).
3. Power type selector: controls whether “Total power,” “Per channel power,” or “OSC power” is shown in the graph.

4. X-axis: View of the cards in the path, mapping to the data points in the graphs above.
5. Visual Scroll Bar: portrays the entire path and a way to scroll through it.
6. Data panel: Displays the specific data related to a selection in the graph. When nothing is selected, displays the list of all anomalies detected in the graph (i.e. pins).
7. Historical link per data-point: progressive disclosure of historical data for a data point (not shown in FIG. 28)
8. Selected card actions: useful to directly invoke actions and/or navigate to related information on the selected card (not shown in FIG. 28).

Figure 29:
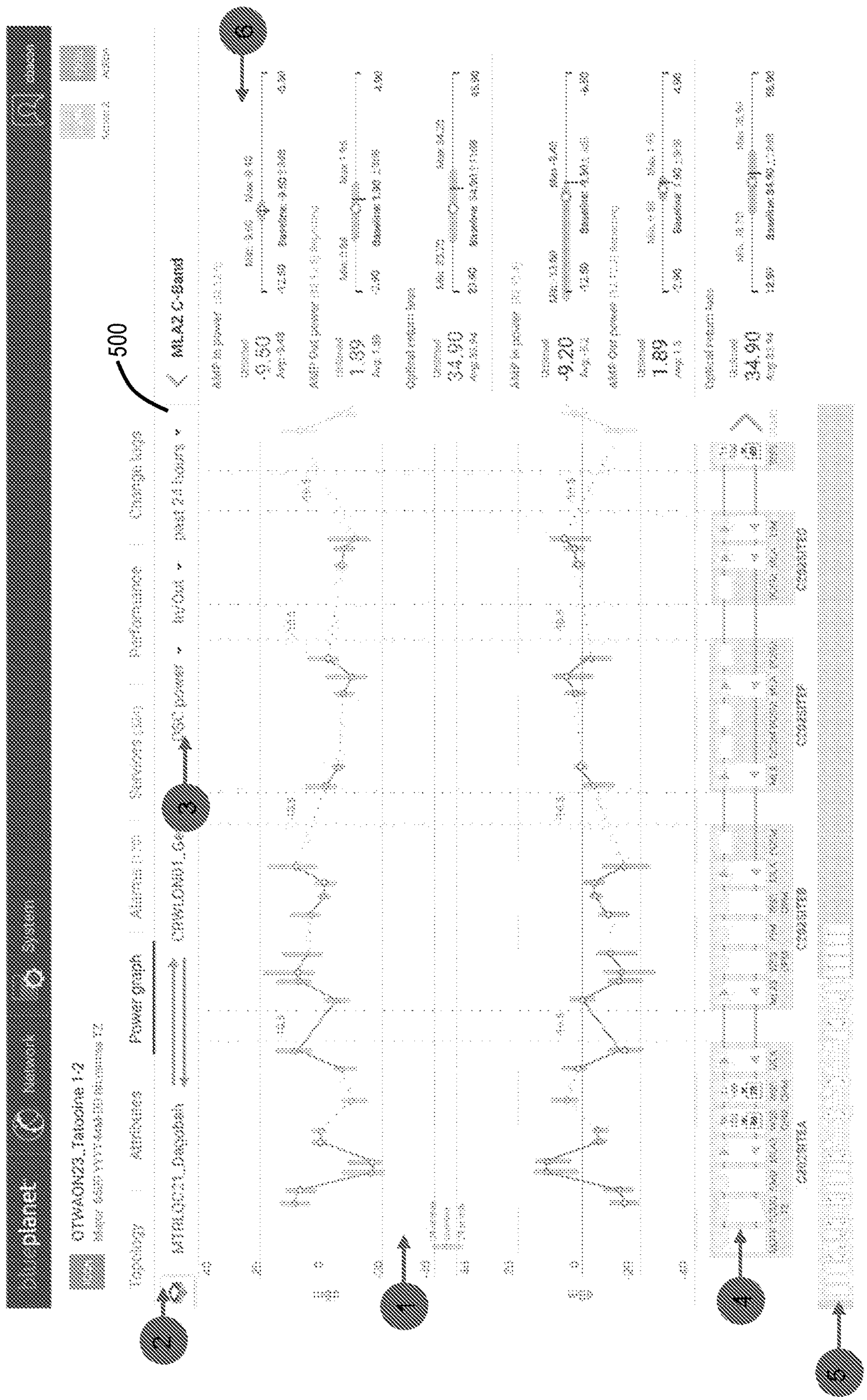
FIG. 29 is yet another screenshot of the optical power readings graph.

FIG. 29 is yet another screenshot of the optical power readings graph 500. The optical power readings graph 500 is a view in an object details page for a photonic service. The User Experience (UX)/User Interface (UI) components of the optical power readings graph 500 include the following in FIG. 29:

1. Optical power graph: Graph of power measurements in each direction independently for the currently selected power type.
2. Disclosure (details) tab: contains overlays that users can turn on/off and view the graphs.
3. Power type selector: controls whether “Total power,” “Per channel power,” or “OSC power” is shown in the graph.
4. X-axis: View of the cards in the path, mapping to the data points in the graphs above.
5. Visual Scroll Bar: portrays the entire path and a way to scroll through it.
6. Data panel: Displays the specific data related to a selection in the graph. When nothing is selected, displays the list of all anomalies detected in the graph (i.e. pins).
7. Historical link per data-point: progressive disclosure of historical data for a data point (not shown in FIG. 29)
8. Selected card actions: useful to directly invoke actions and/or navigate to related information on the selected card (not shown in FIG. 29).

Figure 30:
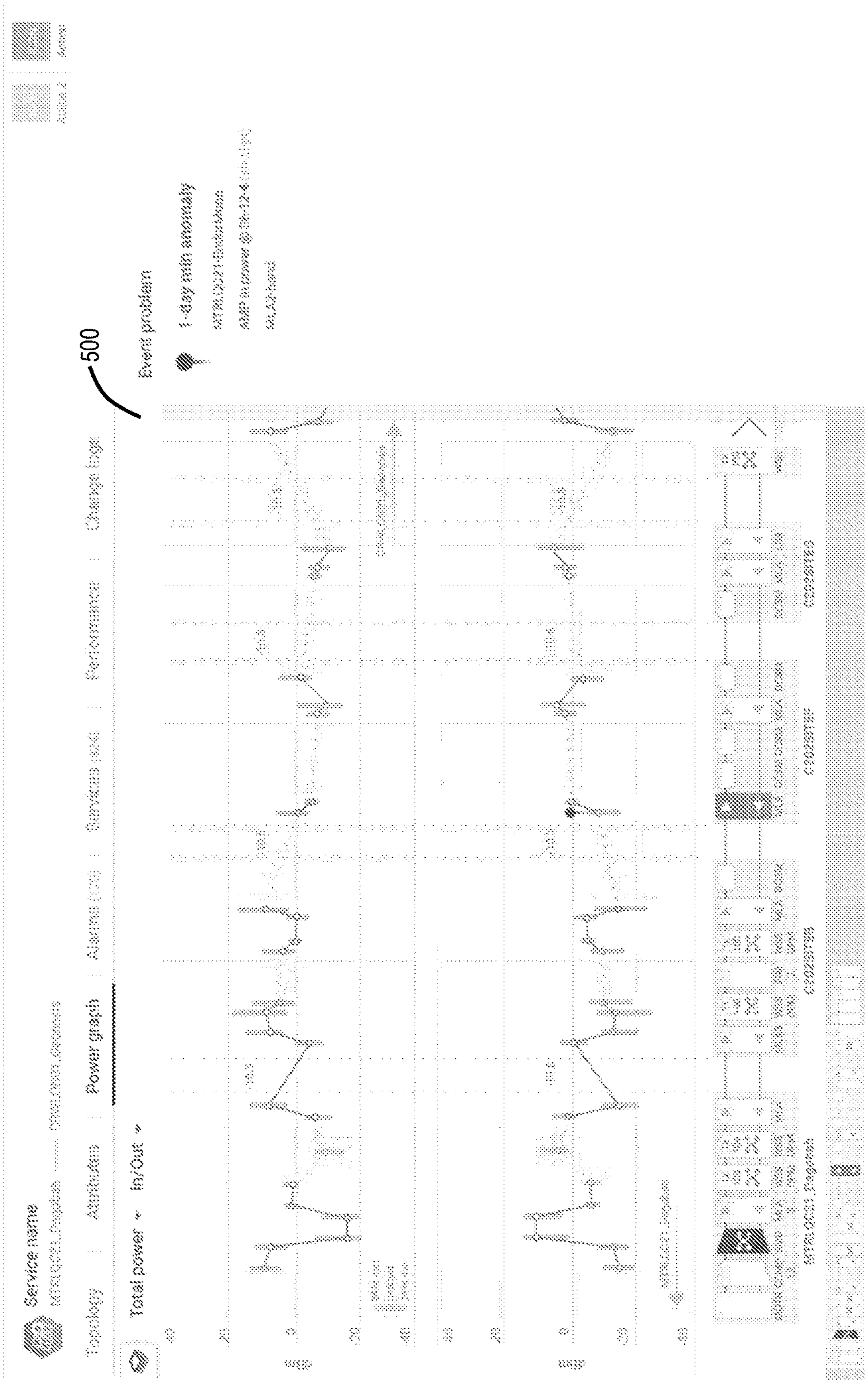
FIGS. 30-32 are example screenshots of the optical power readings graph.
Figure 31:
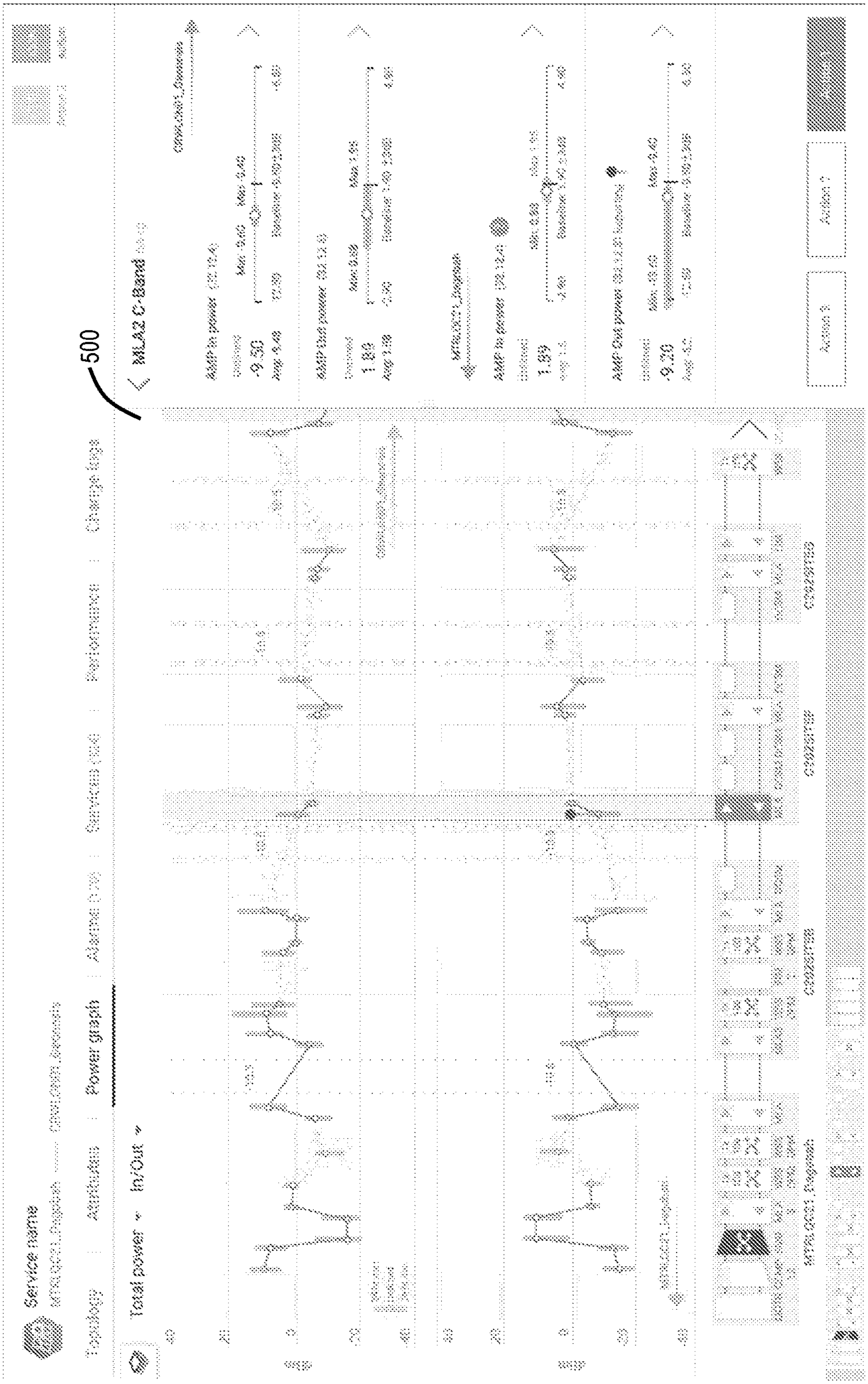
Figure 32:
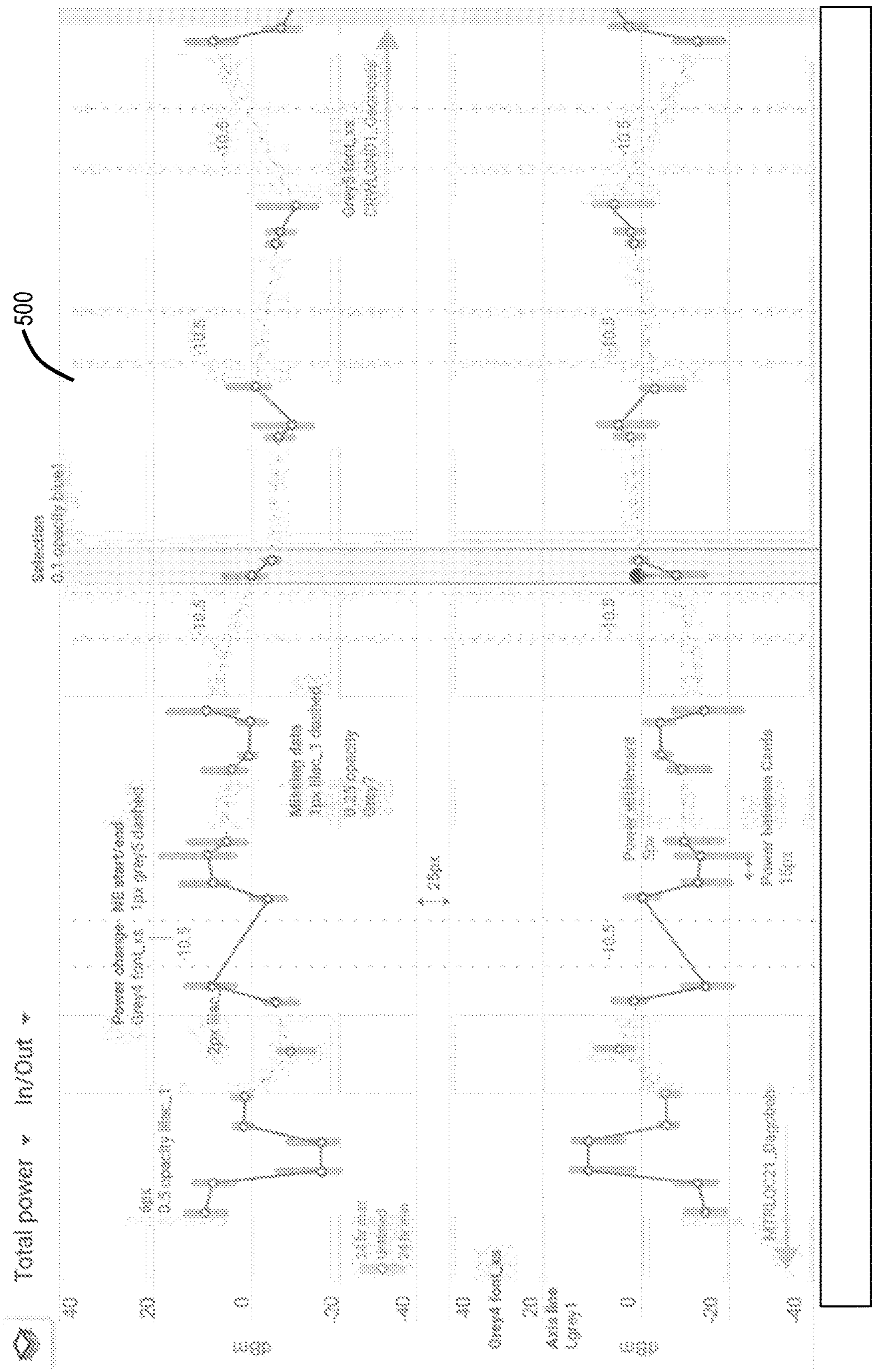

FIGS. 30-32 are example screenshots of the optical power readings graph 500.

Figure 33:
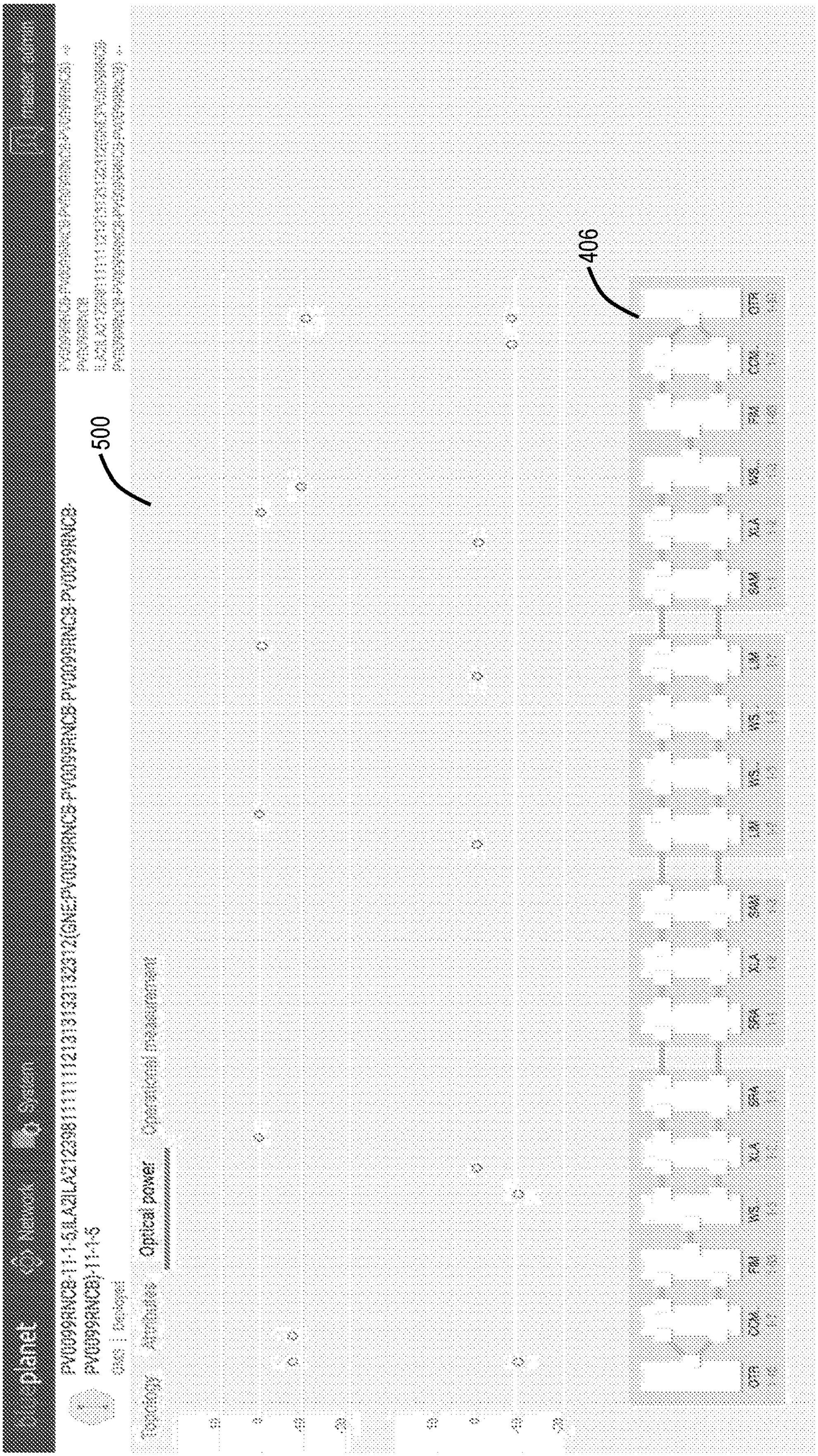
FIG. 33 is a screenshot of the optical power readings graph with the subway map view.

FIG. 33 is a screenshot of the optical power readings graph 500 with the subway map view 406.

Figure 34:
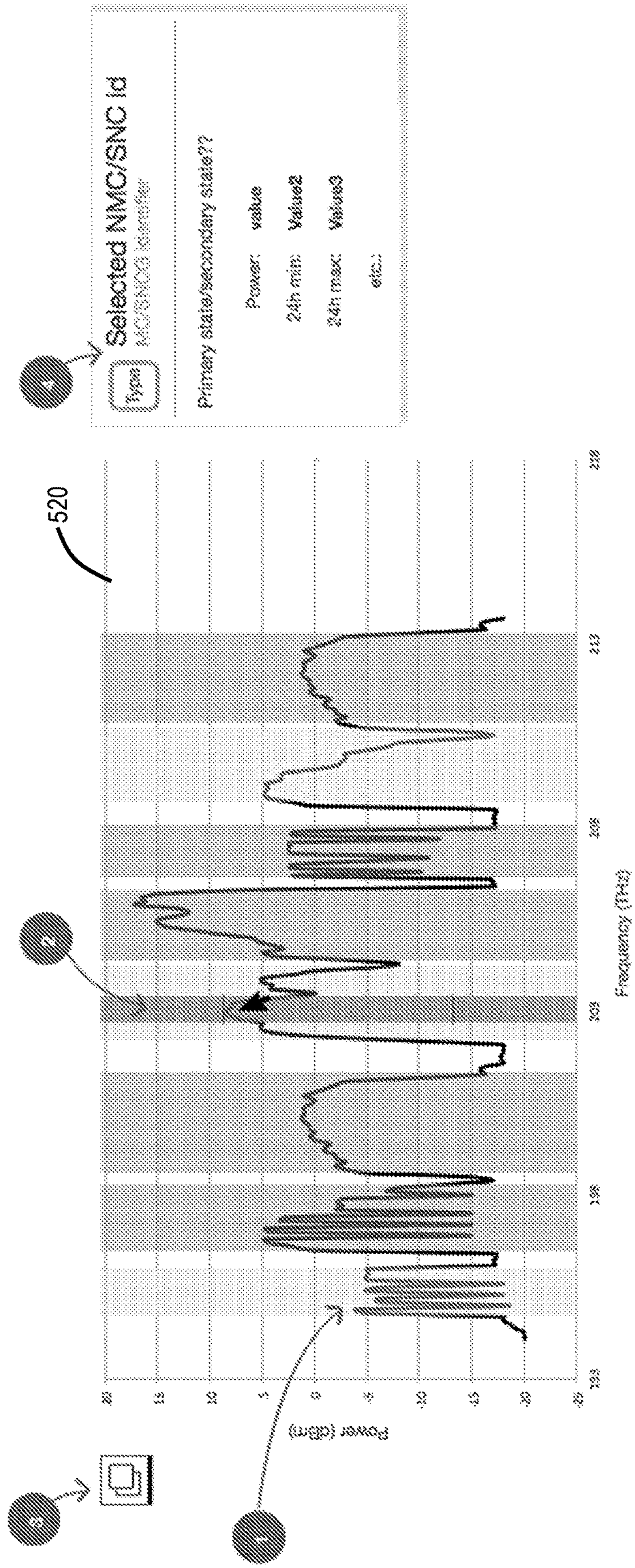
FIG. 34 is a screenshot of an optical spectral analysis graph.

FIG. 34 is a screenshot of an optical spectral analysis graph 520. The spectral analysis graph 520 is a view in an object details page for a photonic service. The User Experience (UX)/User Interface (UI) components of the spectral analysis graph include the following in FIG. 34:

1. Spectral analysis graphs: Power per frequency line graph with overlaid blocks indicating used/planned spectrum. Also, shows per channel power. One graph per photonic direction.
2. Selected SNC/SNCG (if selected): In-context highlighted spectral section highlights SNC and SNCG.
3. Disclosure (details) tab: allows for overlays to be hidden/shown on the allocation view.
4. Details panel: contains flex-grid related information about the selected part of the spectrum. Similar content and treatment as in the path-based spectral allocation. If nothing is selected, shows summary data about the spectrum.
5. Historical PM button: Opens a lightbox showing time-series graph for this data-point (not shown in FIG. 34).

Figure 35:
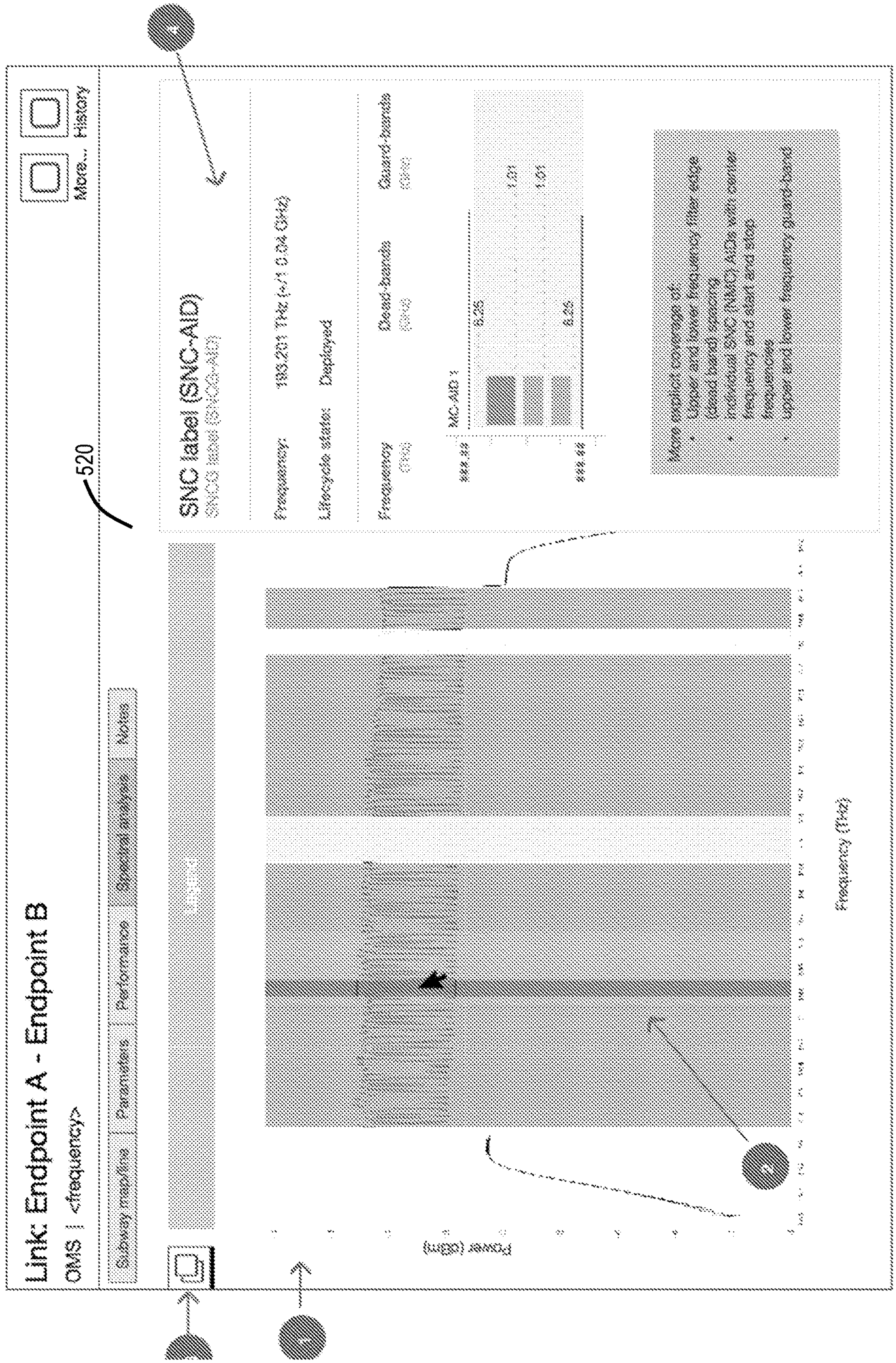
FIG. 35 is another screenshot of an optical spectral analysis graph.

FIG. 35 is another screenshot of an optical spectral analysis graph 520. The spectral analysis graph 520 is a view in an object details page for a photonic service. The User Experience (UX)/User Interface (UI) components of the spectral analysis graph include the following in FIG. 35:

1. Spectral analysis graphs: Power per frequency line graph with overlaid blocks indicating used/planned spectrum. Also, shows per channel power. One graph per photonic direction.
2. Selected SNC/SNCG (if selected): In-context highlighted spectral section highlights SNC and SNCG.
3. Disclosure (details) tab: allows for overlays to be hidden/shown on the allocation view.
4. Details panel: contains all flex-grid related information about the selected part of the spectrum. Similar content and treatment as in the path-based spectral allocation. If nothing is selected, shows summary data about the spectrum.
5. Historical PM button: Opens a lightbox showing time-series graph for this data-point (not shown in FIG. 35).

Figure 36:
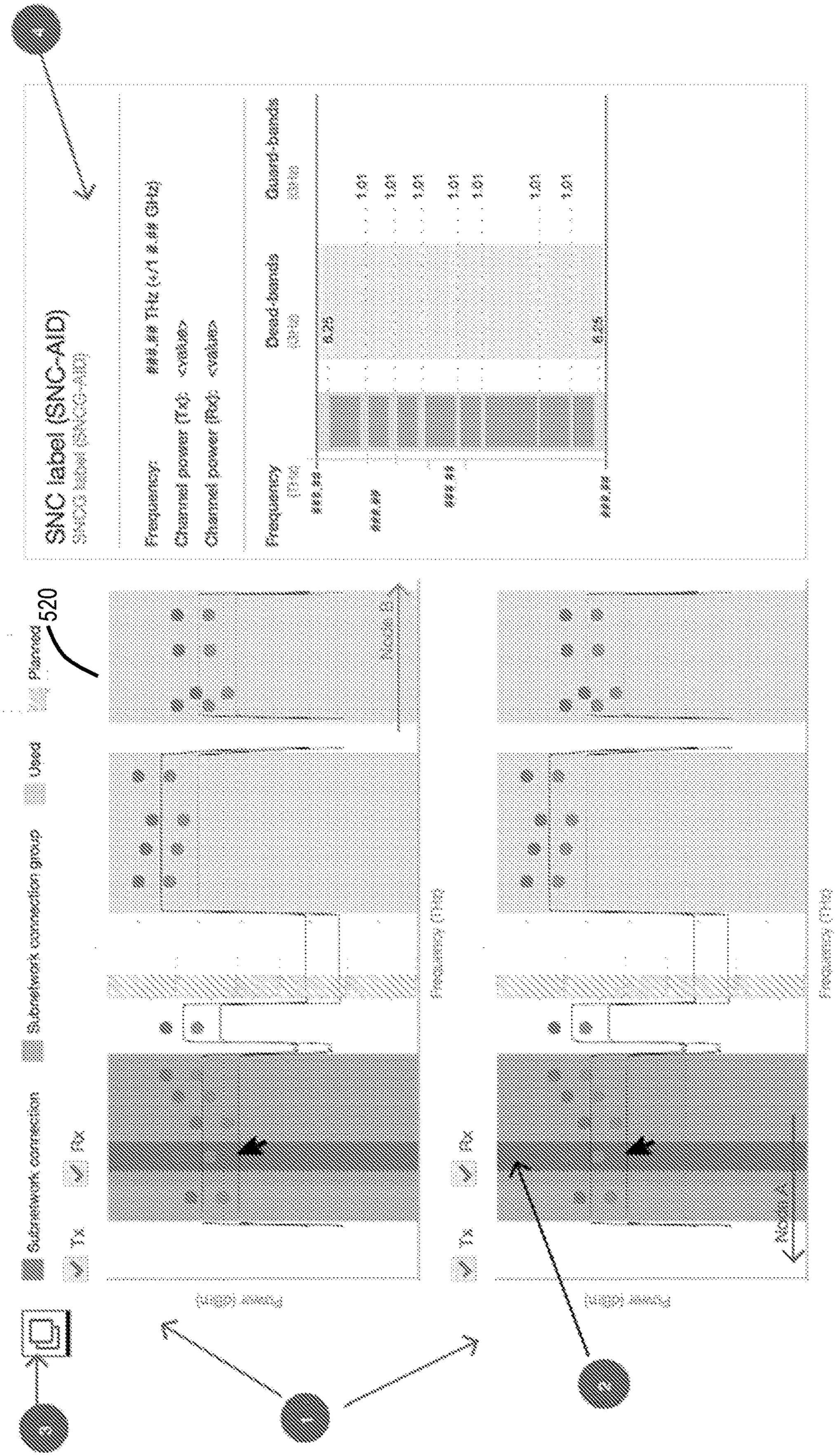
FIG. 36 is yet another screenshot of an optical spectral analysis graph.

FIG. 36 is yet another screenshot of an optical spectral analysis graph 520. The spectral analysis graph 520 is a view in an object details page for a photonic service. The User Experience (UX)/User Interface (UI) components of the spectral analysis graph include the following in FIG. 36:

1. Spectral analysis graphs: Power per frequency line graph with overlaid blocks indicating used/planned spectrum. Also, shows per channel power. One graph per photonic direction.
2. Selected SNC/SNCG (if selected): In-context highlighted spectral section highlights SNC and SNCG.
3. Disclosure (details) tab: allows for overlays to be hidden/shown on the allocation view.
4. Details panel: contains all flex-grid related information about the selected part of the spectrum. Similar content and treatment as in the path-based spectral allocation. If nothing is selected, shows summary data about the spectrum.
5. Historical PM button: Opens a lightbox showing time-series graph for this data-point (not shown in FIG. 36).

Figure 37:
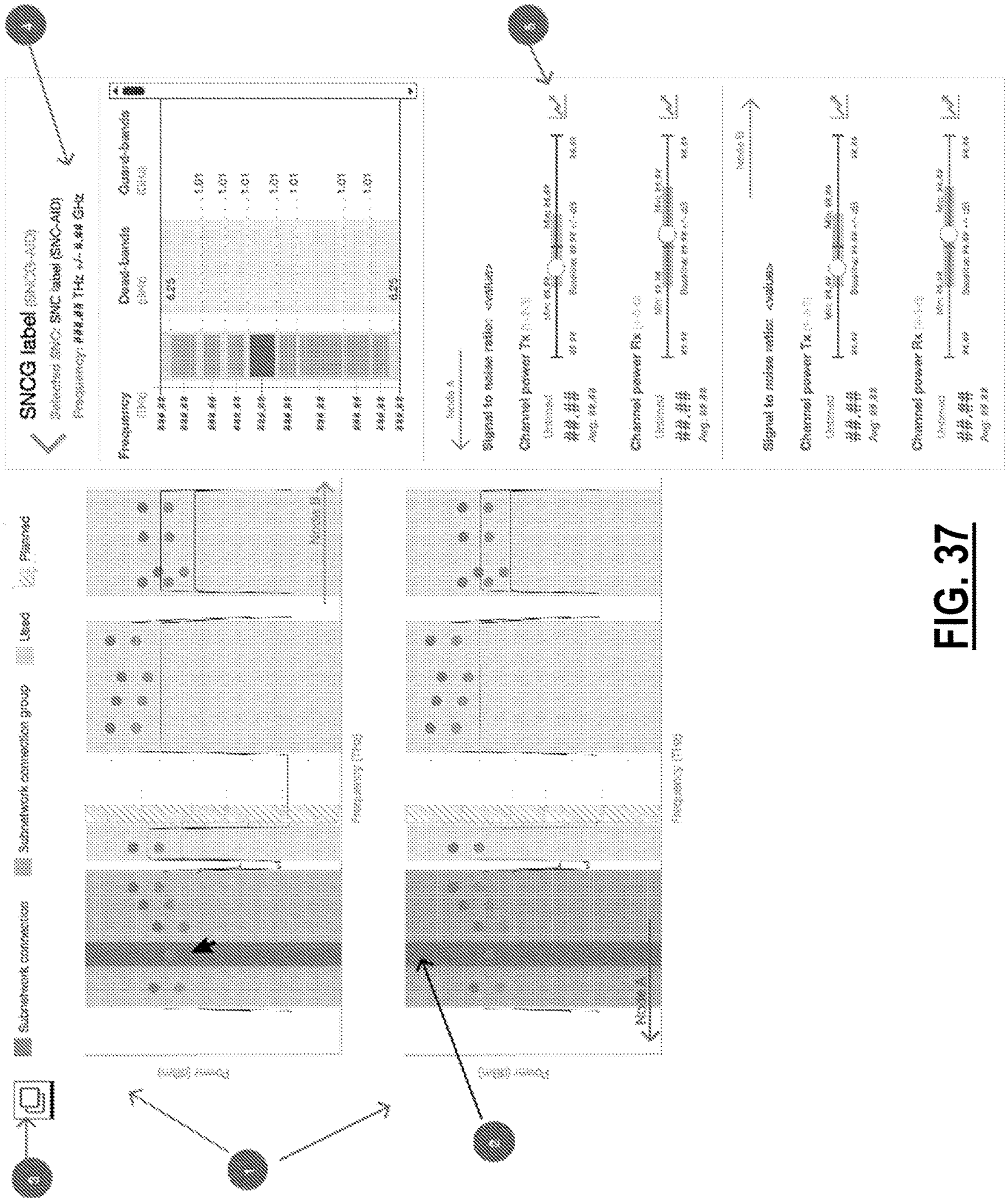
FIG. 37 is yet another screenshot of an optical spectral analysis graph.
Figure 38:
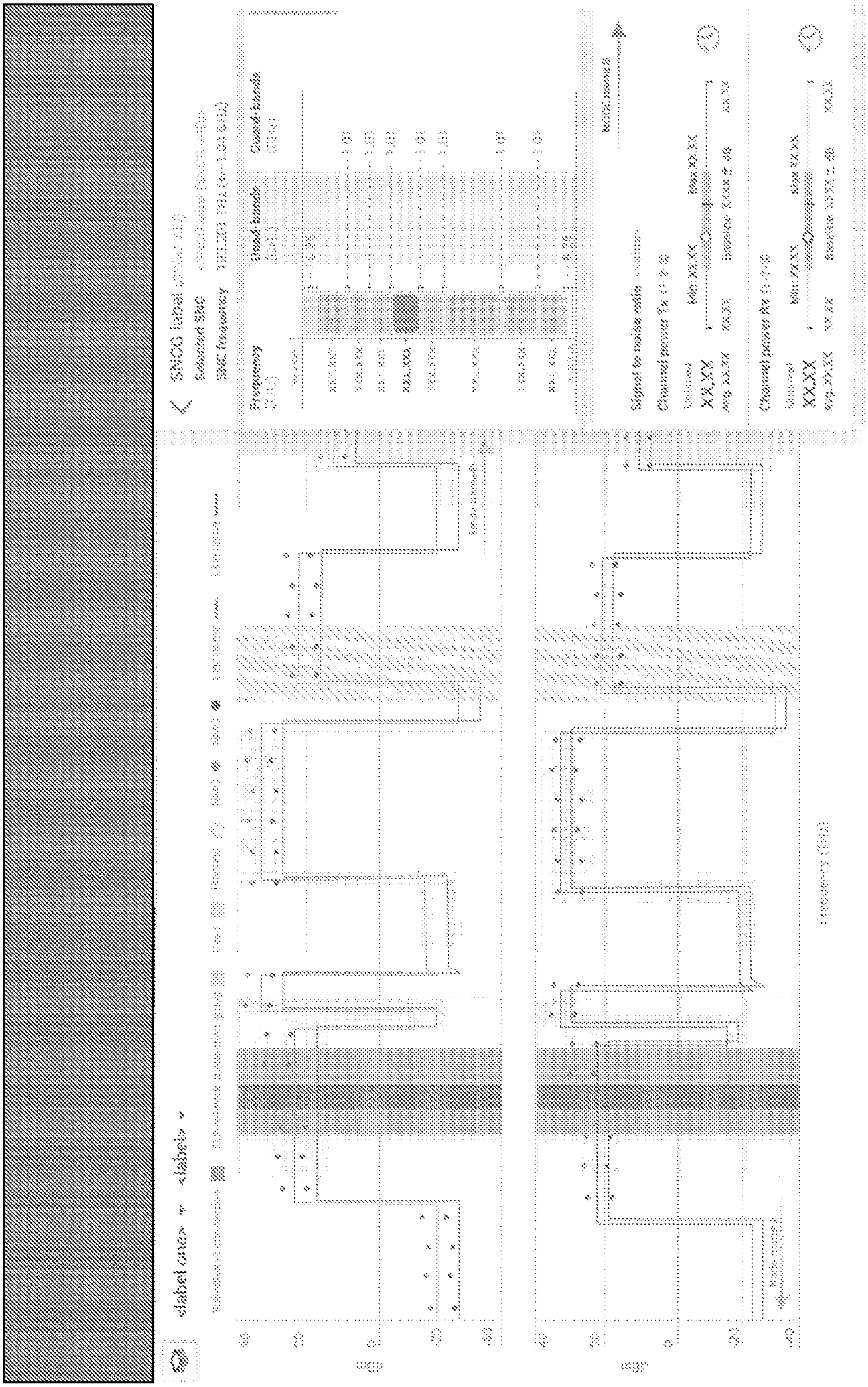
FIGS. 38-41 are example screenshots of the optical spectral analysis graph.
Figure 39:
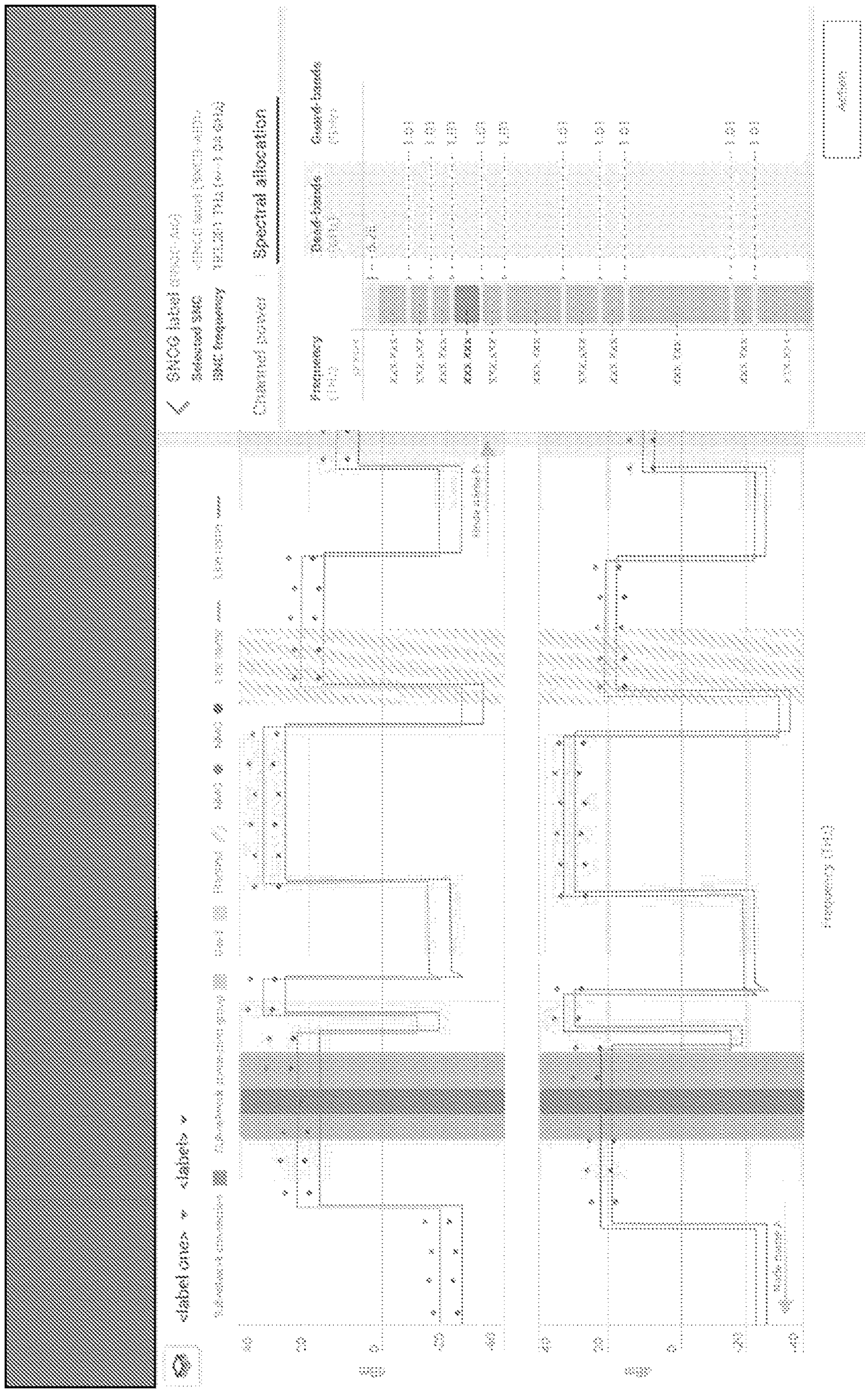
Figure 40:
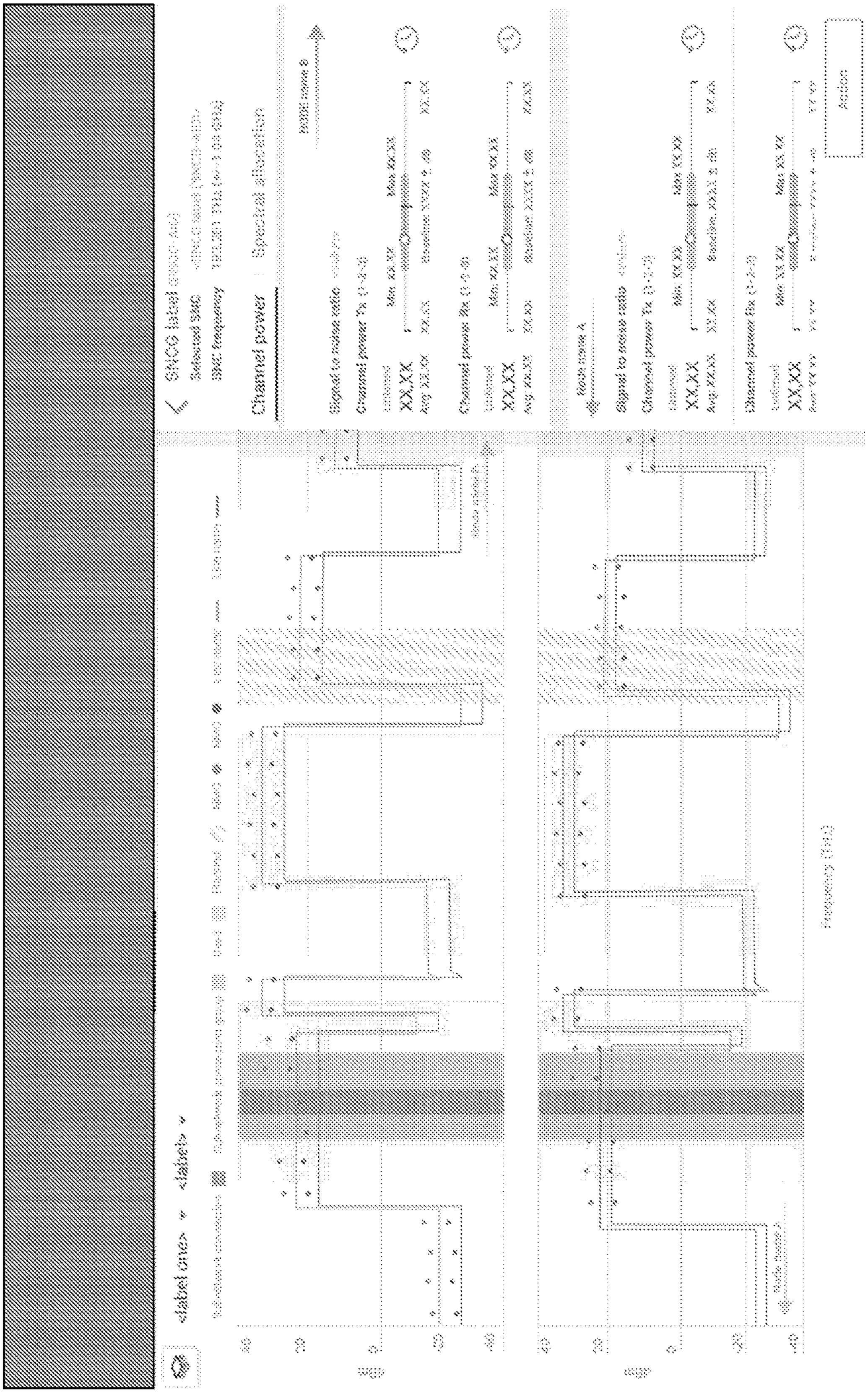
Figure 41:
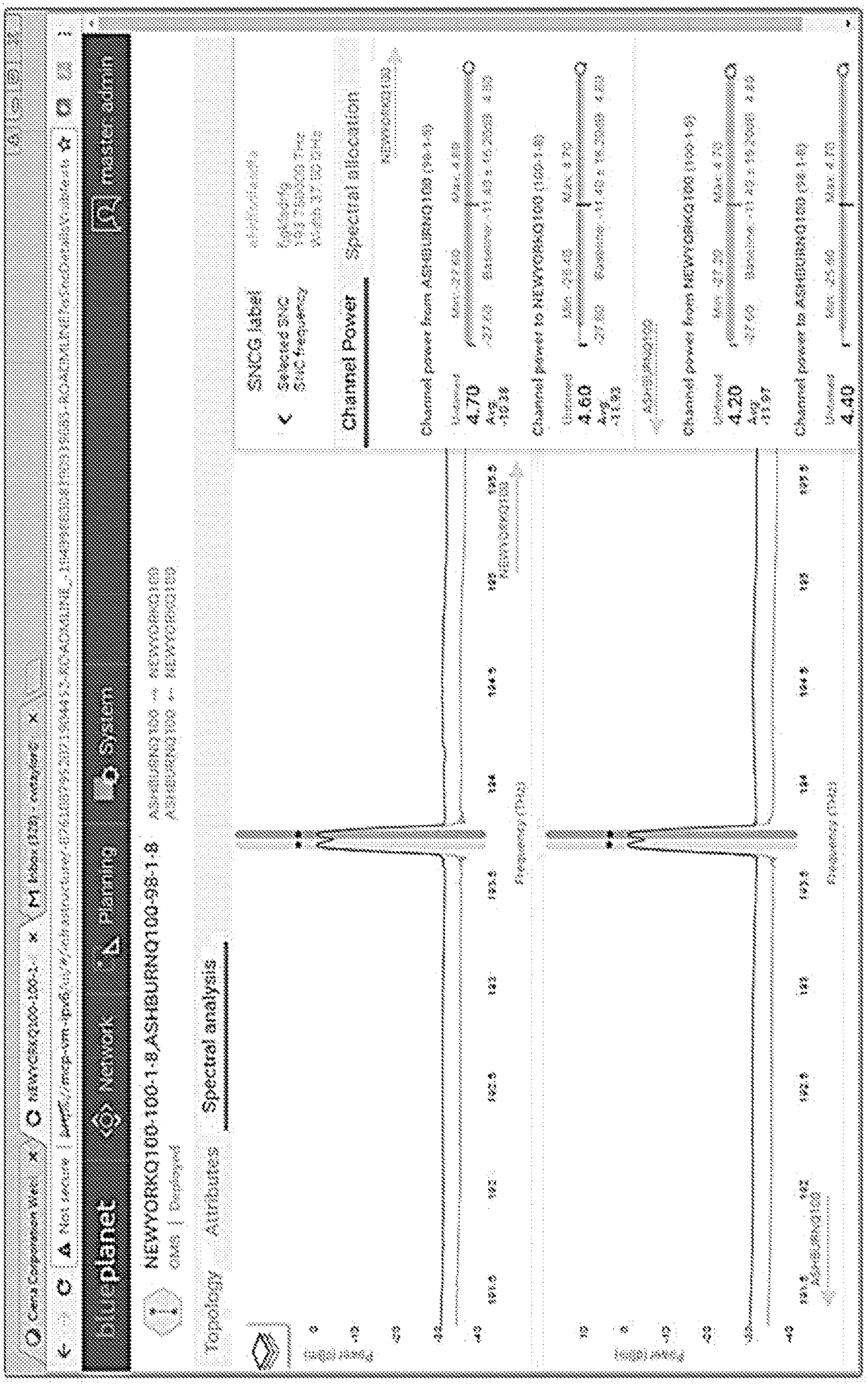

FIG. 37 is yet another screenshot of an optical spectral analysis graph. The spectral analysis graph is a view in an object details page for a photonic service. The User Experience (UX)/User Interface (UI) components of the spectral analysis graph include the following in FIG. 37:

1. Spectral analysis graphs: Power per frequency line graph with overlaid blocks indicating used/planned spectrum. Also, shows per channel power. One graph per photonic direction.
2. Selected SNC/SNCG (if selected): In-context highlighted spectral section highlights SNC and SNCG.
3. Disclosure (details) tab: allows for overlays to be hidden/shown on the allocation view.
4. Details panel: contains all flex-grid related information about the selected part of the spectrum. Similar content and treatment as in the path-based spectral allocation. If nothing is selected, shows summary data about the spectrum.
5. Historical PM button: Opens a lightbox showing time-series graph for this data-point.

FIGS. 38-41 are example screenshots of the optical spectral analysis graph.

Figure 42:
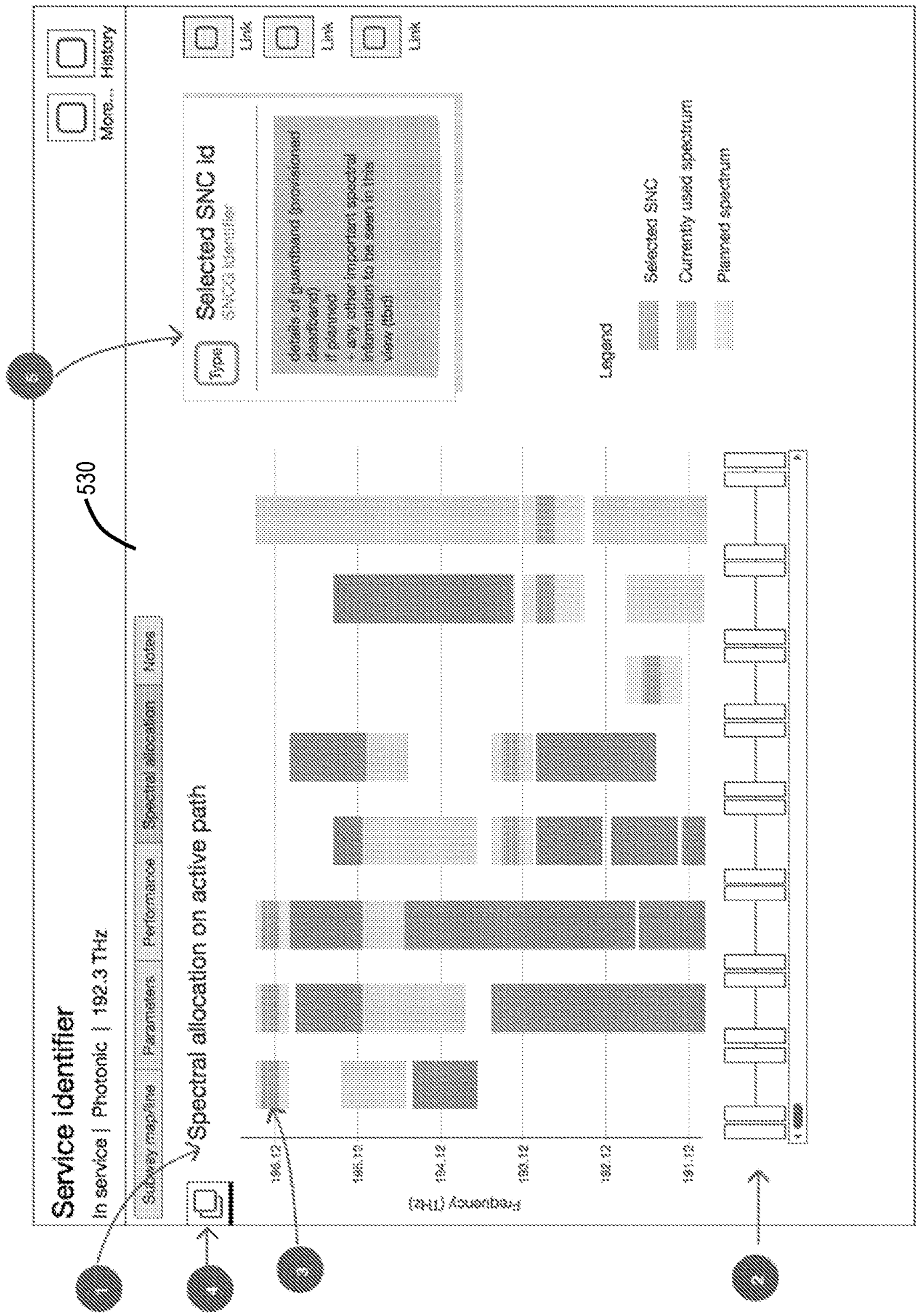
FIG. 42 is a screenshot of an optical spectral allocation graph.

FIG. 42 is a screenshot of an optical spectral allocation graph 530. The optical spectral allocation graph is a view of an object details page for a photonic service. The User Experience (UX)/User Interface (UI) components of the optical spectral allocation graph include the following in FIG. 42:

1. Spectral allocation graph: blocks of spectrum that are allocated (used, planned) between/across NEs. Y-axis: spectrum frequency, X-axis: OMS spans between NEs along the path
2. Line View (X-Axis): NEs (card view) along the path.
3. Selected SNC/SNCG: In-context highlighted spectral section for the photonic service object which visually differentiates between SNC and SNCG.
4. Disclosure (details) tab: allows for overlays to be placed on the allocation view.
5. Details panel: split into 2 tabs to show a hierarchical listing of the SNCGs along the same path and a detailed spectral allocation for the part of the spectrum in focus.

Figure 43:
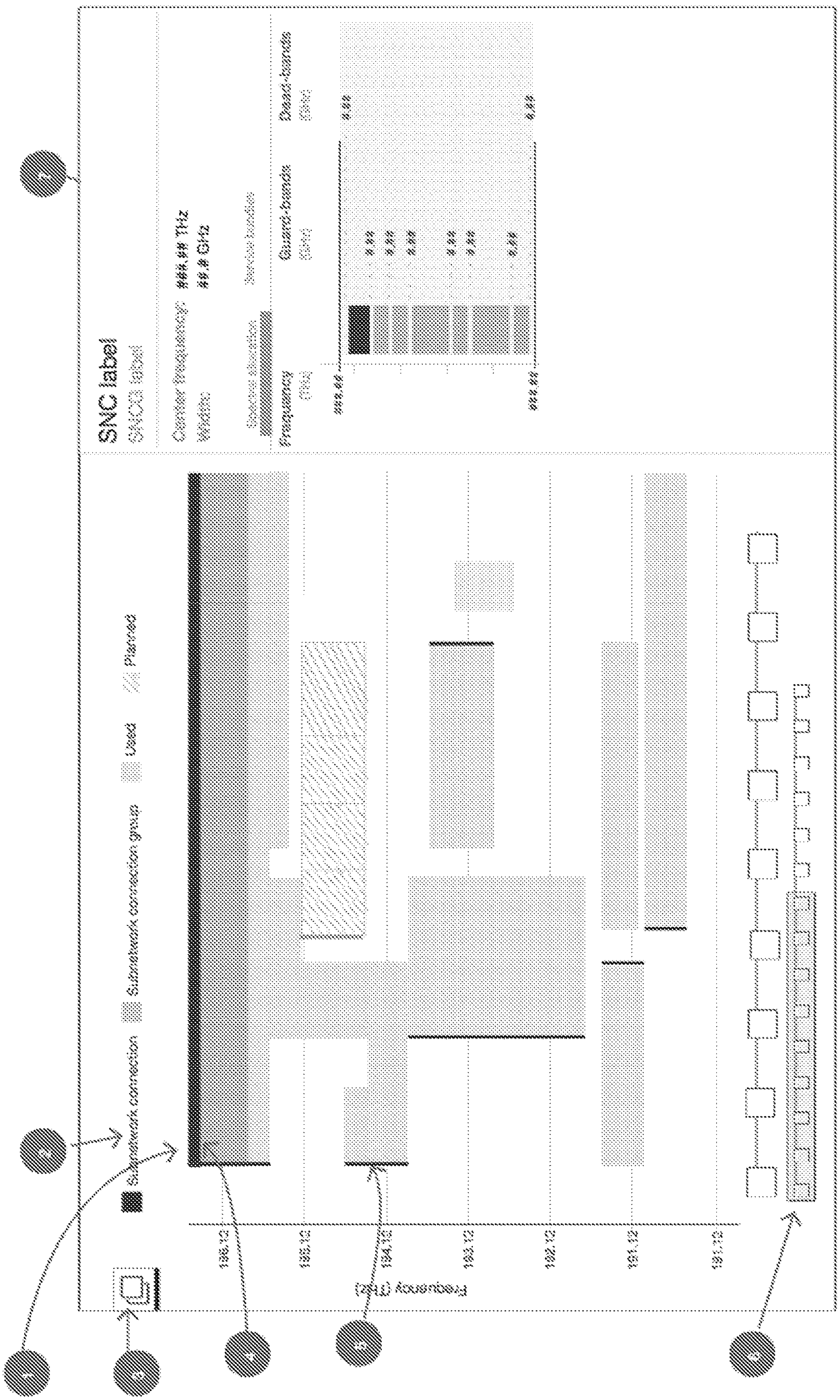
FIG. 43 is another screenshot of an optical spectral allocation graph.

FIG. 43 is another screenshot of an optical spectral allocation graph. The optical spectral allocation graph is a view of an object details page for a photonic service. The User Experience (UX)/User Interface (UI) components of the optical spectral allocation graph include the following in FIG. 43:

1. Spectral allocation graph: blocks of spectrum that are allocated (used, planned) between/across NEs. Y-axis: spectrum frequency, X-axis: OMS spans between NEs along the path.
2. Legend: indicates the meaning of the colors/patterns in the graph.
3. Disclosure (details) tab: allows for overlays to be placed on the allocation view.
4. Selected SNC/SNCG: In-context highlighted spectral section for the photonic service object which visually differentiates between SNC and SNCG.
5. Add-drop indicators: indicate wherever the spectrum is added/dropped at either end of a block of spectrum.
6. Visual Scroll Bar: miniature, scrollable view of the active photonic path to anchor the spectral allocation for each OMS span.
7. Details panel: split into 2 tabs to show a hierarchical listing of the SNCGs along the same path and a detailed spectral allocation for the part of the spectrum in focus.

Figure 44:
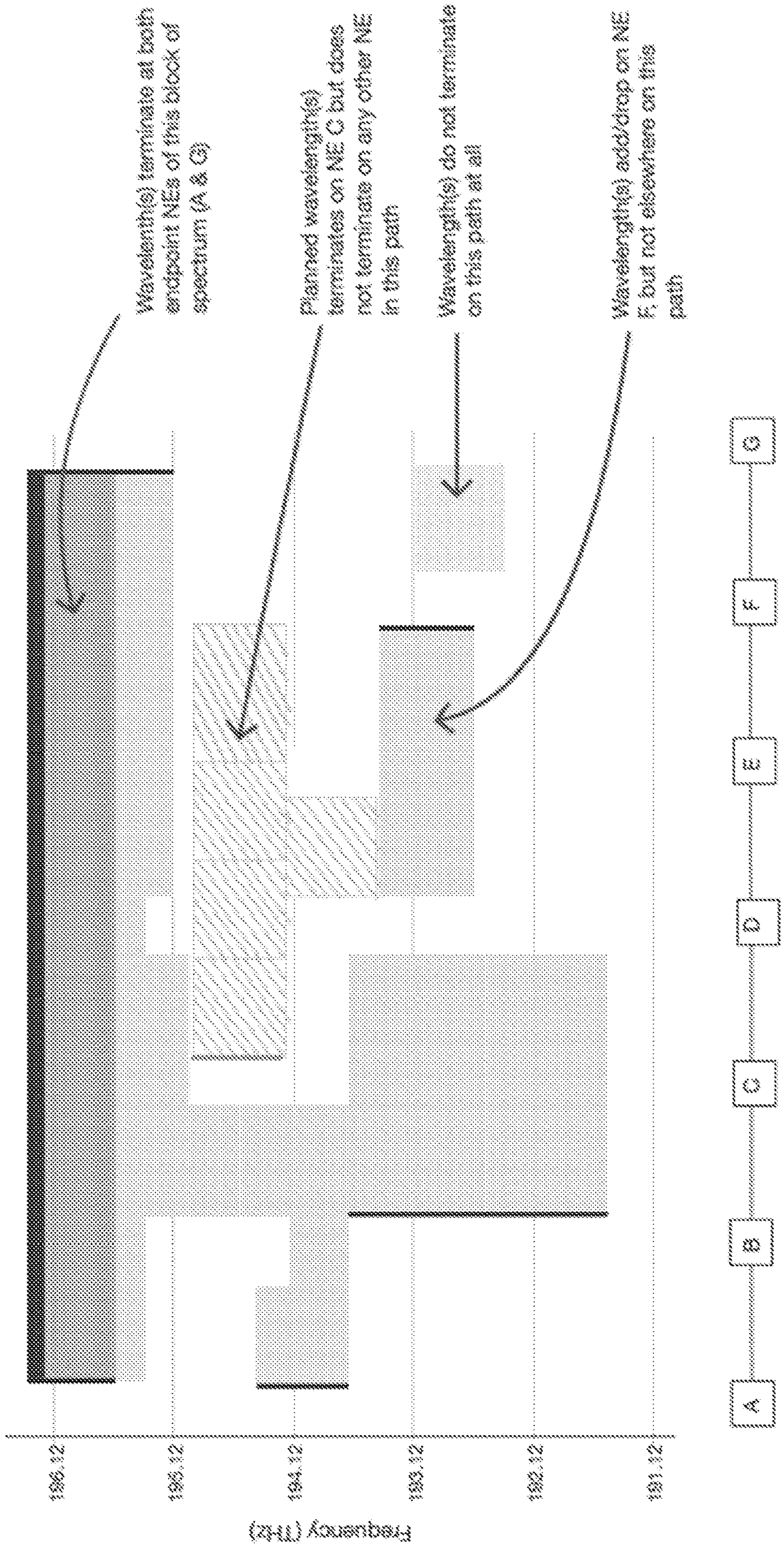
FIG. 44 is yet another screenshot of an optical spectral allocation graph.

FIG. 44 is yet another screenshot of an optical spectral allocation graph. The used and planned sections of the spectrum are visually differentiated, and the points where spectrum is terminated are marked. The add/drop points are shown as thick vertical lines. Scroll the scroll bar for service paths that fall outside the screen. In most cases, this is not expected to be necessary because the X-axis is scaled to fit all NEs in the path on the screen at once (in most cases). To view spectral allocation, this is a benefit so that the user can get a condensed picture of the entire path in one view. However, very long views may require scrolling, which can be accommodated showing the NEs and OMS links for the full path.

Select specific overlays are show in the disclosure (details) tab to highlight/add additional details on demand. Specific overlays offered can depend on the context where this visualization is shown. This mechanism allows users to control when extra data is shown so that they can more easily interpret the information. Some example overlays maybe: Operational/troubleshooting context: service state (highlight any non-normal SNCs sharing spectrum along the path) and other affected neighbors. In the planning/provisioning context, Media Channel (MC) borders give a sense of spectral efficiency.

Figure 45:
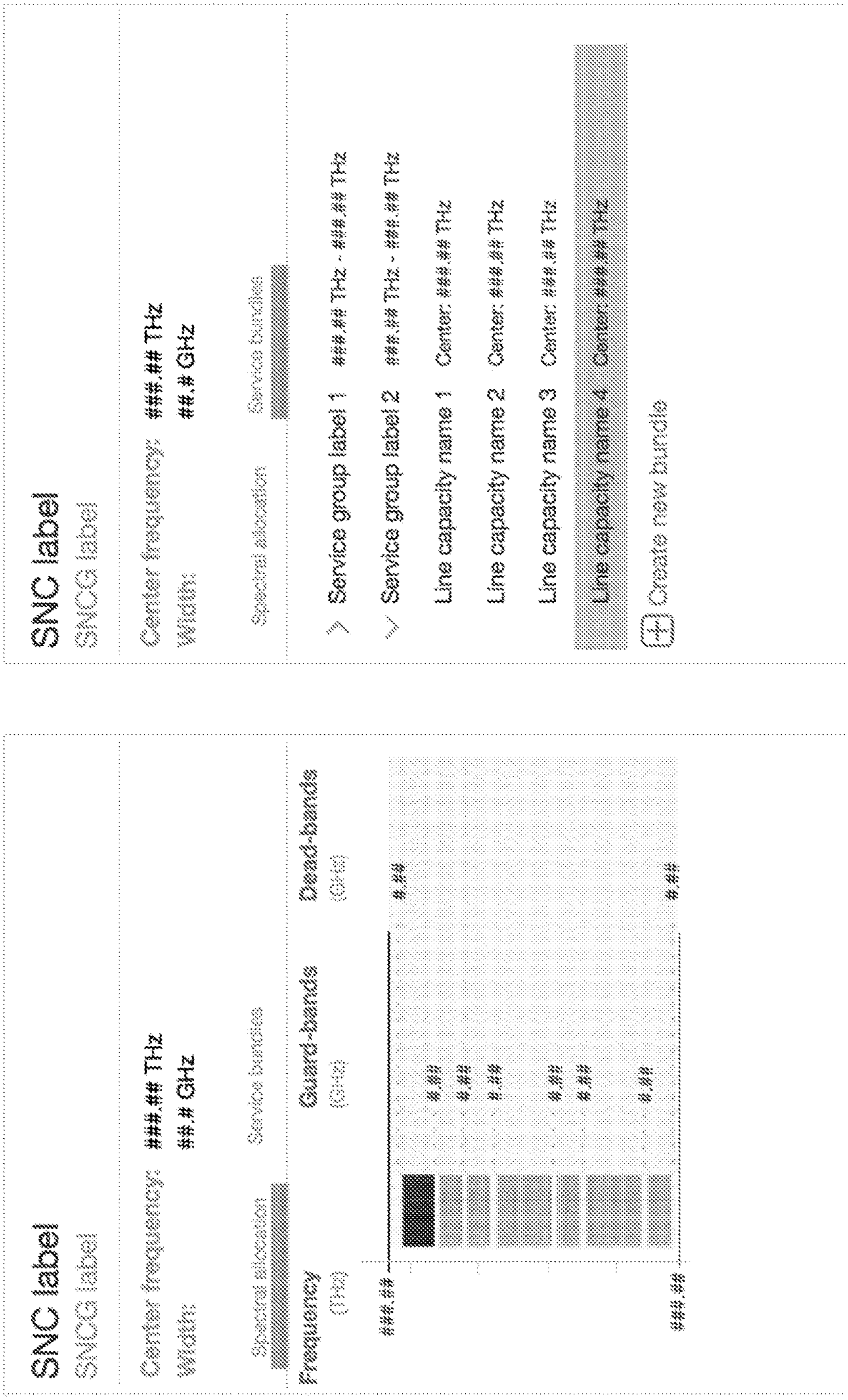
FIG. 45 is a screenshot of details panels associated with the optical spectral allocation graph.

FIG. 45 is a screenshot of details of a panel associated with the optical spectral allocation graph. The details panel shows more information about the SNC/SNCG in focus. In addition to common information (SNC/SNCG labels and center frequency/width), there are 2 tabs (Spectral allocation and Service bundles) to display a more detailed graphical breakdown of the in-focus SNC/SNCG (purple here) and a hierarchical list of the service bundles that extend along the full path. The graphical section is intended to be identical to the one shown in the spectral analysis view.

The highlighted section of the spectrum depends on the context. For example, during a provisioning workflow, the SNC being currently provisioned will be highlighted (and its associated SNCG). The tab opened by default may change depending on the context in which this component is used. For example, during provisioning/online planning, it may be more appropriate to first show the service bundles to allow the user to review their choice of SNCG based on other content of that SNCG.

Figure 46:
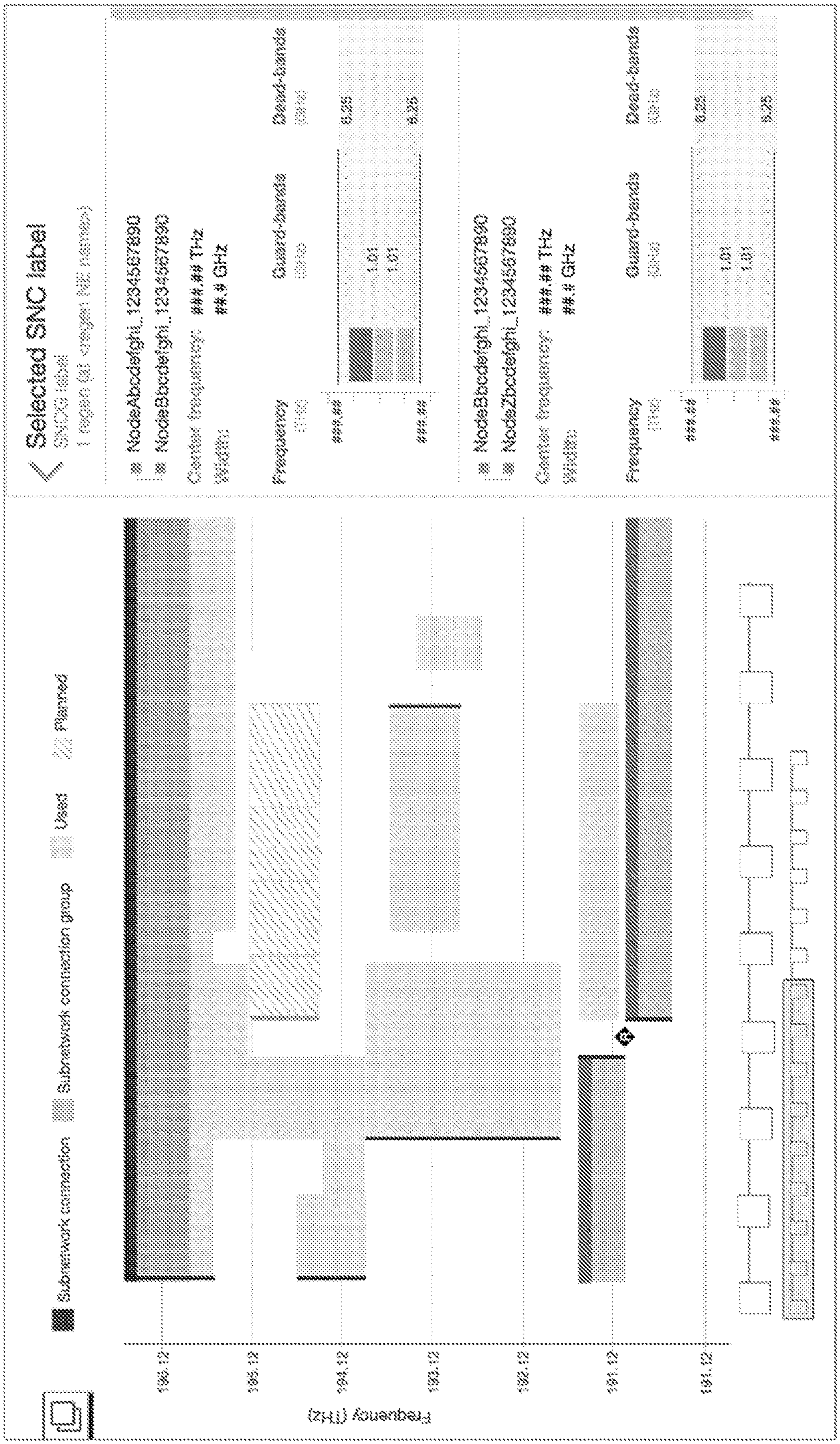
FIG. 46 is a screenshot of selection behavior associated with the optical spectral allocation graph.

FIG. 46 is a screenshot of selection behavior associated with the optical spectral allocation graph. A user can hover over the graph to visually highlight separately selectable SNCs within the vertical spectrum. The user can click on the spectrum blocks to progressively disclose the detailed spectral breakdown of the selected SNC/SNCG (update right-hand panel). The user can highlight the selection in the graph in the selection color. The user can click on the back arrow (angle bracket) to de-select.

If the selected SNC/SNCG spans one or more regens, this is indicated in the graph between the different spectrum blocks. Note that the section of spectrum used may change across the regen, as shown in the following example. The selection panel can indicate each segment's detailed spectral breakdown separately.

Figure 47:
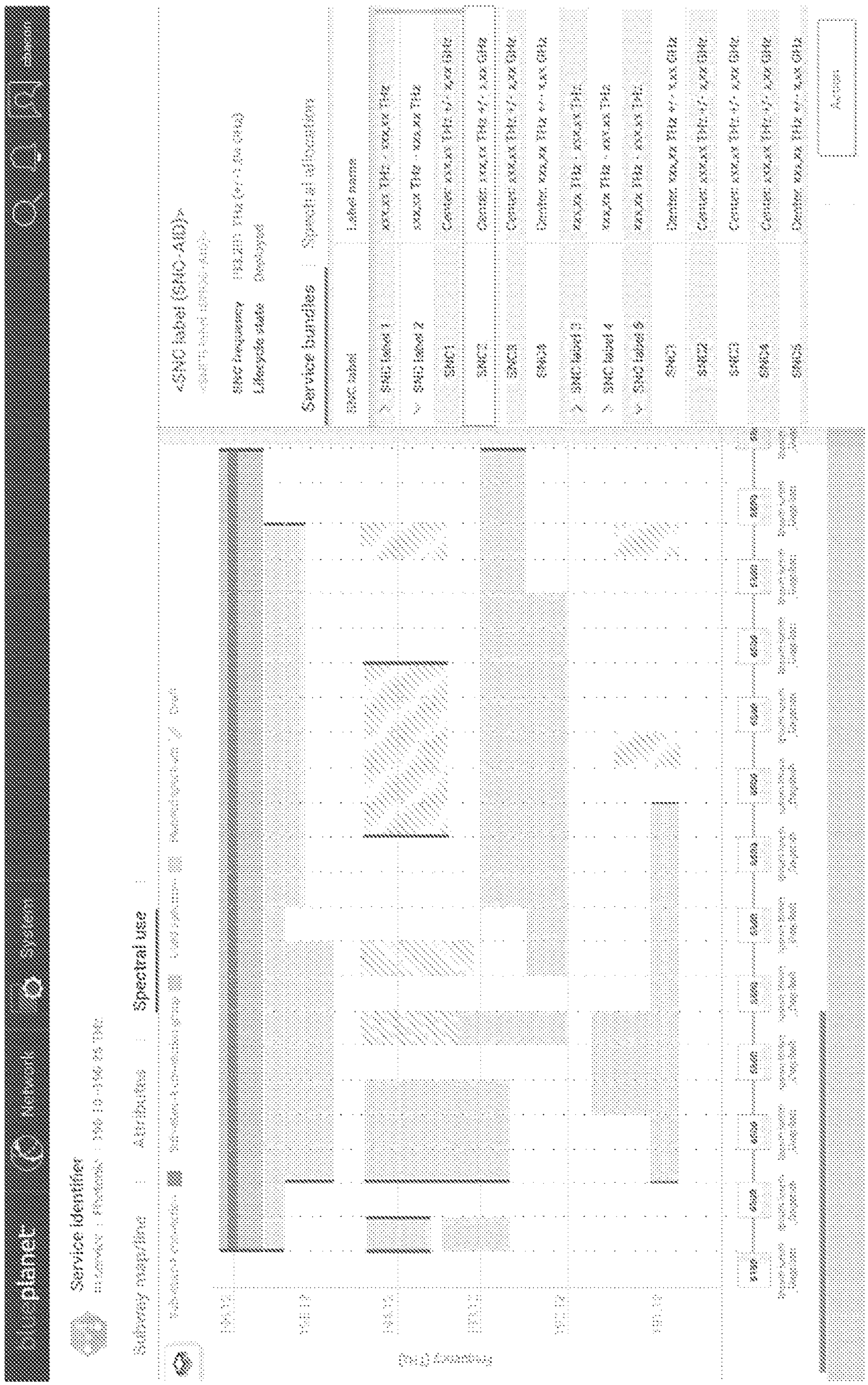
FIGS. 47 and 48 are example screenshots of the optical spectral allocation graph.
Figure 48:
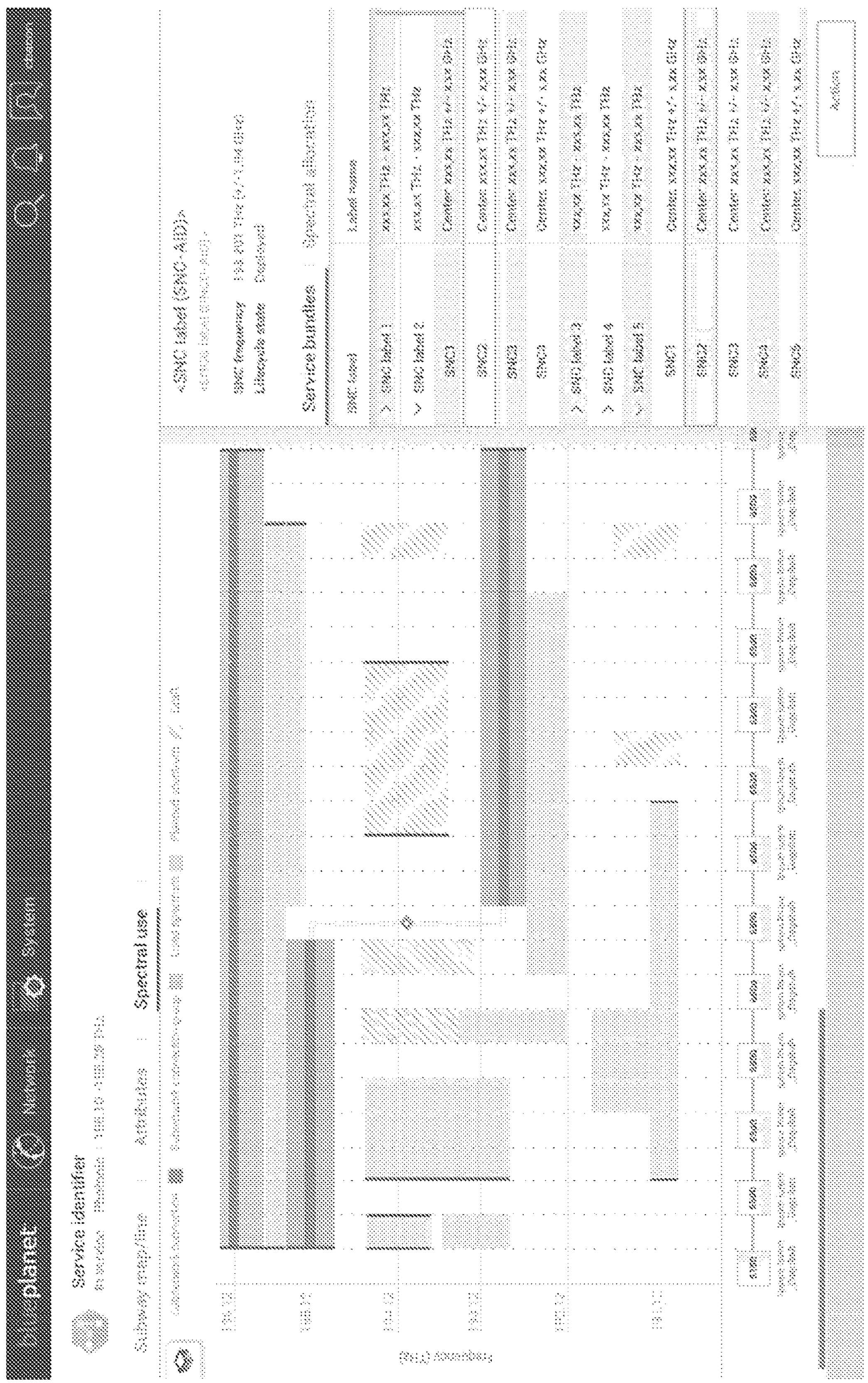

FIGS. 47 and 48 are example screenshots of the optical spectral allocation graph.

Figure 49:
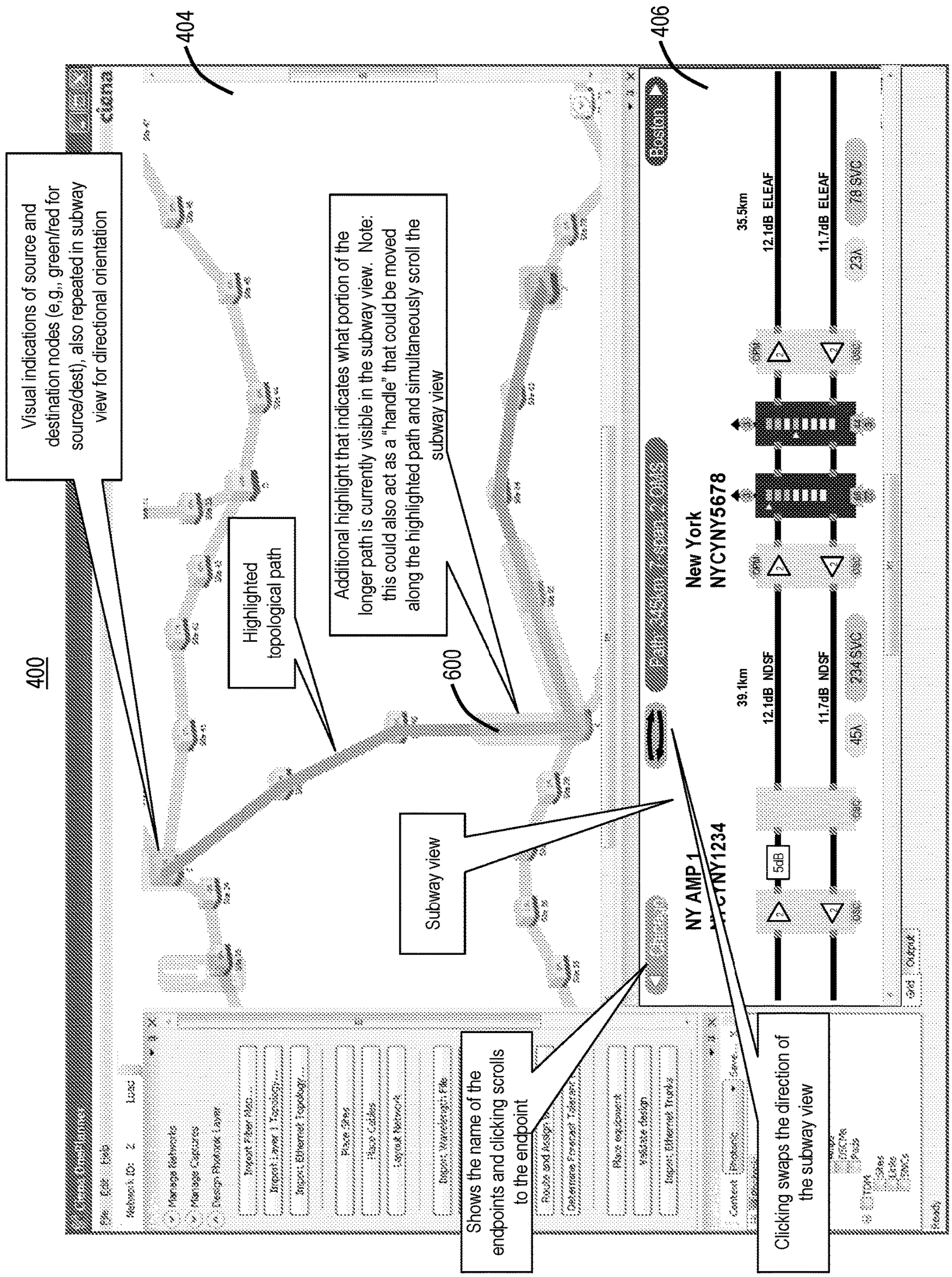
FIG. 49 is a screenshot of a subway map and line service view with highlights in the map to indicate what portion of a path is displayed in the subway map.

FIG. 49 is a screenshot of a subway map and line service view 400 with highlights 600 in the map to indicate what portion of a path in the network map 404 is displayed in the subway view 406. Here, the highlights 600 can be used in lieu or in combination with the visual scrollbar 408 as a mechanism to highlight what was is being shown in the subway view 406.

Services

Figure 50:
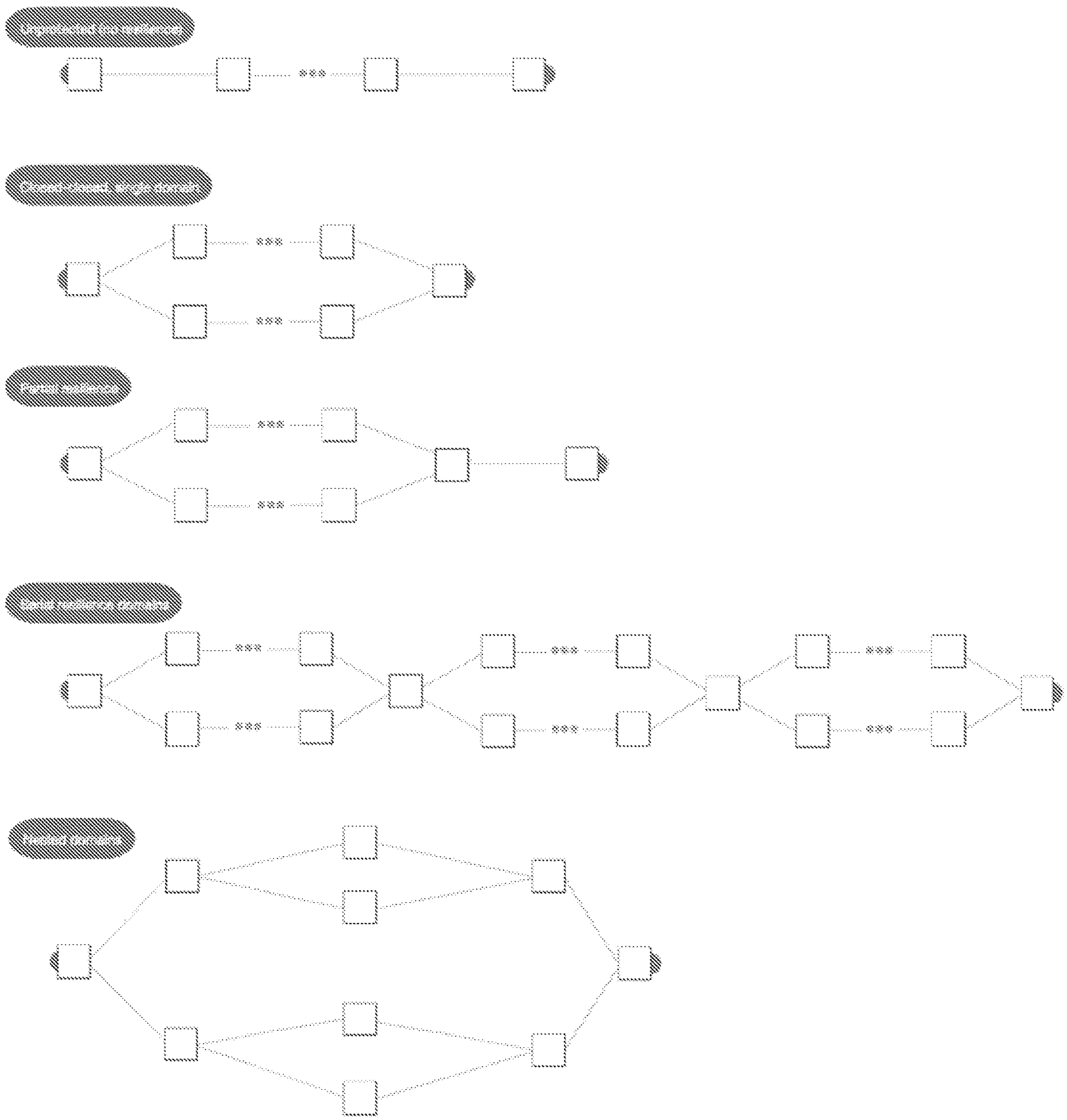
FIG. 50 is a diagram of example service structures.
Figure 51:
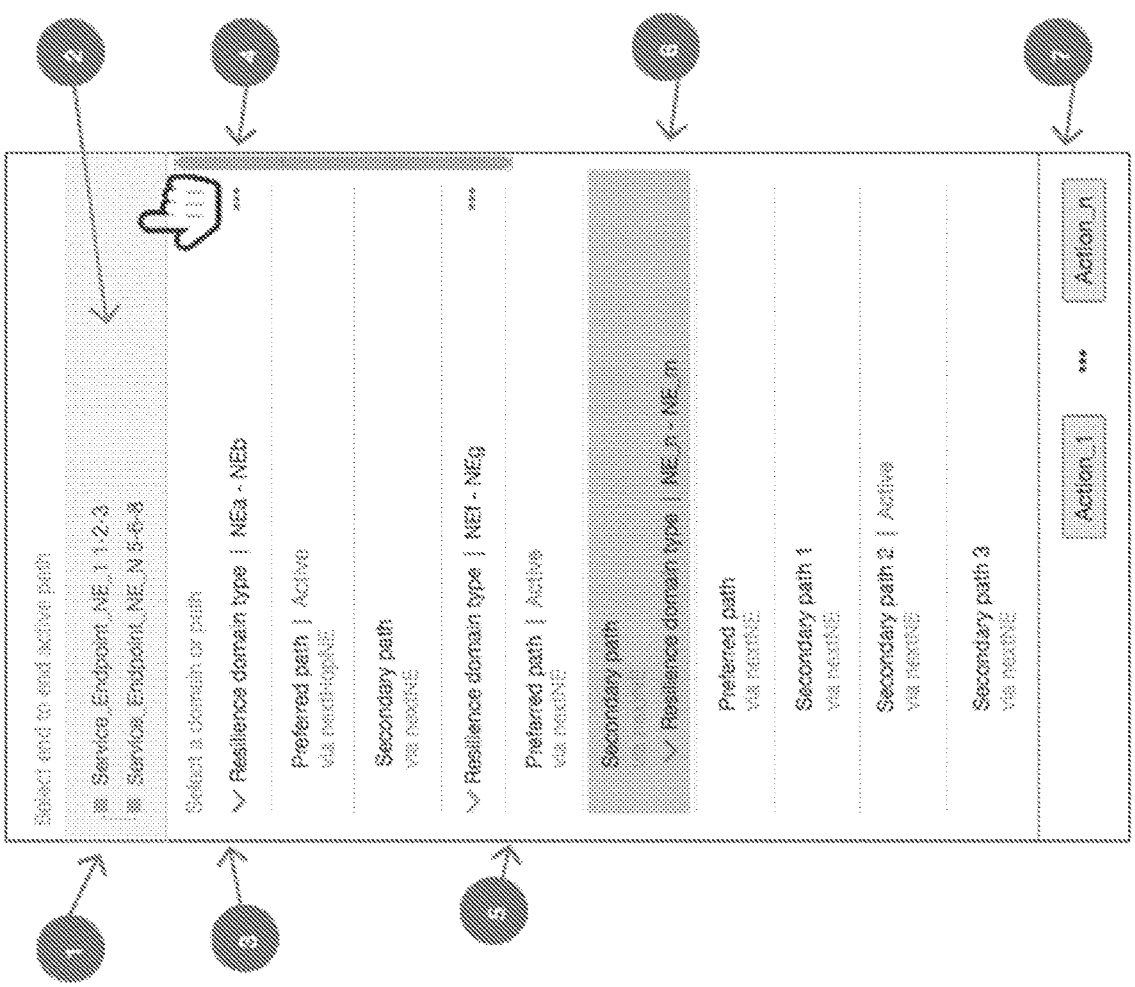
FIG. 51 is a screenshot of selecting an end to end service path.
Figure 52:
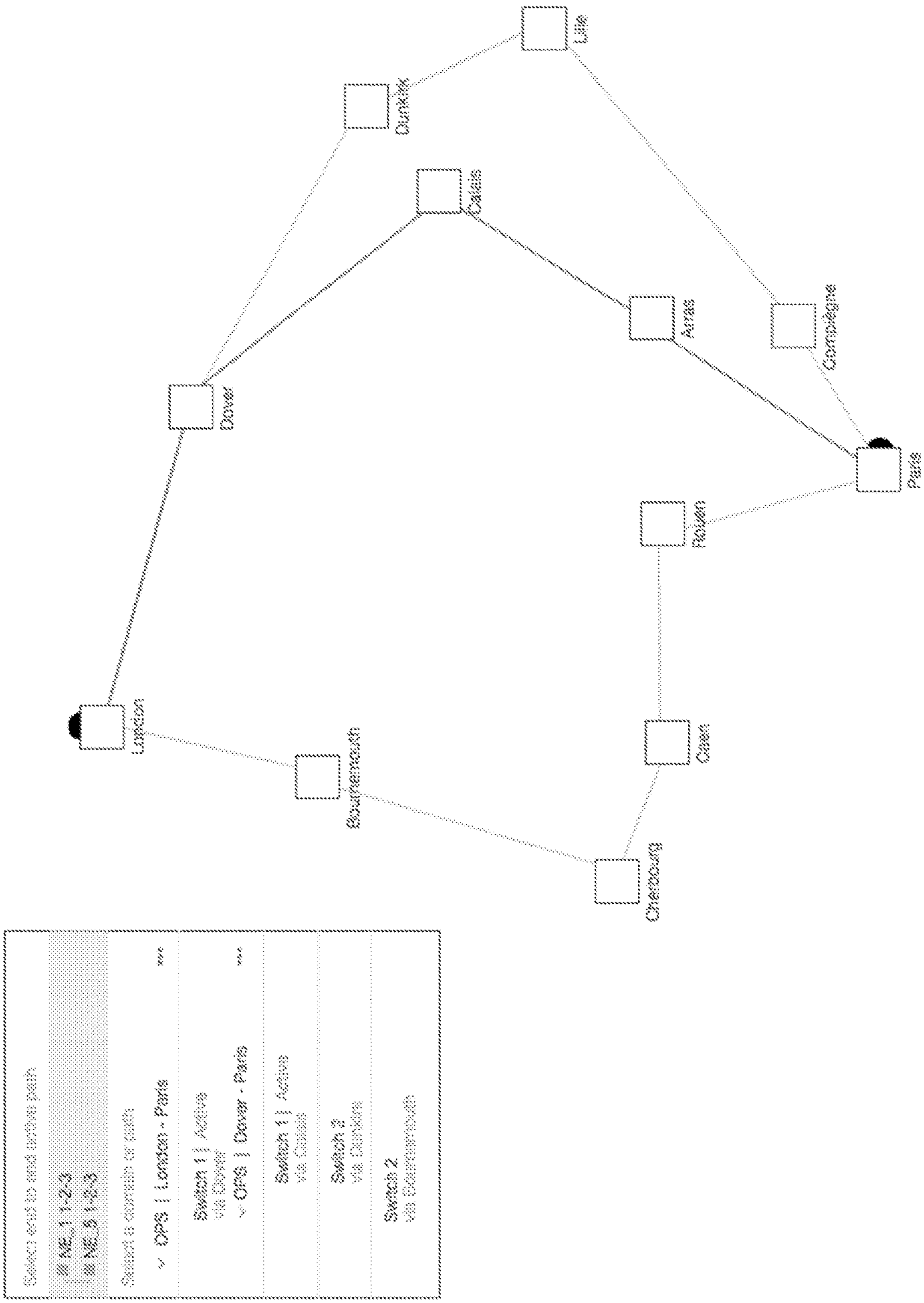
FIG. 52 is a screenshot of an example service.
Figure 53:
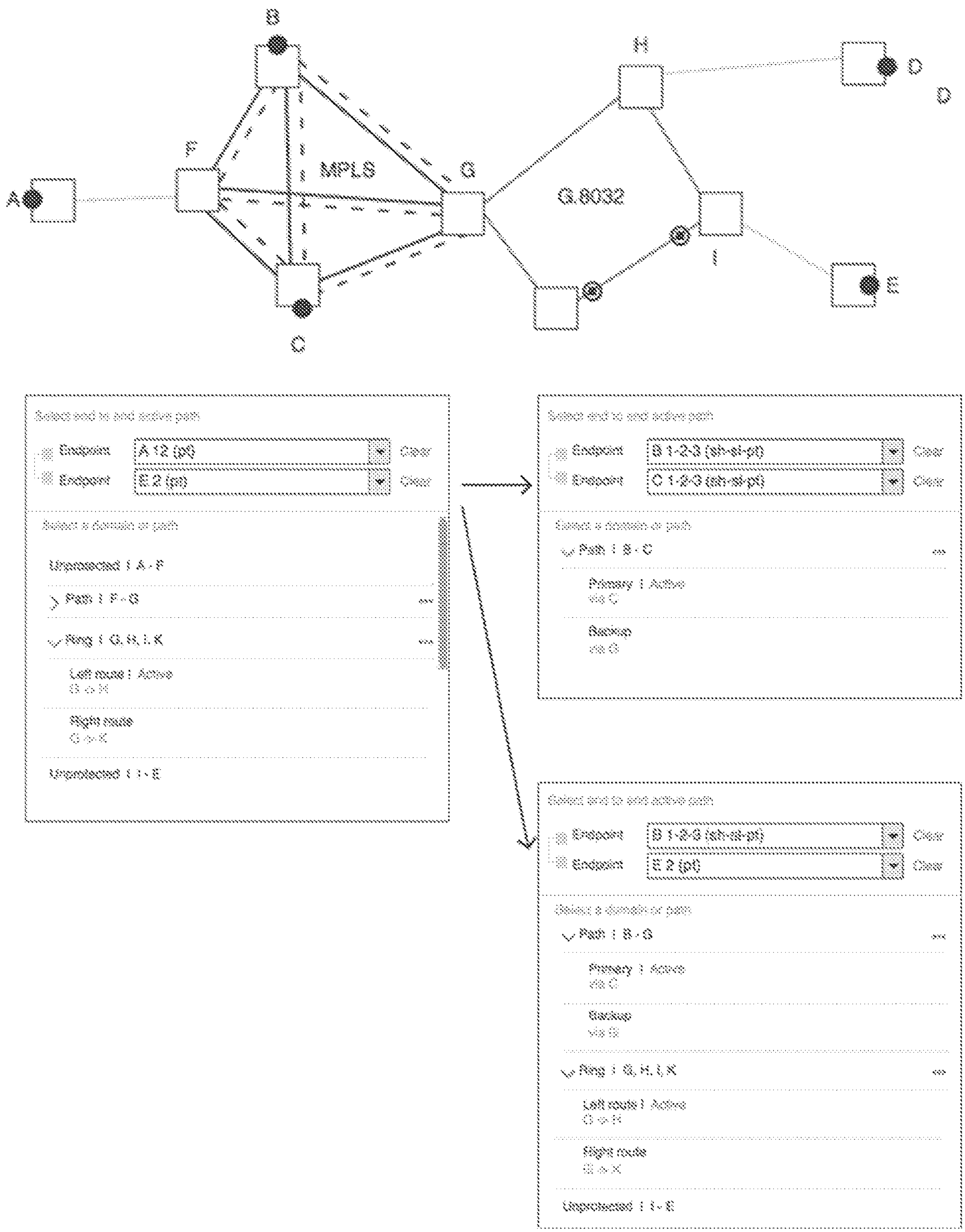
FIG. 53 is a screenshot of another example service.
Figure 54:
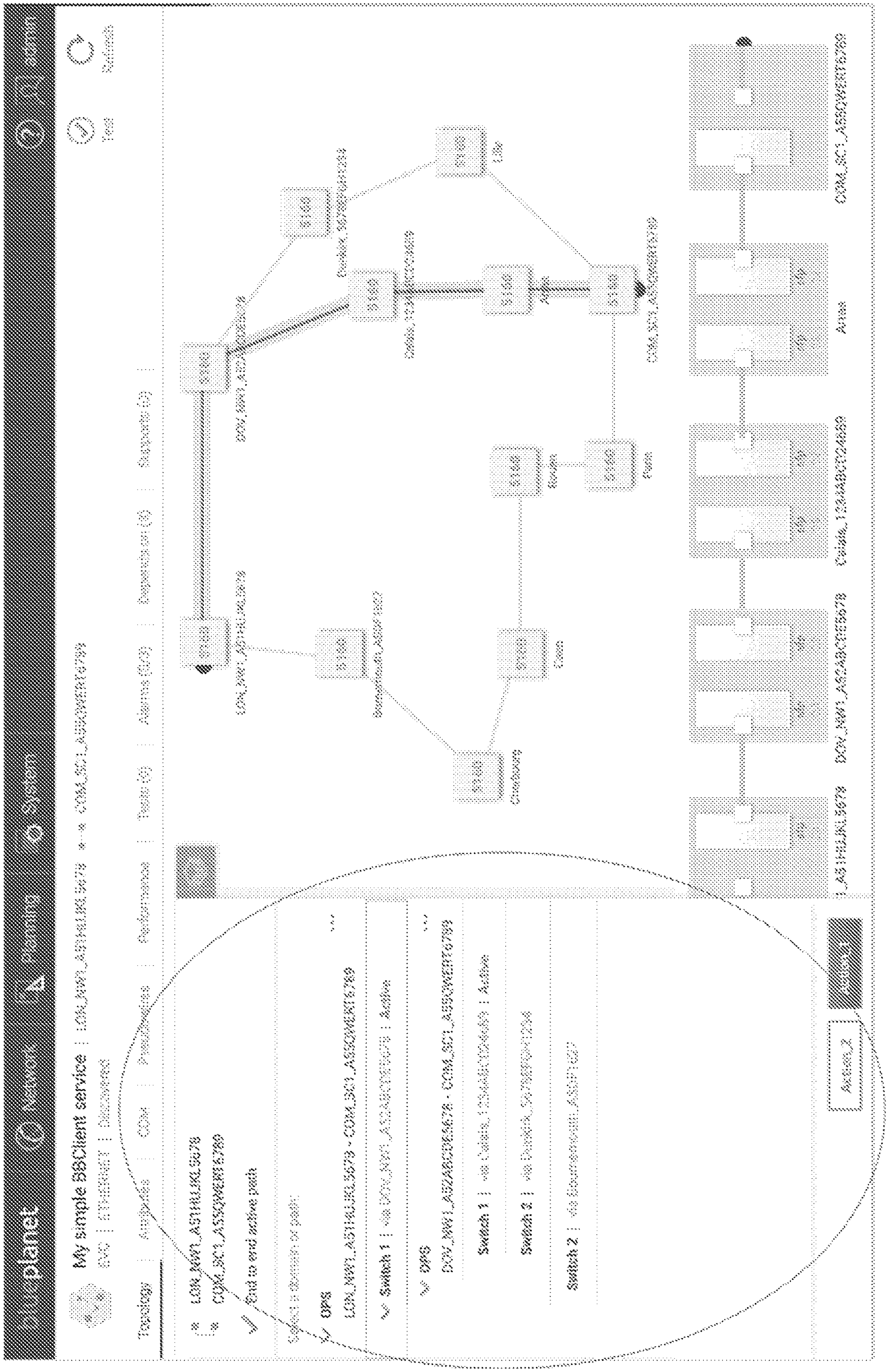
FIG. 54 is a screenshot of another subway map and line service view.

FIG. 50 is a diagram of example service structures. FIG. 51 is a screenshot of selecting an end to end service path. FIG. 52 is a screenshot of an example service. FIG. 53 is a screenshot of another example service. FIG. 54 is a screenshot of another subway map and line service view.

With the multi-layer network 100, there is a capability of stitching complex service structures into a single visualized entity and the systems and methods provide a mechanism to represent the various paths that are present in an end to end service (or infrastructure). FIG. 50 illustrates generic examples of service structures. The topology tree displays all resiliency and aggregation domains within the service and each path within these domains so that they can be separately selected and acted upon.

FIG. 51 is a screenshot for selecting an end to end service path and includes the following:

Endpoint selector/display: Either a read-only view of the endpoints for the end-to-end active path or input fields for the user to select which path to view (in multi-endpoint service). Interaction details described further on this page.

Active path selectable row (displayed with hover effect): Click this row to select the e2e active path between endpoints (requires endpoint selection in multi-endpoint services). Highlights it in the subway map, shows it in the subway line view and updates any other path-based views in other tabs accordingly. Show whole section under hover effect, similar to other rows within the list/tree.

Domain: Type, Name (if applicable), domain's endpoint NEs, status (if applicable).

Domain "More info" icon: progressively disclose attributes related to the domain itself. Icon is only displayed if applicable.

Path: Path type, if active, Path endpoint NEs if they are different from the overall domain (e.g. unidirectional tunnels, multicast services), possibly other path status+secondary path description (e.g. via NExyz). Note: If next NE in the path is the end of the path, omit from the display.

Nested domain: shows nested domain information associated with a given path (similar to how a domain is shown if not nested).

Path/domain action bar: displays associated actions for the selected path or domain in the tree.

FIG. 51 is a cascaded OPS example. With this component, users will be able to:

Visualize the service structure at the layer of the service only (this construct is NOT intended to be used for multilayer navigation).

Visualize the resilience domains in the service.

Visualize unprotected segments between NEs (e.g. tails, QinQ spurs) as a domain that has no resilient paths.

Visualize unprotected structures that are split across multiple paths (e.g. BPSK/8QAM paths).

Visualize the hierarchy of paths in the service (nesting).

Visualize path & domain status as applicable. For example, if it is part of the active path or if protection conditions are in place such as lockout of protection.

Select individual paths to highlight them on the subway map AND update what is shown in the subway line view.

Select paths to invoke path-based actions, as applicable.

Resilience domains are selectable to allow for some actions to be performed on the domain as a whole. Selecting a domain highlights all of its paths in the map. Display its currently active path in the subway line view. Some actions may be performed on the selected domain basis, such as "Revert" (if currently switched).

Select the overall service's active path to go back to the default highlighting in the map and line view.

FIG. 53 is an Ethernet Local Area Network (ELAN) example that spans multiple domains including QinQ spurs (A-F, H-D, I-E), MPLS (F, B, G, C), and G.8032 ring (G,H,I).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform steps of:

receiving Operations, Administration, Maintenance, and Provisioning (OAM&P) data from an optical network;

providing a Graphical User Interface (GUI) based on the OAM&P data with the GUI including a topology view; and providing a visualization that includes a power readings graph, in the GUI, and the visualization is positioned logically next to the topology view, wherein the power readings graph includes a graph of selected optical power on each link in the topology view, and wherein the selected optical power is one of total power, per channel power, and optical service channel (OSC) power.

2. The non-transitory computer-readable medium of claim 1, wherein the visualization is based on a selection by a user.

3. The non-transitory computer-readable medium of claim 1, wherein the power readings graph illustrates power readings along the topology view and has an optical power of each of the individual components in the topology view that measure optical power.

4. The non-transitory computer-readable medium of claim 1, wherein the visualization further includes a spectral analysis graph, and wherein the spectral analysis graph includes a graph of power per frequency line on each link in the topology view.

5. The non-transitory computer-readable medium of claim 1, wherein the visualization further includes a spectral allocation graph, and wherein the spectral allocation graph includes all spectrum visualizing allocated and unallocated channels on each link in the topology view.

6. The non-transitory computer-readable medium of claim 5, wherein the visualization further includes a spectral allocation graph, and wherein the spectral allocation graph displays spectrum and usage of the spectrum across the topology view.

7. The non-transitory computer-readable medium of claim 1, wherein a service traverses a plurality of sites in the network such that all of the sites cannot be displayed in the topology view, wherein the GUI further includes a visual scrollbar which visualizes the service in a miniature format for the topology view with a portion shown in the topology view highlighted, and wherein the steps further include update the topology view and the visualization based on input from a user through the visual scrollbar.

8. The non-transitory computer-readable medium of claim 1, wherein the steps further include receiving selections from a user and updating the GUI based thereon, the updating includes any of changing views of the topology view and the visualization, changing the visualization, and providing a details panel.

9. A method comprising steps of:

receiving Operations, Administration, Maintenance, and Provisioning (OAM&P) data from an optical network;

providing a Graphical User Interface (GUI) based on the OAM&P data with the GUI including a topology view; and providing a visualization that includes a power readings graph, in the GUI, and the visualization is positioned logically next to the topology view, wherein the power readings graph includes a graph of selected optical power on each link in the topology view, and wherein the selected optical power is one of total power, per channel power, and optical service channel (OSC) power.

10. The method of claim 9, wherein the visualization is based on a selection by a user.

11. The method of claim 9, wherein the power readings graph illustrates power readings along the topology view and has optical power and of each of the individual components in the topology view that measure optical power.

12. The method of claim 9, wherein the visualization further includes a spectral analysis graph, and wherein the spectral analysis graph includes a graph of power per frequency line on each link in the topology view.

13. The method of claim 9, wherein the visualization further includes a spectral allocation graph, and wherein the spectral allocation graph includes all spectrum visualizing allocated and unallocated channels on each link in the topology view.

14. The method of claim 13, wherein the spectral allocation graph displays spectrum and usage of the spectrum across the topology view.

15. The method of claim 9, wherein a service traverses a plurality of sites in the network such that all of the sites cannot be displayed in the topology view, wherein the GUI further includes a visual scrollbar which visualizes the service in a miniature format for the topology view with a portion shown in the topology view highlighted, and wherein the steps further include update the topology view and the visualization based on input from a user through the visual scrollbar.

16. The method of claim 9, wherein the steps further include receiving selections from a user and updating the GUI based thereon, the updating includes any of changing views of topology view and the visualization, changing the visualization, and providing a details panel.

* * * * *